(12) United States Patent
Eveleigh et al.

(10) Patent No.: US 11,540,673 B2
(45) Date of Patent: *Jan. 3, 2023

(54) INTEGRATED EMERGENCY WASH AND SHOWER SYSTEM

(71) Applicant: Magarl, LLC, Naples, FL (US)

(72) Inventors: Robert B. Eveleigh, Naples, FL (US); Thomas R. Baker, Noblesville, IN (US); Cameron West, Greenfield, IN (US)

(73) Assignee: Magarl, LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,662

(22) Filed: Dec. 1, 2020

(65) Prior Publication Data

US 2021/0076879 A1 Mar. 18, 2021

Related U.S. Application Data

(63) Continuation of application No. 16/280,510, filed on Feb. 20, 2019, now Pat. No. 10,881,253, which is a continuation of application No. 15/207,194, filed on Jul. 11, 2016, now Pat. No. 10,213,058.

(60) Provisional application No. 62/191,358, filed on Jul. 11, 2015.

(51) Int. Cl.
*A47K 3/28* (2006.01)
*A61H 35/02* (2006.01)
*F16K 11/00* (2006.01)
*F16K 31/00* (2006.01)

(52) U.S. Cl.
CPC ............. *A47K 3/286* (2013.01); *A61H 35/02* (2013.01); *F16K 19/006* (2013.01); *F16K 31/002* (2013.01)

(58) Field of Classification Search
CPC ...... A47K 3/286; A61H 35/02; F16K 19/006; F16K 31/002; E03C 1/0408; E03C 1/0409; E03C 1/06
See application file for complete search history.

(56) References Cited

U.S. PATENT DOCUMENTS

| | | | | |
|---|---|---|---|---|
| 4,084,270 A * | 4/1978 | Kersten, Jr. | ............ | A47K 3/286 D25/16 |
| 5,265,288 A * | 11/1993 | Allison | ................. | A61H 35/02 4/620 |
| 5,331,694 A * | 7/1994 | Mackenzie | ............ | A47K 3/286 239/128 |
| 5,647,531 A * | 7/1997 | Kline | .................. | G05D 23/134 236/DIG. 2 |
| 5,754,990 A * | 5/1998 | Gurries, II | ............. | A61H 35/02 4/620 |
| 5,987,659 A * | 11/1999 | Cannizzaro | ............ | E03D 9/085 4/420.4 |
| 6,711,758 B1 * | 3/2004 | Terek | ...................... | A61H 35/02 4/620 |
| 6,813,787 B2 * | 11/2004 | Rosenberg | ............... | A47K 3/28 4/612 |
| 7,007,316 B2 * | 3/2006 | Lutz, II | ............. | G05D 23/1393 4/620 |

(Continued)

*Primary Examiner* — Janie M Loeppke
(74) *Attorney, Agent, or Firm* — John V. Daniluck; Dentons Bingham Greenebaum LLP

(57) ABSTRACT

Apparatus and methods for integrated emergency wash systems. Various embodiments include thermostatically controlled mixing valves arranged so as to permit load carrying by the body of the valve. Further, the integrated wash systems are especially suited for use in laboratories and manufacturing settings in which available space is at a premium.

6 Claims, 68 Drawing Sheets

(56) References Cited

U.S. PATENT DOCUMENTS

| | | | | |
|---|---|---|---|---|
| 2005/0172396 A1* | 8/2005 | Marrs | A47K 3/286 | 4/615 |
| 2005/0273924 A1* | 12/2005 | Taylor | A61H 33/00 | 4/620 |
| 2006/0021131 A1* | 2/2006 | Robert | A61H 33/0095 | 4/620 |
| 2006/0260042 A1* | 11/2006 | Eveleigh | A47K 3/286 | 4/620 |
| 2007/0089234 A1* | 4/2007 | Copeland | A61H 35/02 | 4/620 |
| 2007/0089235 A1* | 4/2007 | Devinat | A61H 35/02 | 4/620 |
| 2009/0288251 A1* | 11/2009 | Strandberg | A61H 35/02 | 4/620 |
| 2010/0242166 A1* | 9/2010 | Chan | E03C 1/046 | 4/601 |
| 2011/0056015 A1* | 3/2011 | Perrin | A61H 33/6068 | 4/620 |
| 2012/0324643 A1* | 12/2012 | Ferry | A47K 3/286 | 4/597 |
| 2013/0283522 A1* | 10/2013 | Novak | A61H 35/02 | 4/678 |
| 2013/0340160 A1* | 12/2013 | Eveleigh | A61H 35/02 | 4/620 |
| 2014/0289956 A1* | 10/2014 | Murden | B60R 15/02 | 4/603 |
| 2015/0113725 A1* | 4/2015 | Eveleigh | A61H 33/0095 | 4/620 |
| 2015/0265105 A1* | 9/2015 | Zhou | B05B 1/1645 | 4/601 |
| 2015/0313417 A1* | 11/2015 | Allred | B65D 81/02 | 206/223 |
| 2016/0095794 A1* | 4/2016 | Eveleigh | A61H 35/02 | 4/620 |

* cited by examiner

SECTION E-E

SECTION A-A

SECTION D-D

SECTION F-F

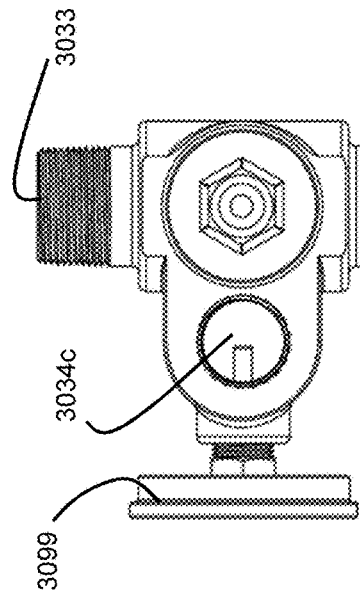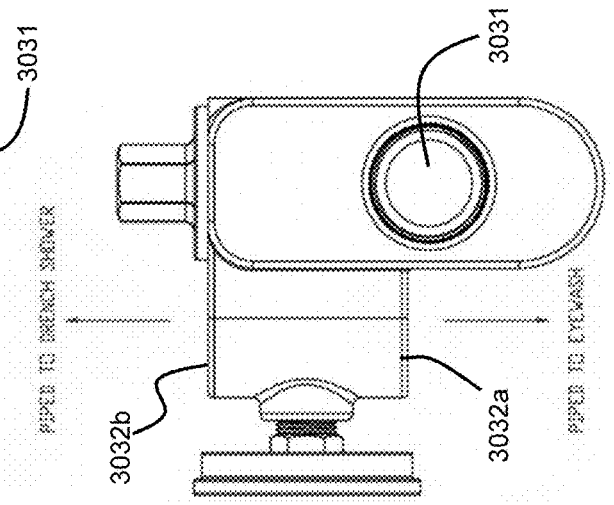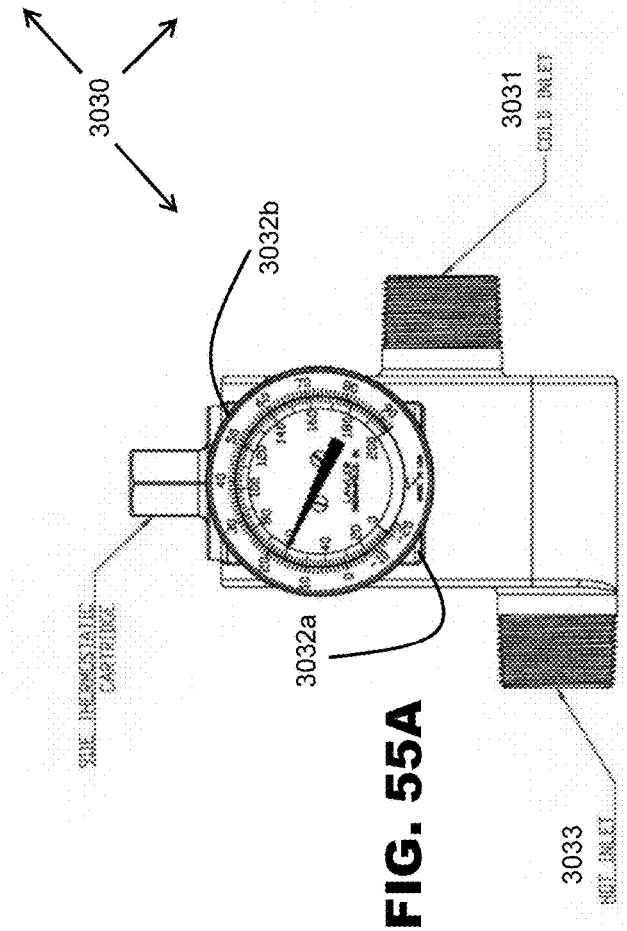

FIG. 57A      FIG. 57B

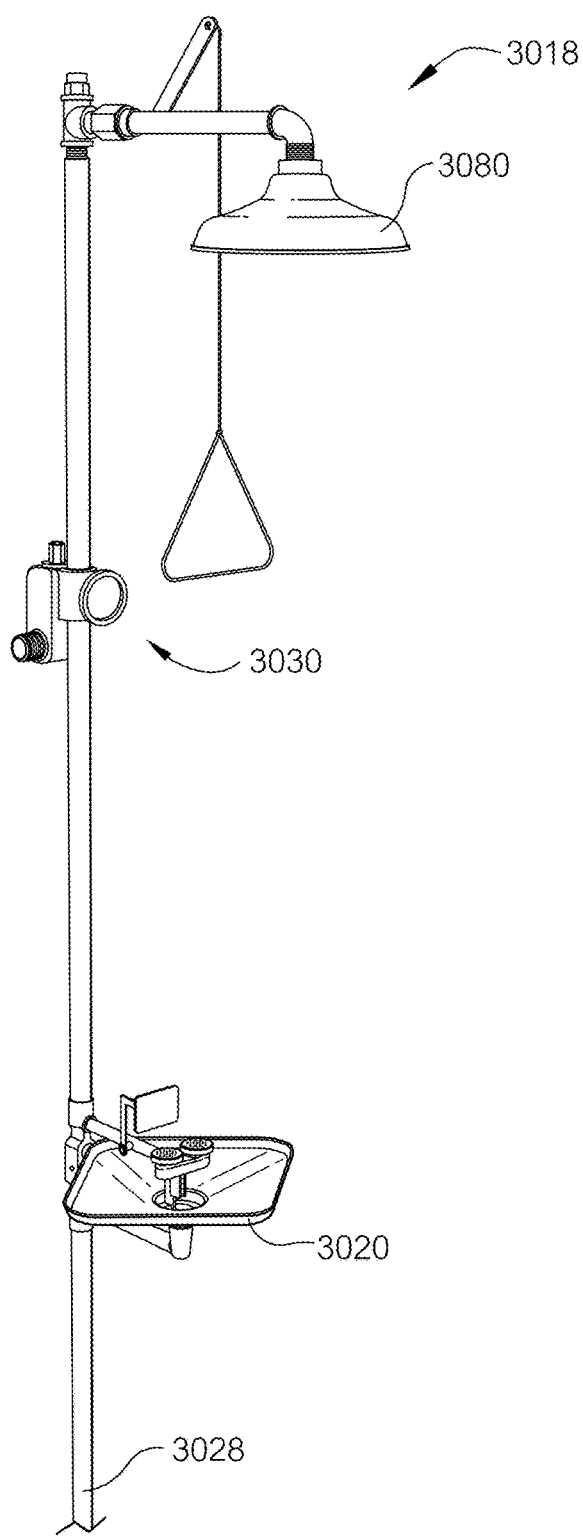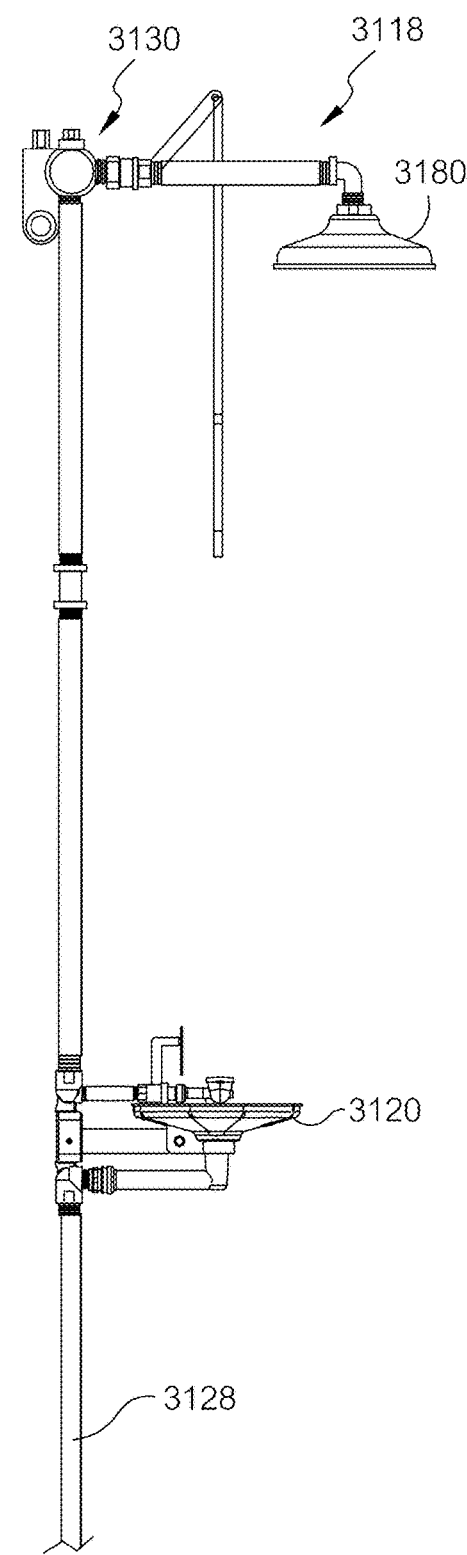
FIG. 61A  FIG. 61B

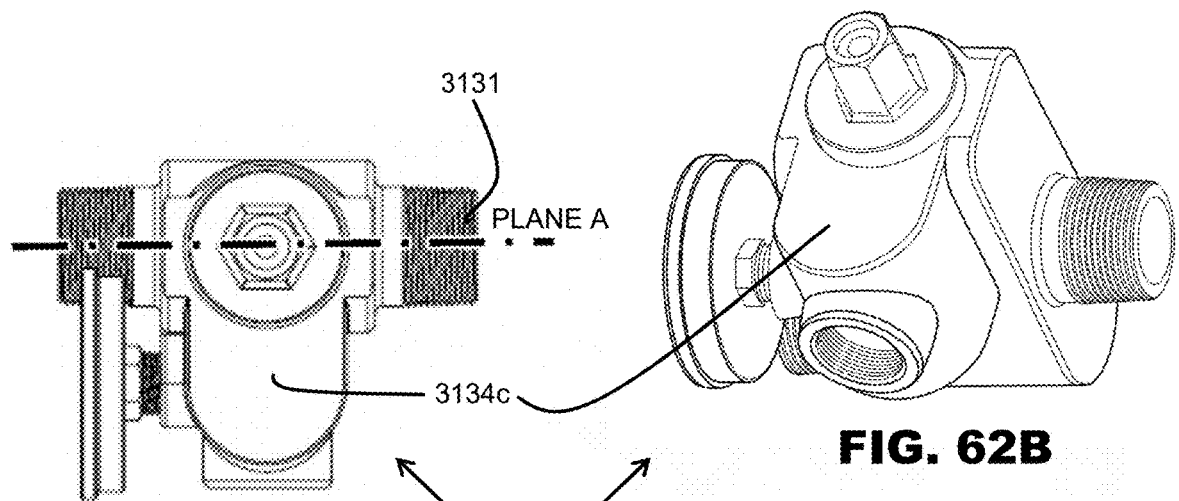
FIG. 62A
FIG. 62B
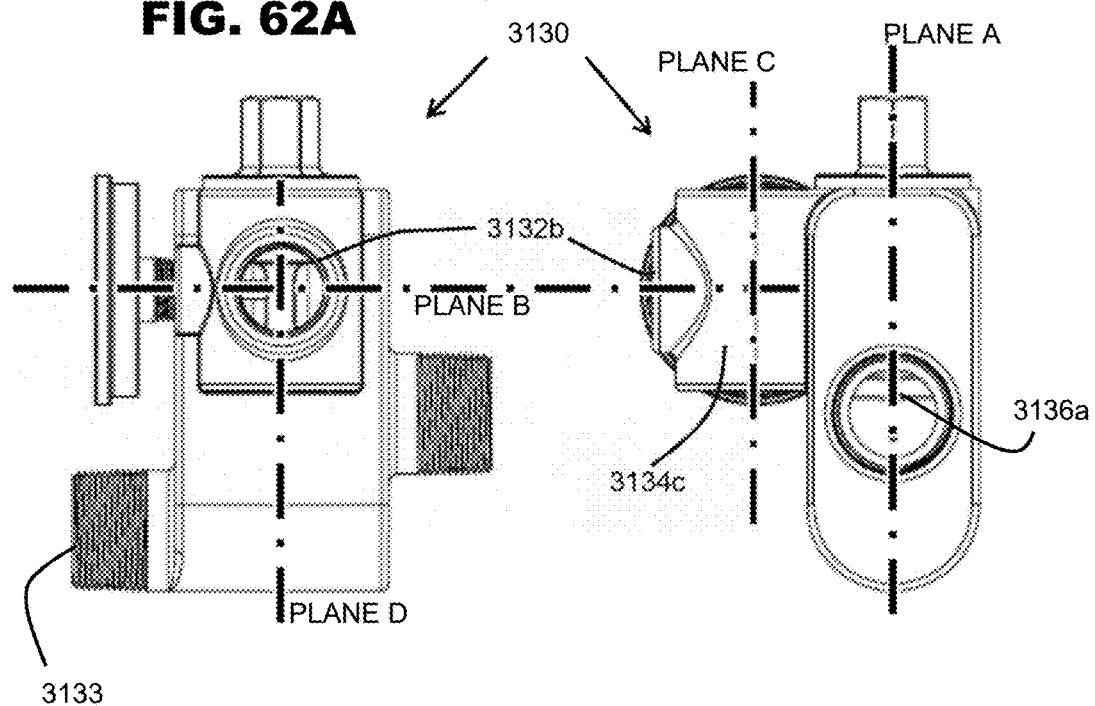
FIG. 62C
FIG. 62D

INTEGRATED EMERGENCY WASH AND SHOWER SYSTEM

CROSS REFERENCE TO RELATED APPLICATIONS

This application is a continuation of U.S. patent application Ser. No. 16/280,510, filed Feb. 20, 2019, now issued as U.S. Pat. No. 10,881,253, which is a continuation of U.S. patent application Ser. No. 15/207,194, filed Jul. 11, 2016, now issued as U.S. Pat. No. 10,213,058, which claims the benefit of priority to U.S. Provisional Patent Application Ser. No. 62/191,358, filed Jul. 11, 2015, titled INTEGRATED EMERGENCY WASH AND SHOWER SYSTEM, all of which are incorporated herein by reference.

FIELD OF THE INVENTION

Various embodiments of the present invention pertain to methods and apparatus for emergency washing, and in particular to eyewash, facewash, or bodywash apparatus.

BACKGROUND OF THE INVENTION

Emergency eyewashes and showers are used in a variety of industrial, educational, and governmental settings in which dangerous chemicals are present. Should a user's eyes become contaminated (or the user's body become contaminated) a nearby, easy to use, and safe emergency washing system can provide quick and thorough flushing of the contamination.

Often, these emergency wash systems are located in laboratories or manufacturing areas in which space is at a premium. Therefore, it becomes important to efficiently pack the wash system so that the required plumbing connections are easy and inexpensive to make, and further to use as little "real estate" relative either to the floor or the wall, especially because of pre-existing facilities that need to be plumbed around and designed around. Therefore, it becomes important for the emergency wash system to require as few components as possible, and combine various functions in a single device whenever possible.

Further, as the system and the system components become more tightly packed and various functions combined, it is important to maintain accurate mixing of the hot and cold streams. In some applications, the location and surroundings of the emergency wash system are already crowded with other plumbing, other components, electrical wiring, air ducts, and the like. Space on the manufacturing floor can be especially costly. Therefore, it is important to configure the components of the wash system such that they require relatively little space, and such that they take into account these pre-existing features. This makes the installer and maintainer of the wash system able to make a simple and quick of an installation (or perform maintenance) and not have to contend with other components. By providing this efficient packaging, the emergency wash system achieves two benefits: the wash systems are installed in more locations, and the wash systems are more effectively maintained.

Yet another factor that complicates the problems thus discussed is the desire to use less water in any new water-handling device. Emergency wash systems can benefit from lower flow rates by producing a gentler and more predictable upward stream of water to flush the user's eyes or face. If an emergency washing system is not comfortable, then it is less likely to be used, which defeats the purpose of the emergency wash system. It has been observed that some eye washing systems produce output sprays that are too strong or flow too high to be comfortably used.

Yet another aspect of a low flow emergency system according to some embodiments of the present invention is to provide tepid water by means of a thermostatically controlled cartridge valve that is adapted and configured to shut off the flow of how water if there is a failure of the thermostat. It has been found that an emergency washing system adapted and configured to provide a low flow rate of tepid water can be susceptible to variations as to overall low delivery pressures, as well as relative differences in pressure between the hot and cold inlets. It has been found that utilizing a thermostatically controlled valve assembly adapted and configured to provide a positive shut off in the event of a thermostat failure also provides improved operation of a low flow system.

What is needed are improvements that address one or more of the aforementioned problems. Various embodiments of the present invention provides such novel and nonobvious solutions.

SUMMARY OF THE INVENTION

Various embodiments of the present invention pertain to improvements in residential and emergency washing systems.

In some embodiments, there is a thermostatically controlled mixing valve that is adapted and configured to provide a sufficient flow of tepid water to more than one emergency fixture. Still further, some of these valves are configured such that they provide structural support to the emergency fixtures. Some embodiments of the present invention include a body for a mixing valve in which the water inlet and water mixing functions are placed in one portion of the valve, and the structural support functions are performed with a different portion of the valve body. In so doing, these two functions of precision mixing and structural support are spatially separated. Preferably, the structural support functions are provided in a portion of the body that is entirely on one side of the body. Therefore, any loads going in or out of this structural support section will not create stresses or distortion in the portion of the body that maintains the precision metering section. Structural loads can be maintained by such a thermostatically controlled valve, with no interactions of these loads on the fluid mixing operations performed by the valve.

Yet other embodiments of the present invention pertain to integrated washing systems in which a minimum number of components provide all the required safety washing functions within U.S. government safety guidelines, but further permit an overall system package that is space efficient, easy to install, easy to maintain, and low cost. As one example, in some embodiments the washing systems are provided with tempered, mixed fluid provided in straight-forward flow paths that double as structural support. In those systems in which there is a single thermostatically controlled valve, this valve can be located between the eyewash and shower in straight line fashion, or located at either of the two washing stations, supporting one of them in cantilevered fashion. Still further, various embodiments of the present invention include integrated thermostatically controlled valves in which the metering section is placed closest to the wall or other surface of the laboratory or production facility, with the outlet chamber of the mixing valve being spaced away from that same surface. Preferably, this spacing is sufficient to accommodate existing piping in the facility. For example, the inlet flowpath may be located directly against the surface, and likewise there may be other fluid flowpaths, electrical conduits, or the like located against that same surface. By spacing out the outlet chamber of the mixing valve away from this surface, it is easy for the installer to locate the emergency wash fixtures with little or no interference with the pre-existing surroundings.

On aspect of the present invention pertains to an emergency water washing system. Some embodiments include at least one spray assembly having an outlet that is upwardly directable. Yet other embodiments include a showerhead assembly located above the spray assembly with an outlet directed generally downward. Still further embodiments include a mixing valve assembly including a thermostatically controlled cartridge valve within a body having at least two tempered water outlets, the body including a first internal pocket adapted and configured to accept therein the thermostatic cartridge valve and a second internal pocket adapted and configured to provide tempered water to the outlets. One of the tempered water outlets provides tempered water to the inlet of the spray assembly, and the other of the tempered water outlets provides tempered water to the inlet of the showerhead assembly, and the portion of the body surrounding the second internal pocket provides structural support to at least one of the spray assembly or the showerhead assembly and provides a threaded pipe connection to the other of the spray assembly or the showerhead assembly.

Another aspect of the present invention pertains to an emergency water washing system. Some embodiments include at least one spray assembly having an inlet, the spray assembly having an outlet upwardly directable. Yet other embodiments include a showerhead assembly located above the spray assembly and having an inlet, the showerhead assembly having an outlet directed generally downward. Still further embodiments include a mixing valve assembly including a thermostatically controlled valve and a body having a hot water inlet and a cold water inlet, the axis of the hot water inlet being generally coplanar with the axis of the cold water inlet, and at least two tempered water outlets, the axes of the tempered water outlets being generally coplanar, and the plane of the inlets being displaced from the plane of the outlets.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 55A is a front elevational view of the apparatus of FIG. 52.

FIG. 55B is a right side elevational view of the apparatus of FIG. 52

FIG. 55C is a top plan, orthogonal view of the apparatus of FIG. 52

FIG. 61A is a side CAD perspective representation of a combined emergency wash system according to another embodiment of the present invention.

FIG. 61B is a side elevational line drawing of a combined emergency wash system according to yet another embodiment of the present invention, FIG. 62A is a top, plan line drawing of an apparatus according to another embodiment of the present invention.

FIG. 62B is a top, right, perspective line drawing of a shaded CAD representation of an apparatus according to another embodiment of the present invention.

FIG. 62C is a front elevational line view of an apparatus according to another embodiment of the present invention.

FIG. 62D is a right side elevational line drawing of an apparatus according to another embodiment of the present invention.

ELEMENT NUMBERING

Figure 1:
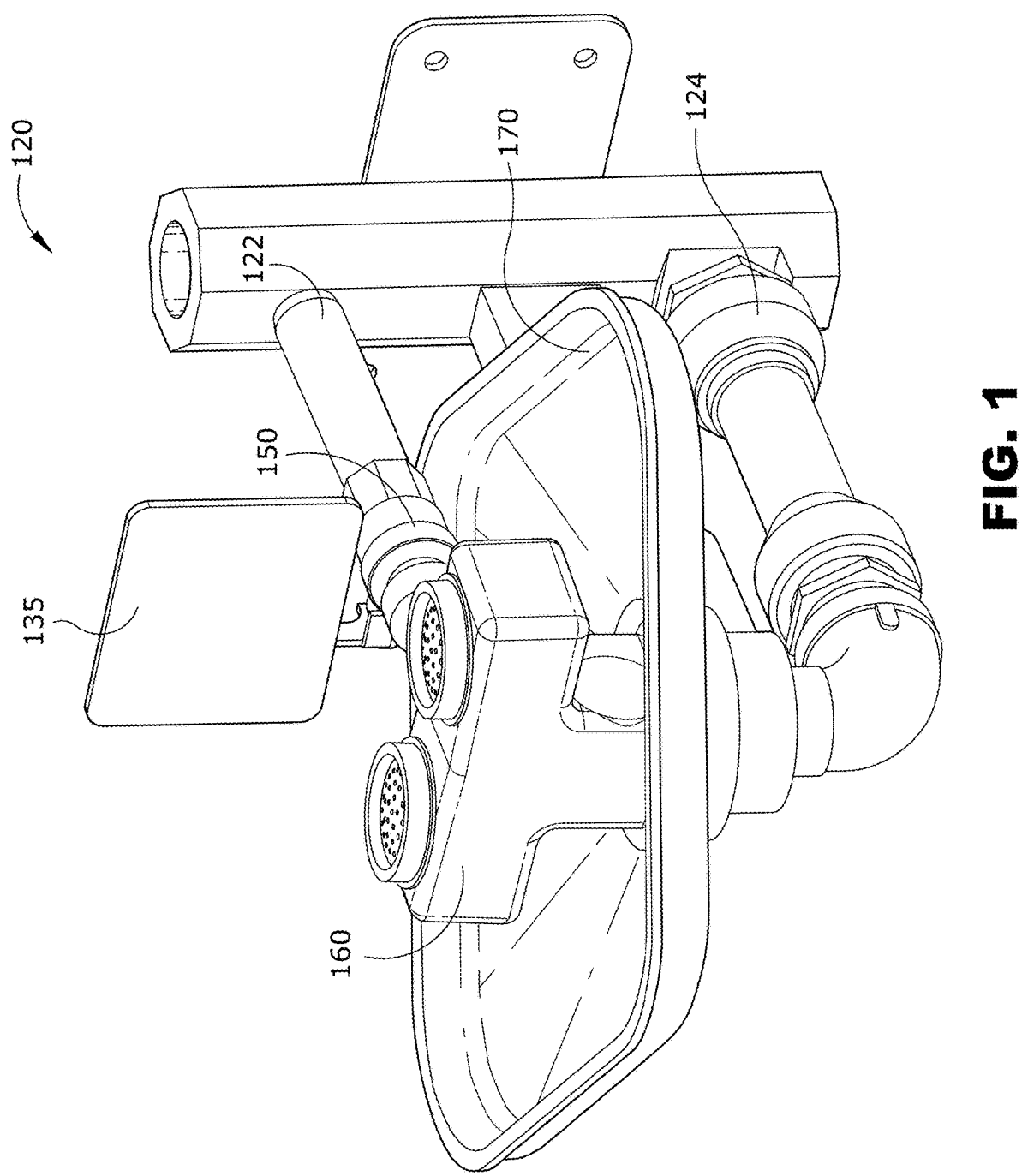
FIG. 1 is a right side, top perspective view of an emergency eye wash according to one embodiment of the present invention.

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 10 | System |
| 11 | cart |
| 12 | deck |
| 13 | legs |
| 14 | wheels |
| 15 | lid |
| 18 | combined emergency wash system |
| 18.2 | shower supply conduit |
| 18.1 | eyewash supply conduit |
| 20 | eye wash system |
| 21 | dispensing caps; spray nozzle assembly |
| a | apertures |
| b | smaller apertures |
| c | larger apertures |
| d | aerated faucet |
| 22 | water tank/cold water |
| 23 | quick connect fitting |
| 24 | hot source |
| 25 | support arm |
| b | support arm aperture |
| 26 | stand |
| 28 | drain |
| .1 | water return port |
| 29 | catch basin |
| 30 | thermostatically controlled valve |
| 31 | cold inlet |
| 32a | tempered fluid outlet; water supply to shutoff valve |
| b | tempered fluid outlet to shower |
| c | tempered fluid outlet |
| 33 | hot inlet |
| 34 | body; housing |
| a | first water compartment |
| b | second water compartment |
| c | outlet chamber |
| d | inlet chamber |
| 35 | panel |

-continued

| | |
|---|---|
| 36 | cartridge |
| a | first cartridge body |
| b | second cartridge body |
| c | thermostat |
| d | shuttle valve |
| e | spring |
| f | hot inlet |
| g | cold inlet |
| h | mixing chamber |
| i | mixed flow outlet |
| 37 | mixing outlets |
| 38 | metering section/flow restrictor |
| 39 | check valve |
| 40 | diffusing heat exchanger; accumulator |
| 41 | inlet |
| 42 | outlet |
| 43 | serpentine passage |
| 44 | apertures |
| 45 | 3-way valve assy. |
| 45a | lever |
| 45b | inlet |
| 45c | outlet |
| 45d | outlet |
| 46 | flush tube; flushing housing |
| .1 | supply equipment flush line; fluid conduit |
| .2 | system flush line |
| .3 | system flush line |
| .4 | coupling member |
| .5 | set screw |
| 47 | tee fitting |
| 50 | shut-off valve |
| 51 | quick connect |
| 52 | paddle shut-off |
| 53 | purge line |
| 56 | drain; adjustable drain |
| 57 | pressure modifying valve |
| .1 | pressure regulating valve |
| .2 | pressure reducing valve |
| .3 | pressure balancing valve |
| H | hot water |
| C | cold water |
| .4 | pressure communication line |
| a | groove |
| 58 | expulsion valve |
| a | inlet |
| b | outlet |
| c | flapper |
| d | spring |
| e | pushbutton |
| 60 | outlet valve; emergency eyewash housing; emergency eyewash assembly |
| 61 | body |
| a | indexing |
| 62 | internal flow passage |
| b | lateral internal chamber |
| c | central internal flow chamber |
| 63 | water inlet |
| a | secondary outlet |
| 64 | eyewash outlets |
| 64a | filters |
| 65 | internal connection |
| 66 | variable orifice valve; flow regulator; Neoperl ® flow control valve |
| a | fixed member |
| b | flexible member |
| 67 | interface |
| 68 | outlet |
| 69 | seal |
| 70 | return wash basin |
| 71 | indexing feature |
| 72 | drain; variable drain; fixed drain |
| 73 | attachment feature |
| 74 | tactile features |
| 75 | lip |
| 80 | shower head assembly |
| 80.1 | shutoff valve |
| 80.2 | actuating handle |
| 81 | inlet |
| 82 | bowl |

-continued

| | |
|---|---|
| 83 | depressions |
| 84 | dispersing member |
| 85 | stand offs |
| a | peripheral |
| b | central |
| 86 | central deflector |
| a | aligned aperture |
| b | central attachment |
| 87 | apertures |
| a | aligned aperture |
| 88 | ridges |
| 90 | heater |
| 90C | cold inlet |
| 91 | source of electricity |
| 92 | shock mounts |
| 94 | heat exchanger |
| 96 | thermal switch |
| 98 | visual indicator |
| a | light |
| b | battery |
| c | sensor, water or position |
| d | light emitting material |
| 99 | Thermometer |
| VCL | vertical center line |
| LCL | lateral center line |

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

The use of an N-series prefix for an element number (NXX.XX) refers to an element that is the same as the non-prefixed element (XX.XX) except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology.

Further, it is understood that the features 1020.1 and 20.1 may be backward compatible, such that a feature (NXX.XX) may include features compatible with other various embodiments (MXX.XX) as would be understood by those of ordinary skill in the art. This description convention also applies to the use of prime ('), double prime ("), and triple prime ('") suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Various references may be made to one or more methods of manufacturing. It is understood that these are by way of example only, and various embodiments of the invention can be fabricated in a wide variety of ways, such as by casting, centering, welding, electro-discharge machining, milling, as examples. Further, various other embodiment may be fabricated by any of the various additive manufacturing methods, some of which are referred to 3-D printing.

This document may use different words to describe the same element number, or to refer to an element number in a specific family of features (NXX.XX) It is understood that such multiple usage is not intended to provide a redefinition of any language herein. It is understood that such words demonstrate that the particular feature can be considered in various linguistical ways, such ways not necessarily being additive or exclusive.

Reference will be made to an eyewash system and various components of the system. It is understood that the system and various components are further compatible with face wash and body wash systems and components.

Various embodiments of the present invention pertain to a novel thermostatically controlled mixing valve that permits new methods of placement of an emergency wash system within a laboratory, manufacturing facility, or other location. In one embodiment, the emergency wash system uses a single thermostatically controlled mixing valve to provide tempered water to both an eye/face wash and a shower. Mixing valves according to some embodiments of the present invention provide for this capability by placing the mixed fluid outlets in a location in which there will be little or no physical interference of the plumbing with the cold water inlet and hot water inlet. Some currently available mixing valves provide a single outlet, and in some cases only sufficient flow for a single fixture. Such installations may require multiple valves, which results in an increase in cost and space used. Further, these currently available mixing valves may require various plumbing components to bifurcate the outlet flow, while at the same time needing other plumbing components to further avoid the water inlets.

Various embodiments of the present invention overcome these shortcomings of currently available mixing valves. In some embodiments of the present invention, the thermostatic mixing valve is located in a body in which the valve mechanism itself (and also the inlets) are grouped together, and physically separated from the outlets. In one embodiment, the mixing valve includes a thermostat having an axis that is generally coplanar to the axes of the inlets, or at least in close proximity to the axes of the inlets. The outlets of the valve define outlet axes that are generally coplanar, and in a plane that is separated from the plane of the thermostat and inlets. Preferably, this displacement is greater than the diameter of a tube used in the plumbing (i.e., more than about one inch). Although what is shown and described herein are inlets generally within one plane and outlets generally in another plane, it is understood that in yet other embodiments the inlets may deviate slightly from being coplanar, as well as the outlets may deviate slightly from being coplanar, but can still be provided with packaging that spatially separates the inlets and outlets.

In still further embodiments, the mixing valve includes a thermostatic cartridge valve located in a unitary cast housing. The pocket for the cartridge valve is substantially coplanar with the hot and cold inlets. Tempered, mixed water is provided from the outlet subchamber of the cartridge valve to an outlet chamber of the body that is displaced laterally relative to the plane of the inlet axes. This displaced outlet chamber includes provisions for threaded connections in as many as three axes—forward, top-to-bottom, and right-to-left, although some embodiments include fewer than three axes of outlets. By displacing the inlets and the outlets, the maintenance personnel, both at time of installation and later during usage, have the freedom to extend plumbing lines, both inlet and outlet, with the inlet plumbing being free of physical interference with the outlet plumbing because of the spatial displacement of the inlets relative to the outlets.

In still further embodiments, the cartridge valve is sealed by O-rings within a pocket of a one piece body. The cartridge valve provides mixed water to an outlet chamber that is displaced from the pocket. In some embodiments, the connection of the outlet chamber to the shower and/or eye/face wash can be a direct, load-bearing connection (as one example, a showerhead can extend in a forward direction with a connection that is cantilevered from the outlet chamber). Likewise, the mixing valve can be located below the eyewash, such that the outlet port of the mixing valve supports some or all of the weight of the eye/face wash and showerhead assemblies, as well as their plumbing.

However, the acceptance of these mounting and support loads in the body of the valve, even if substantial, does not affect the operation of the mixing valve. One reason for this is that the outlet chamber is physically displaced from the cartridge valve pocket. Therefore, the load path of the outlet plumbing extends through the body material surrounding the outlet chamber, but does not extend into the body material surrounding the cartridge valve pocket. Therefore, the pocket surrounding the cartridge valve is not loaded by the weight of the fixtures. Therefore, the valve body can support the weight of the fixtures—even cantilevered—with little or no distortion of the cartridge valve pocket. The loads go into the outlet chamber and go out of the outlet chamber. There is little or no transition of loads from the outlet chamber to the inlet chamber. In addition, the cartridge valve is sealed within the body with O-rings to form a cold inlet subchamber, a hot inlet subchamber, and a mixed flow subchamber. By using O-rings as the interface, any slight flexing or distortion of the cartridge pocket is not passed into the cartridge valve, but simply deforms the O-rings.

In yet another embodiment of the present invention, the mixing valve includes inlets for hot and cold water that are located on generally opposite sides of the valve, and preferably inlets that are substantially parallel with one another. Further, the center lines of these inlets are displaced forward from the back surface of the valve (i.e., the side of the valve opposite of the side having the outlet chamber) by more than the diameter of the pipe that will be used in plumbing (more than one inch). In those valves in which the outlet chamber further provides structural support for the showerhead and/or eye/face wash, the conduits providing both tempered water to these fixtures as well as support of these fixtures are likewise spaced apart from the wall of the lab or manufacturing facility. This outlet plumbing then runs cleanly up and down, or laterally without interfering with other types of plumbing that may be attached to the same wall and located proximate to the emergency wash. Since this other plumbing (other water lines, air lines, drains, etc.) are avoided, the overall installation is greatly simplified. This not only makes the initial installation more cost-effective, but further increases the reliability of this safety equipment by making it easier to maintain it.

In yet other embodiments of the present invention, the use of a single thermostatically controlled valve to provide tempered water to two fixtures simultaneously is facilitated by the use of flow regulators. For example, each of the showerhead and the eye/face wash fixtures can include a flow regulator such that of the Neopurl® type described herein. In yet further embodiments, these flow regulators can be incorporated directly into the outlet chamber of the body. By controlling and limiting the total flow from the valve, the size of the cartridge valve and the size of the body can be kept small so as to further facilitate cost-effective placement within a lab or manufacturing facility.

Some embodiments of the present invention pertain to eyewash systems that include thermostatically controlled valves with positive shut-off of the hot water inlet if there are certain failures of the valve. Further explanation of this operation will be provided later in this text. Still further support for a thermostatically controlled valve having a failure mode that results in a positive shut-off of hot water can be found in U.S. Pat. No. 8,544,760, titled MIXING VALVE, incorporated herein by reference to the extent necessary to provide support for any claims.

Some embodiments of the present invention pertain to methods and apparatus for providing a proper flushing of the plumbing of a building that provides water to an emergency washing system. In some embodiments, the emergency washing system includes a shut off valve receiving water from the building plumbing, the shut off valve including any style of quick-connect, water-tight fittings. The shut off valve provides water through the quick connection fitting to an emergency eye wash housing. The inlet of the eye wash housing includes a second quick-connecting, water-tight inlet that readily and easily connects to the outlet of the shut off valve. The eyewash housing further includes a flow control valve that permits the passage of water at a substantially constant flow rate, even as the source system pressure varies over a range of supply pressures. The washing system further includes a plurality of upwardly-directed spray nozzles that receive the constant flow rate water and spray the water upwards in a pattern that preferably complies with both governmental standards and industry best practices to provide water onto the eyes of a user looking down at the spray nozzles.

Still other embodiments of the present invention pertain to a low flow emergency eye washing system. Preferably, some embodiments include an electric water and a thermostatically controlled mixing assembly, both of which receive water from a source of pressurized water. The mixing assembly further receives heated water from the electric heater. The mixing assembly comprises a body adapted and configured to receive a cartridge valve. The cartridge valve includes a thermostat that controls the position of a movable valve member so as to provide controlled mixing of the hot water and source water. The cartridge valve is adapted and configured such that the movable valve member is biased by a spring to shut off the supply of water from the water heater in the event of the failure of the thermostat.

The water mixed by the cartridge valve Flows from an outlet of the mixing assembly to a flow control valve that is adapted and configured to provide a constant outlet flow, even as the water pressure of the source varies over a range. In some embodiments, the flow control valve operates to limit the outlet flow to less than about two gallons per minute. In yet other embodiments, the constant flow is less than about one and a half gallons per minute.

The controlled, constant flow of mixed water is provided to the inlet of an emergency eyewash assembly. The assembly flowpath incudes an internal chamber that receives water from the inlet, the internal chamber having a cross sectional flow area that is substantially larger than the cross sectional flow area of the inlet. Because of this large increase in area, there is a subsequent substantial decrease in the velocity of the water as it flows into the chamber. The exit of the flow chamber has a cross sectional flow area that is preferably about the same as the cross sectional area of the internal chamber. Therefore, water flowing from the inlet into the chamber is provided uniformly and in parallel to a plurality of spray nozzles present at the outlet. The spray nozzle includes a plurality of small apertures, each aperture being supplied with mixed water at substantially the same pressure as each other aperture.

In yet other embodiments the eyewash assembly includes a single inlet that provides water to a pair of large, laterally placed internal chambers simultaneously. Each of the internal chambers has substantially the same cross sectional flow area and flow characteristics. Each of the chambers receives mixed water through the inlet at a first, relatively high velocity. Because of the large increase in flow area along the internal flowpath, this mixed water incurs a substantial decrease in velocity within the chamber. Each chamber terminates in a corresponding outlet that provides mixed water in parallel to each of a plurality of small spray apertures. In some embodiments, the internal chambers are sized so as to promote laminar flow within the chamber.

Yet another aspect of a low flow emergency system according to some embodiments of the present invention is to provide tepid water by means of a thermostatically controlled cartridge valve that is adapted and configured to shut off the flow of how water if there is a failure of the thermostat. It has been found that an emergency washing system adapted and configured to provide a low flow rate of tepid water can be susceptible to variations as to overall low delivery pressures, as well as relative differences in pressure between the hot and cold inlets. It has been found that utilizing a thermostatically controlled valve assembly adapted and configured to provide a positive shut off in the event of a thermostat failure also provides improved operation of a low flow system.

Yet another embodiment of the present invention pertains to an emergency washing system in which there is a thermostatically controlled mixing valve that not only provides controlled mixing of hot and cold water flows, but further provides structural support to a catch basin. In one embodiment, the emergency washing system includes an eyewash housing that includes a plurality of upwardly-directed spray nozzles, and a catch basin located beneath the spray nozzles. Tepid water from the mixing valve exits the spray nozzles in a gentle upward pattern, and the water falls back under the influence of gravity onto the catch basin, where the water is collected in a draining aperture. Tempered water for the eyewash housing and spray nozzles is provided from a thermostatically controlled mixing valve. The valve includes a body (preferably but not necessarily a casting) that has two separate and distinct water compartments. Preferably the water compartments are placed vertically, with a first compartment located directly above a second compartment. Located between the two water compartments is a structural portion of the valve body that defines a support aperture.

The first water compartment is pressurized with water that is substantially at the pressure at the water source. The body includes an inlet for hot water and an inlet for cold water. These inlets provide water to a thermostatic cartridge valve, which provides for controlled mixing of the two flows of water to achieve a tepid-temperature mixed water. This mixed water is provided from the outlet of the first water compartment to the eyewash housing.

The second water compartment is substantially at atmospheric pressure. The second water compartment includes an inlet that receives water collected in the drain of the catch basin. This second water compartment further includes an outlet for directing this drain water to water return of the plumbing system, which is typically in fluid communication with a municipal sewer system.

The central support structure of the mixing valve body includes a support aperture. One end of a readily separable support arm is received within this aperture. The other end of the support arm is coupled to the catch basin. Any force applied to the catch basin can be transmitted through the support arm into the structure of the body surrounding the support aperture. Mixing valves constructed in this three part matter (top water compartment, middle basin support structure, and bottom water compartment) efficiently provides for multiple attachment of a plurality of connections onto a single structure, thus providing an emergency washing system that is quick, efficient, and cheap to construct and install, and which makes more efficient use of the inherent strength in the walls of a valve body. In some embodiments, the body includes three water inlets (hot water, cold water, and drained water), two fluid outlets (mixed water and return water), and structural support of the catch basin with a strength that is in excess of the strength attainable in currently existing eyewash systems.

Eyewash 120 includes and valve block 160 provided with water from an inlet 122, and providing a spray of water through a pair of eyepieces 121 to a person needing an emergency eyewash. Apparatus 120 can be attached to a wall by a support bracket 126, which can be coupled to an attachment plate 124 attached to the wall. Water flowing out of block 160 is captured in a bowl 170 that provides the water to and outlet drain 124.

Figure 2:
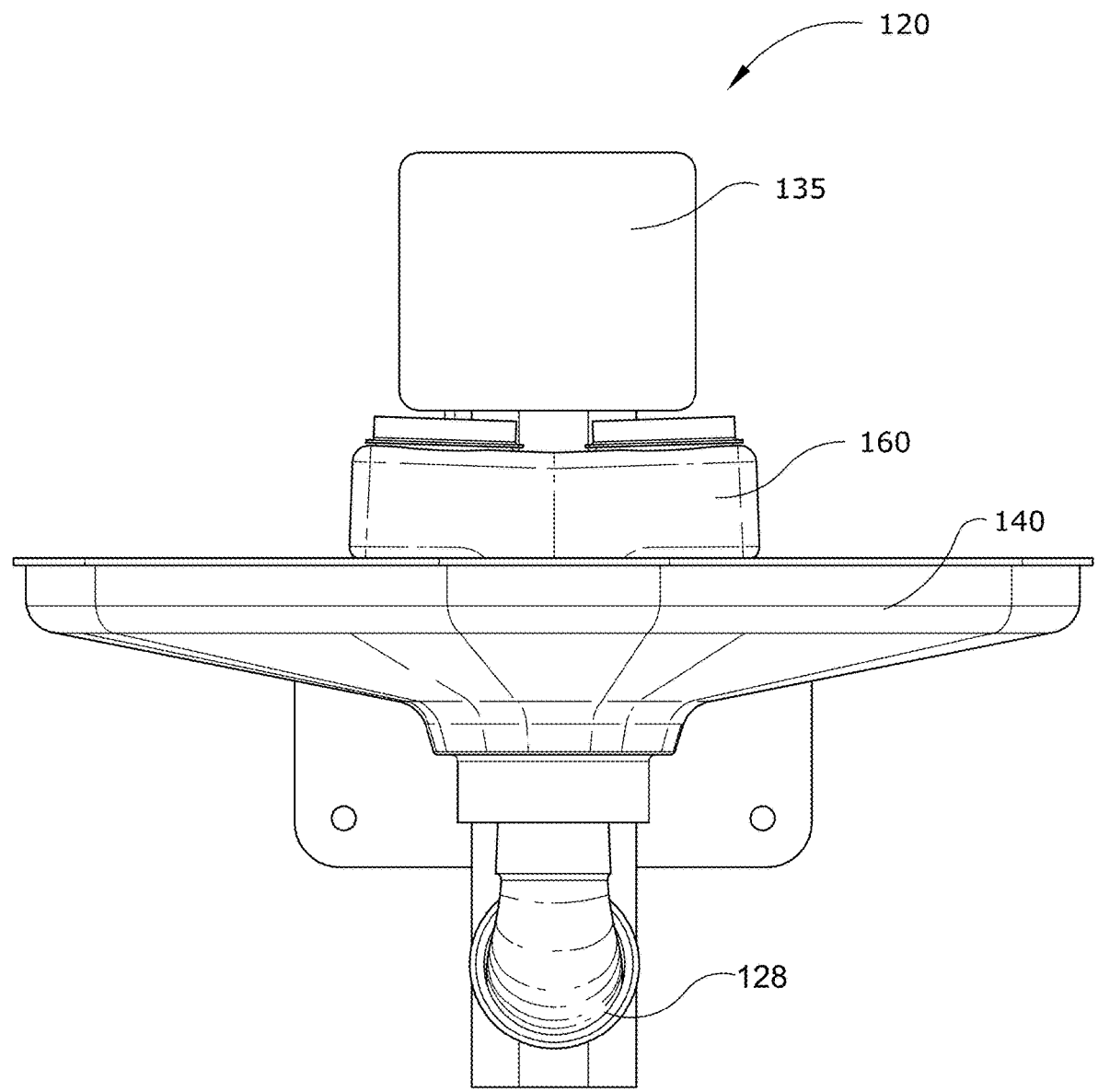
FIG. 2 is a front elevational view of the apparatus of FIG. 1
Figure 3:
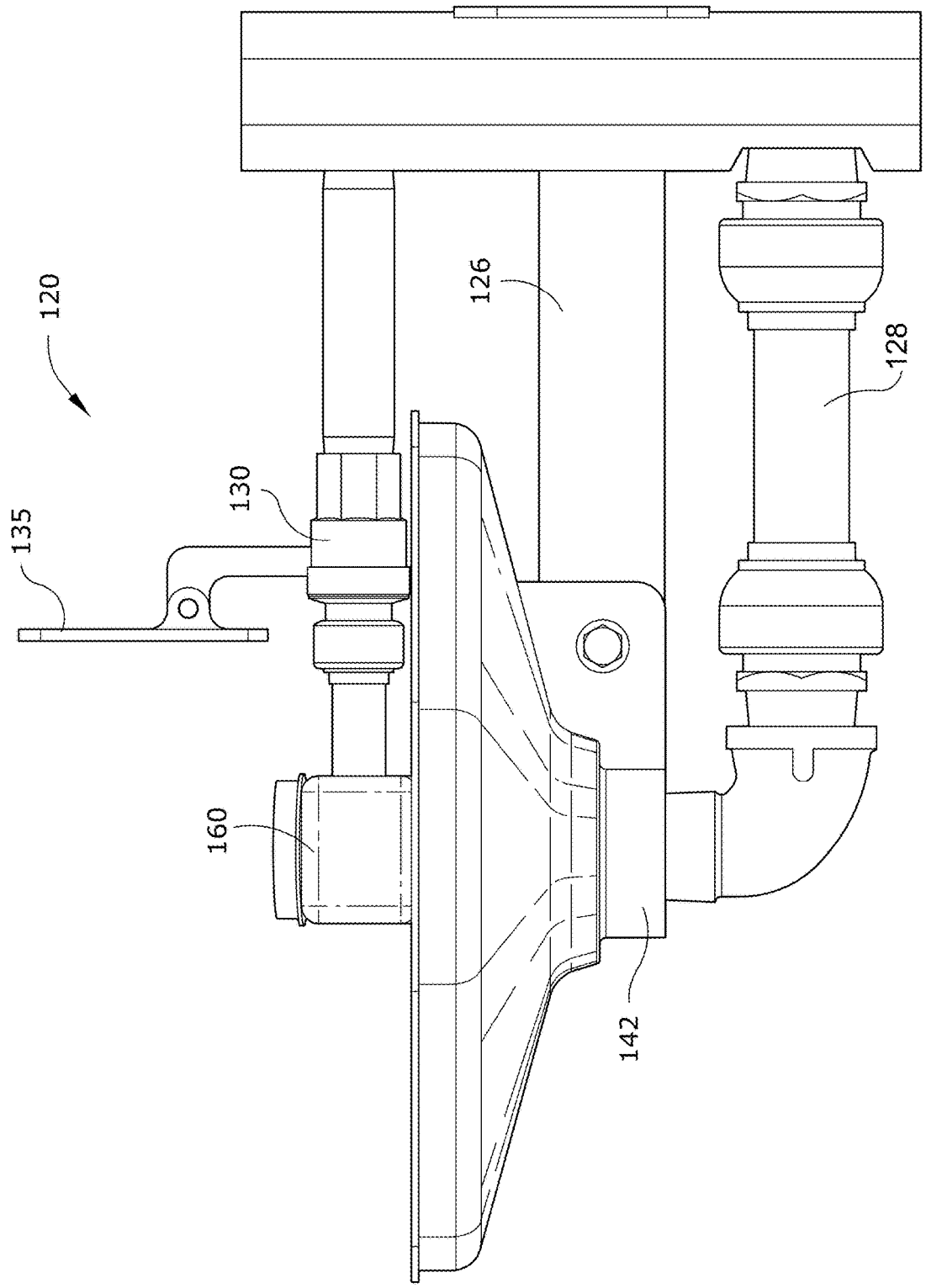
FIG. 3 is a side elevational view of the apparatus of FIG. 1

Eyewash 120 includes a shutoff valve 160 that must be actuated by the user before water will exit from eyepieces 121. As best seen in FIGS. 1-3, shutoff valve 160 is placed in the central inlet line 122, and in some embodiments is a ball-type valve. The ball can be rotated so as to begin the flow of water by the user pushing forward on centrally located paddle 152. Panel 135 is connected by an arm of 136 to the axis of ball valve 150. Preferably, panel 135 is centrally located relative to eyepieces 121, so that persons that are left-handed can use eyewash 120 as easily as persons that are right-handed.

It has been found that other emergency eyewash typically have a mechanism on the right side of the eyewash that must be operated in order to achieve the washing flow. With such eyewash is, a person that is left-handed is largely put at a disadvantage, and may waste time trying to locate the right-handed mechanism. Further, panel 152 is up right and prominent, making it easy to see. In some embodiments, panel 152 includes a large, substantially flat surface upon which warning labels and instructional labels can be applied.

Figure 4:
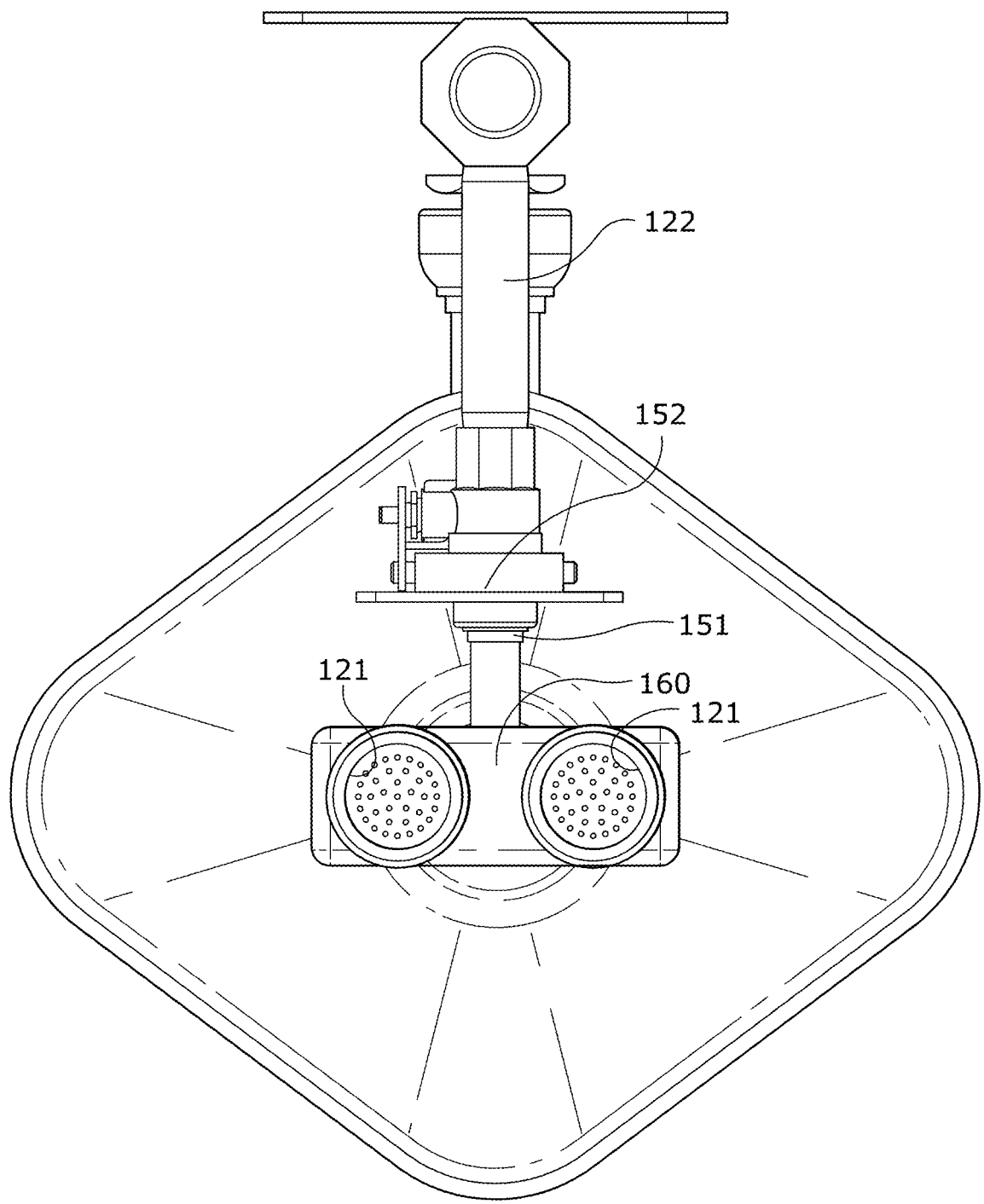
FIG. 4 is a top plan view of the apparatus of FIG. 1.
Figure 5:
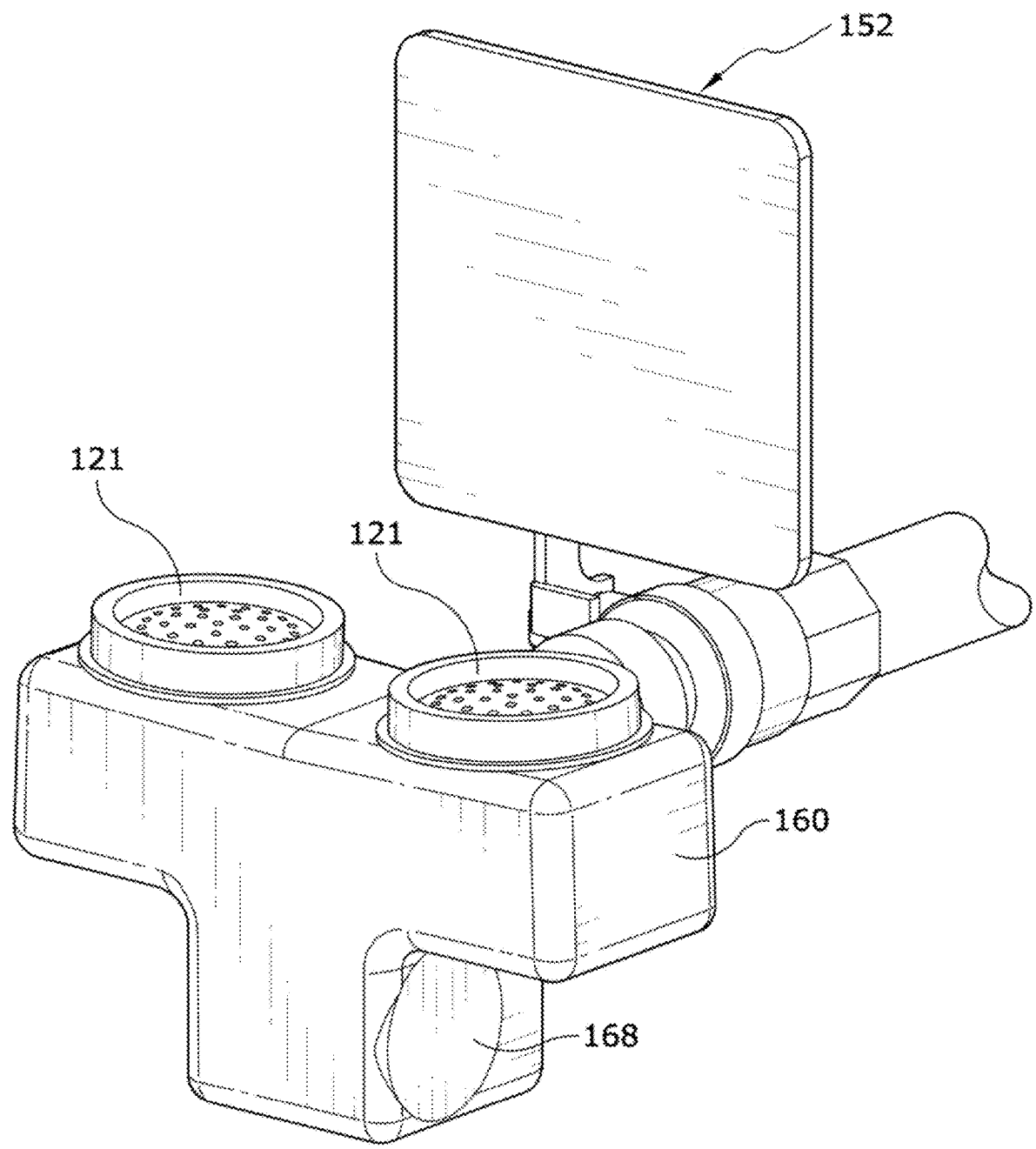
FIG. 5 is a right side perspective view of a portion of the apparatus of FIG. 1.
Figure 6:
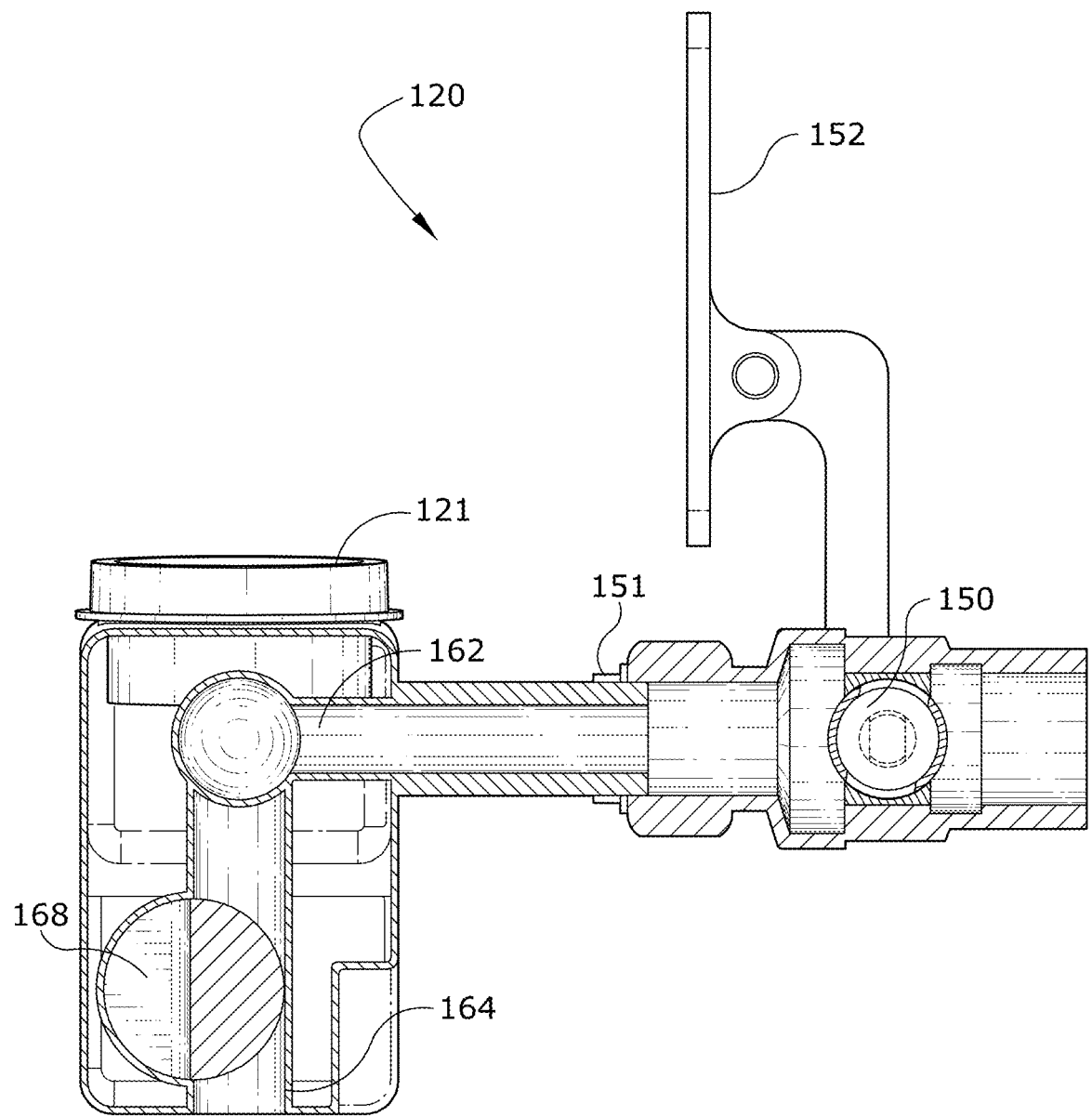
FIG. 6 is a right side cross-sectional view of the apparatus of FIG. 5, shown in solid.
Figure 7:
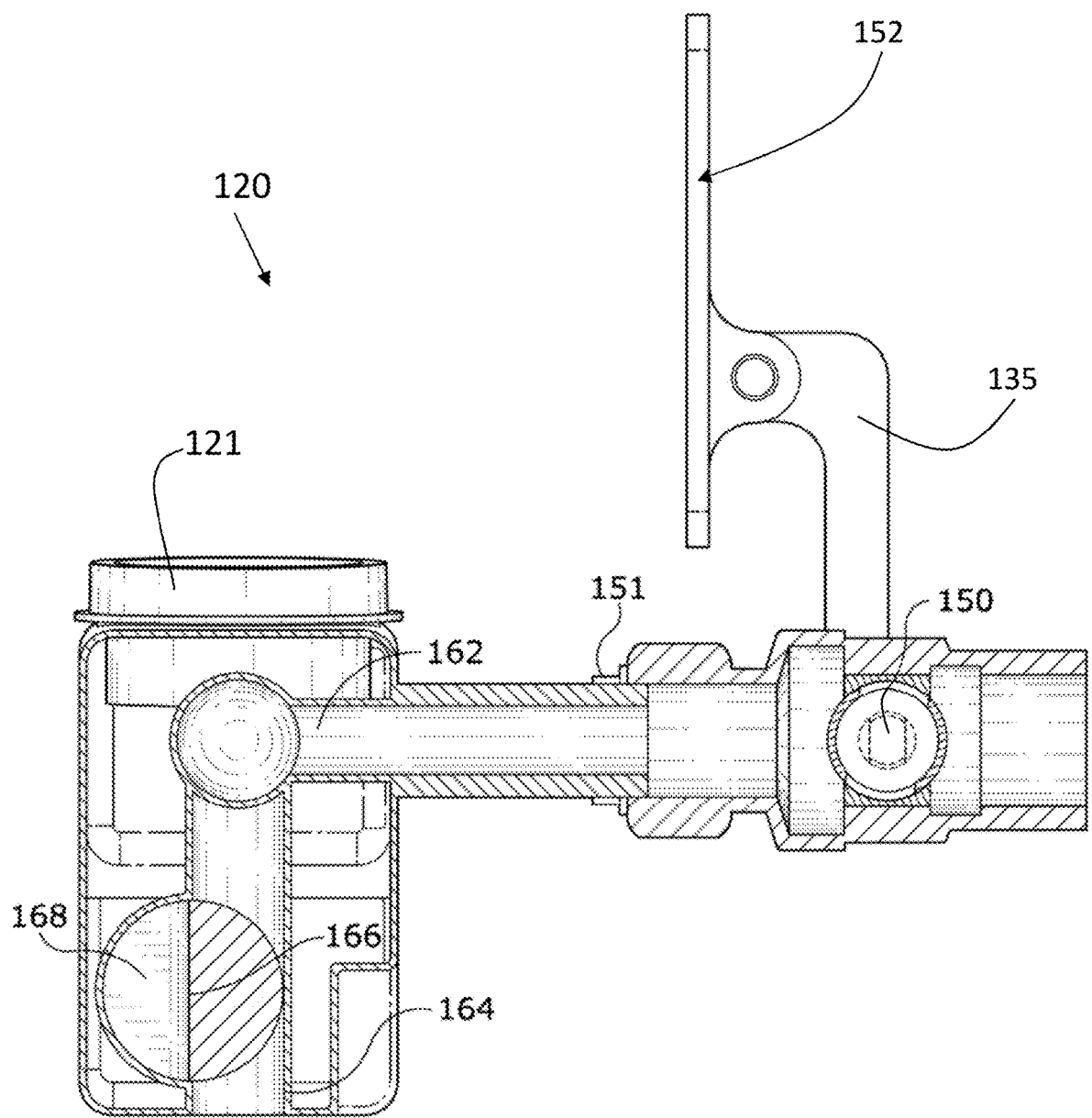
FIG. 7 is a right side cross sectional view of the apparatus of FIG. 5, shown in shaded illustration view.
Figure 8:
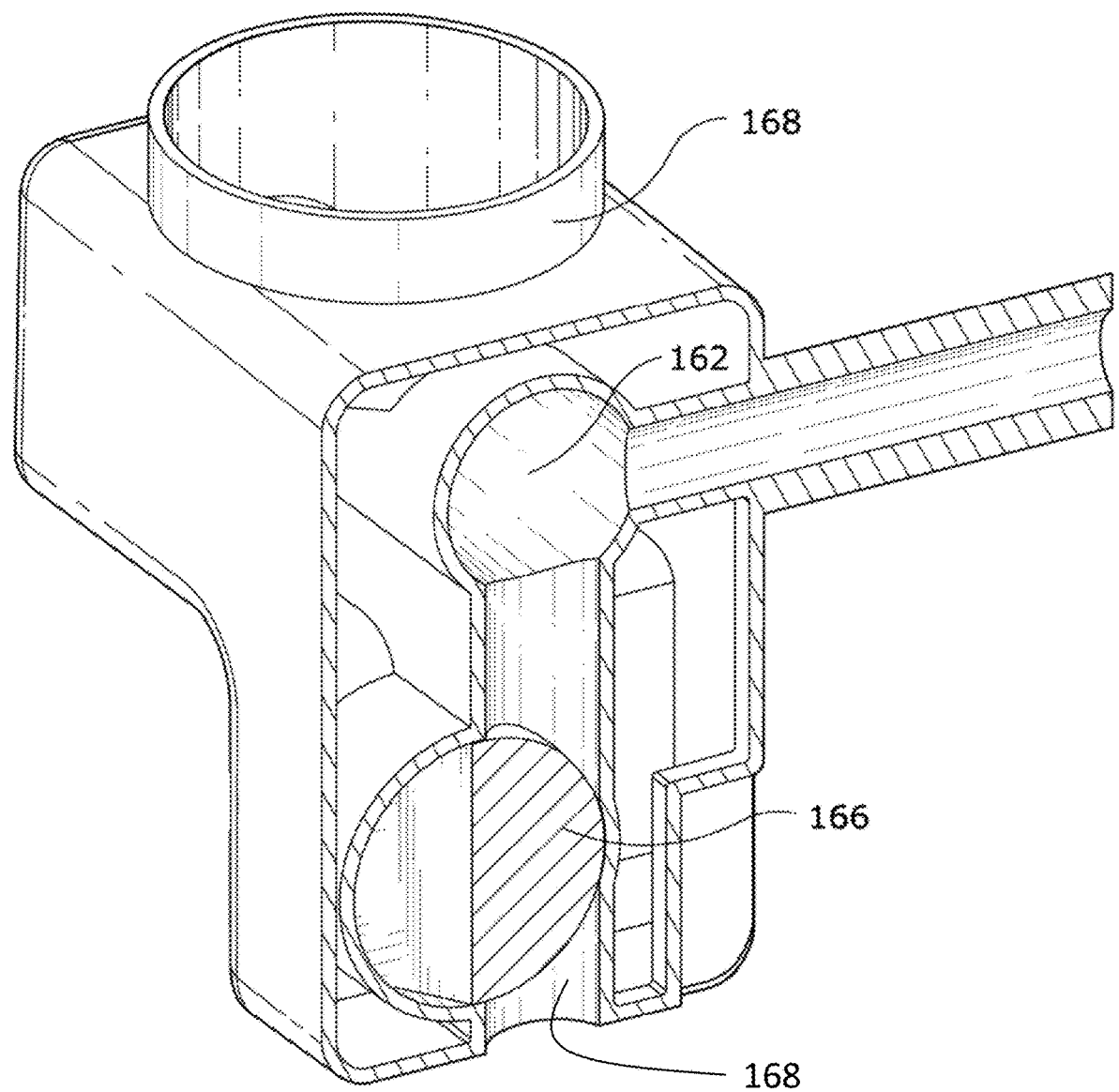
FIG. 8 is a right, top, perspective cutaway of the apparatus of FIG. 7.

Referring to FIG. 4, head block 160 connects to shutoff valve 160 by way of a 2 and quick-release seal 169. In some embodiments, seal 169 includes a plurality of "shark teeth" that can provide a quickly-made seal between the inlet pipe of head block 160 and the outlet of shutoff valve 130.

In some embodiments head block 160 includes right and left hinged panels by which the user can quickly disconnect head block 160 from eyewash 120. The person can place their fingers on the panels, and rotate the paddles such that the distal ends of the paddles press against the face of seal 160. In so doing, the user can easily remove head block 160 by simply pulling it toward them while the seals are compressed. Preferably, head block 160 is not mechanically linked to the drain of bowl 170, such that the connection between the inlet pipe of the head block and the outlet of the shutoff valve is the only connection that needs to be made.

FIGS. 5, 6, 7 and 8 show various details of head block 160 and shutoff valve 150. It can be seen that head block 160 includes an inlet passage 162 that provides water from shutoff valve 130 to a central manifold 164. Manifold 164 extends both right and left toward eyepieces 150, and further extends downward toward a cavity 168.

In some embodiments, cavity 168 includes material for conditioning the water that is sprayed out of eyepieces 121. This material can be a filter material, activated charcoal, and astringent, or other apparatus useful to protect and wash eyes that have been exposed to a damaging chemical. Further, this protective material can be easily removed from head block 160, which is useful for those protective materials that lose their beneficial qualities after a period of time.

Figure 9:
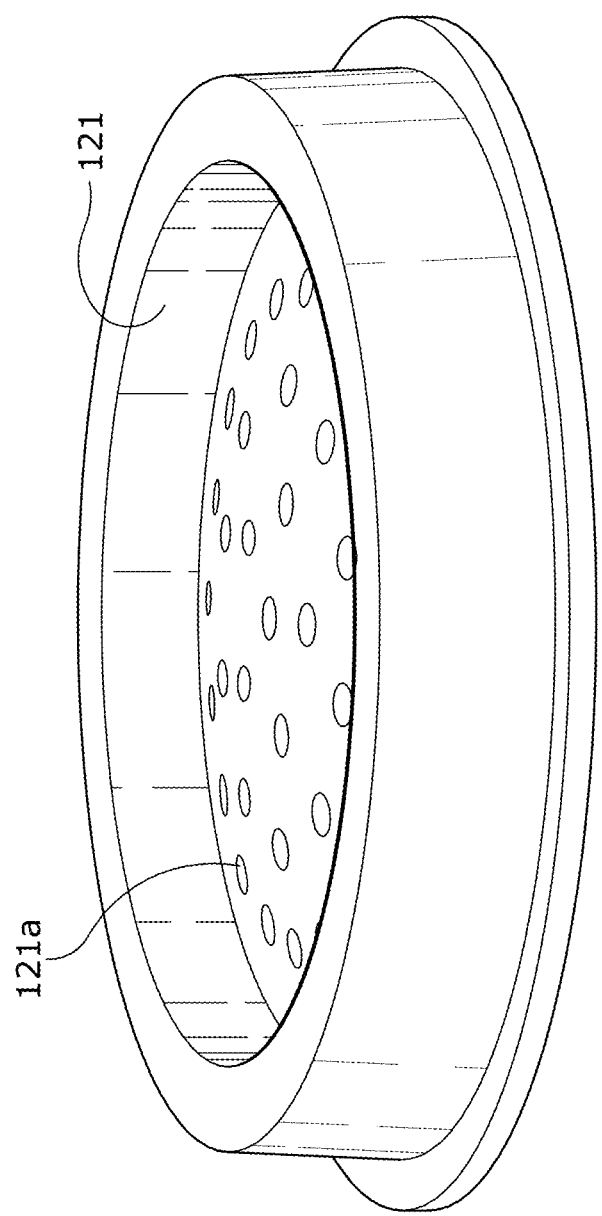
FIG. 9 is a top, perspective view of an eyepiece according to one embodiment of the present invention.

FIG. 9 shows a close-up of an eyepiece 121. Eyepiece 150 includes a plurality of spray holes, some of which are located in and outermost ring 152, others of which are located in a metal ring 154, and yet others that are centrally located. Eyepiece 150 further includes a sealing lip 156 that provides for easy installation and removal of eyepiece 150. Preferably, eyepiece 150 is fabricated from a flexible material that a person can easily manipulate to break off scale deposits.

Figure 10:
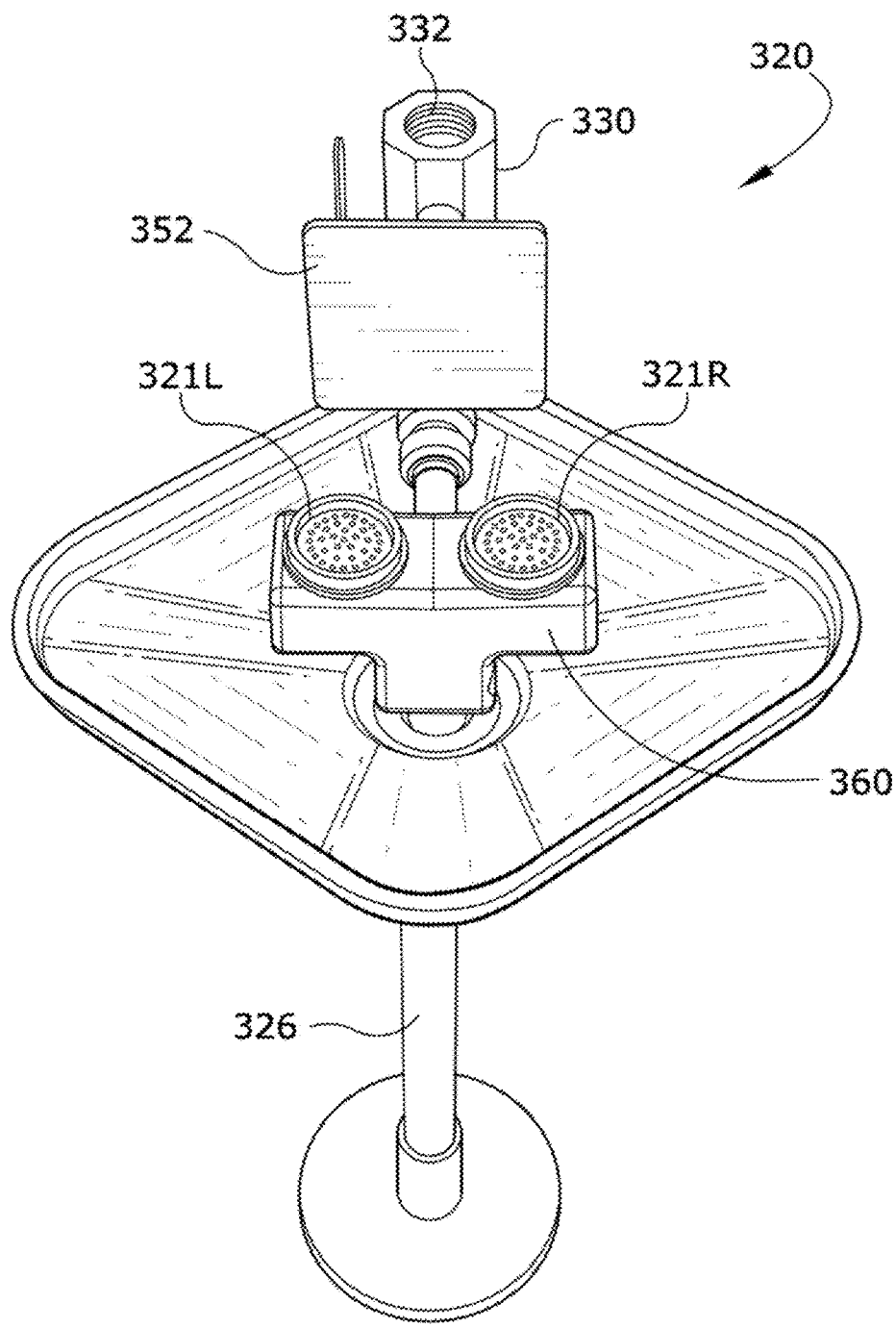
FIG. 10 is a front, top, perspective view line drawing of a photographic representation of an apparatus according to one embodiment of the present invention.
Figure 13:
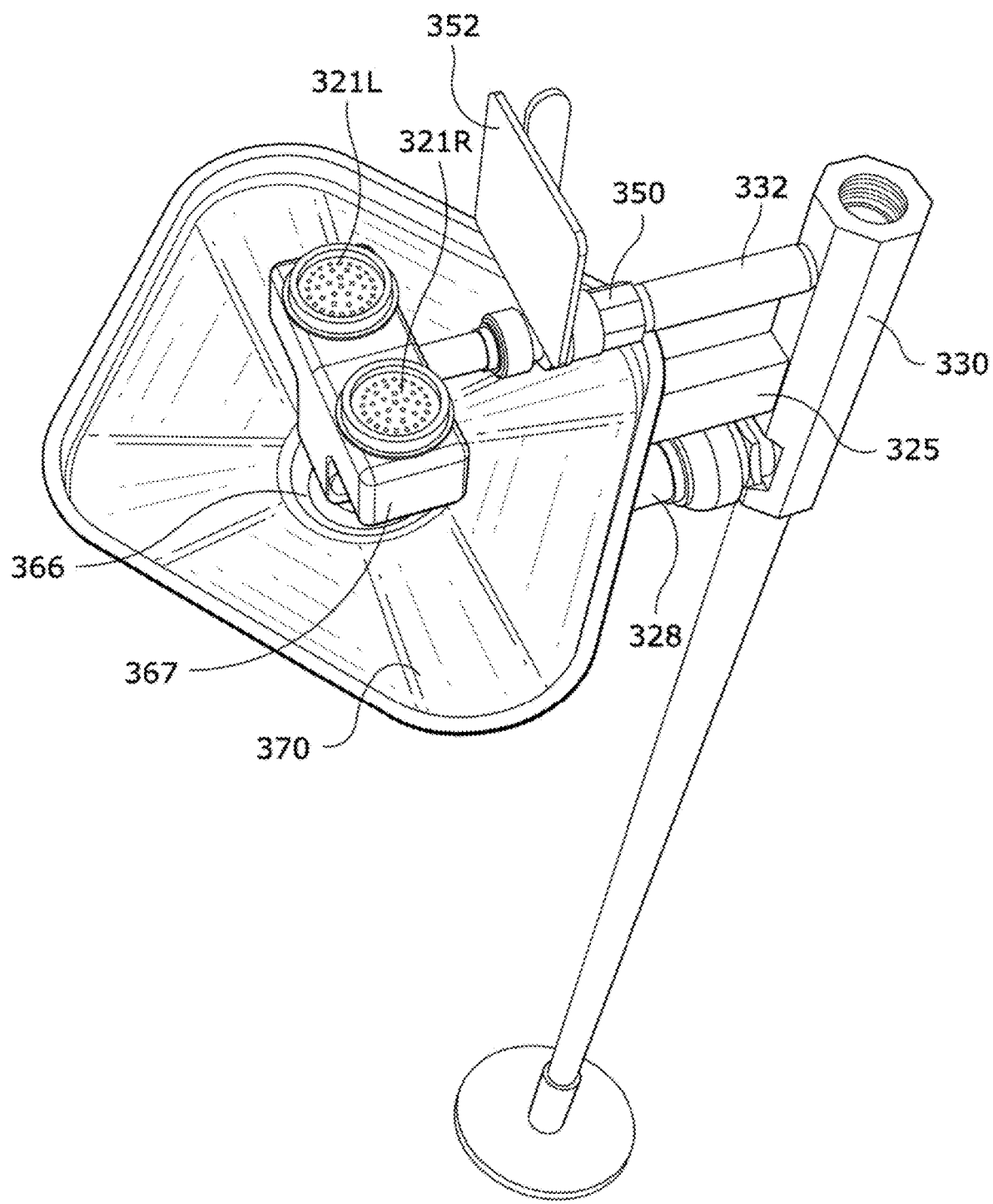
FIG. 13 is a top and side perspective line drawing of a photographic representation of the apparatus of FIG. 10.

FIGS. 10 and 13 show various views of an emergency wash 320 according to one embodiment of the present invention. Emergency wash system 320 includes a thermostatically controlled valve 330 that provides tempered water to a pair of eyewash dispensing caps 321, and in some embodiments, further provides tempered water through a top outlet 332 to a showerhead assembly 380.

Figure 14:
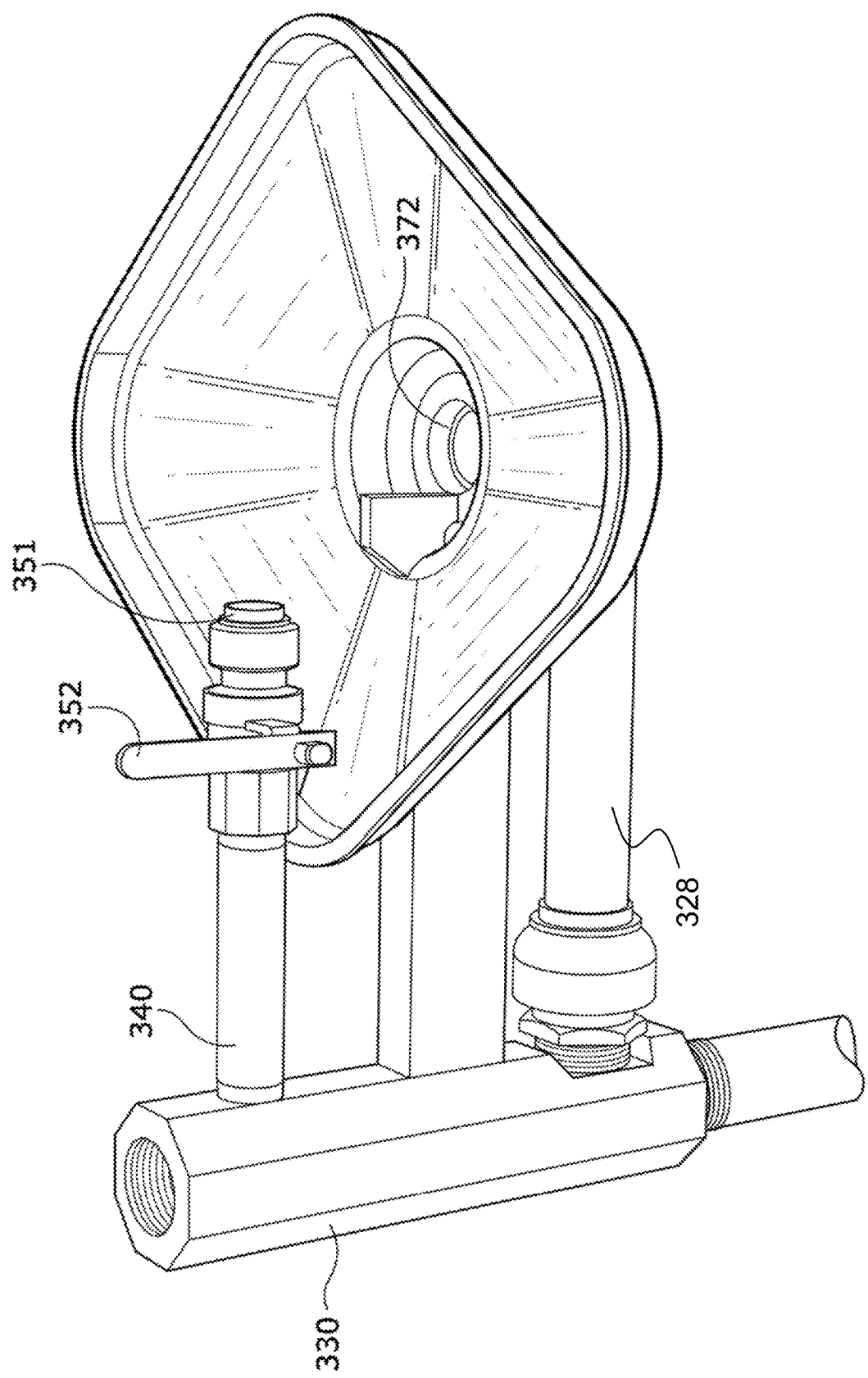
FIG. 14 is a left side, top perspective line drawing of a photographic representation of the apparatus of FIG. 10.

Control valve 330 (and other portions of wash assembly 320) is supported from the floor by a stand 326. Preferably stand 326 and system 320 are adapted and configured such that dispensing caps 321 are located at a height that is wheelchair accessible. Further, as best seen in FIGS. 13 and 14, the return line 328 from basin 370 extends rearward so as to provide a clear volume underneath return line 328 to accommodate the front of the wheelchair.

Water is provided to control valve 330 from a source 322 of cold fluid and a source 324 of hot fluid. In some embodiments, hot source 324 receives water from the outlet of a water heater (not shown). In some embodiments, water from one or both of the sources 322 and 324 flows through a flow restrictor that provides generally constant flow, such as the variable restrictors sold by Neoperl.

Figure 11:
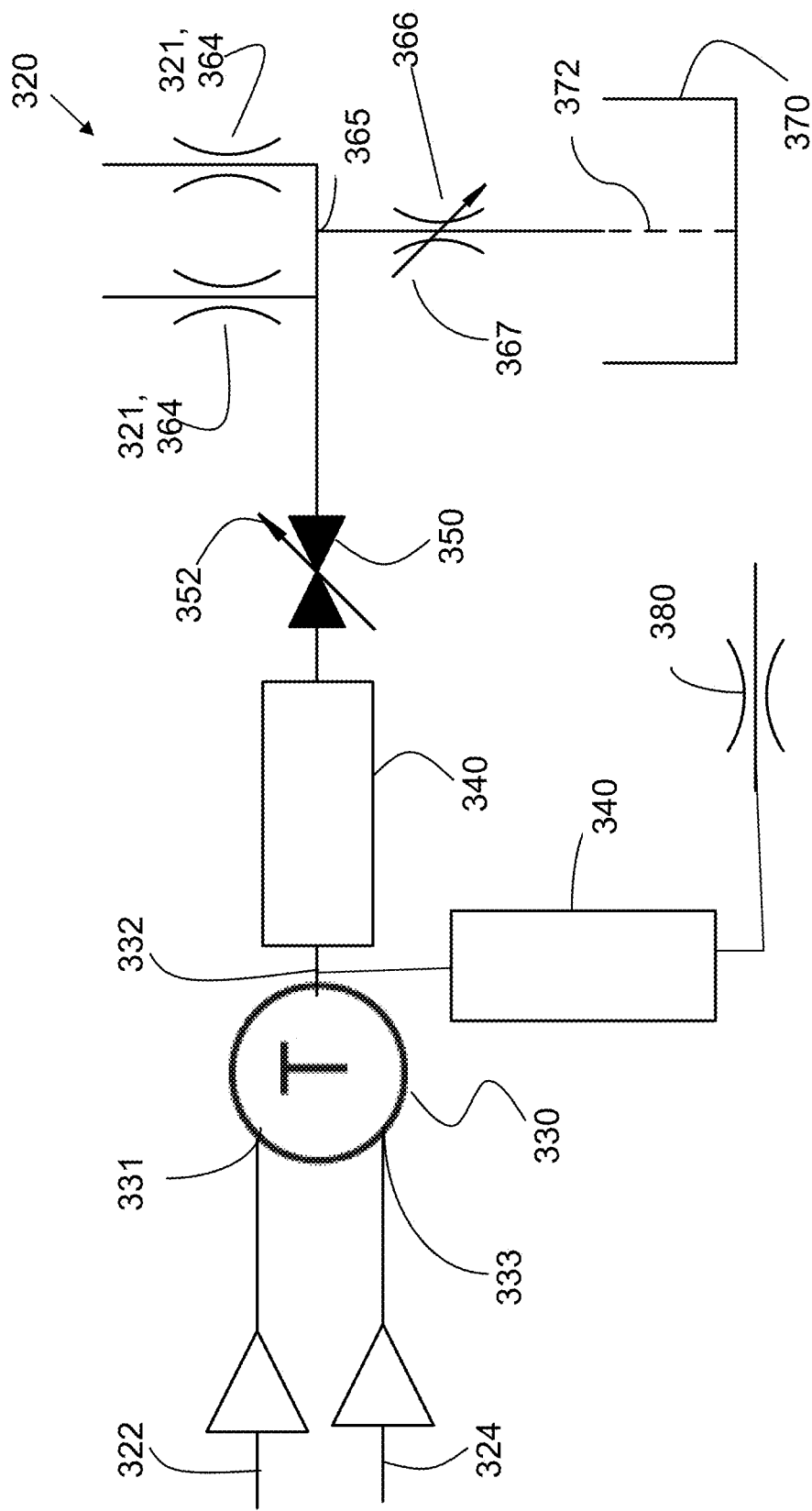
FIG. 11 is a symbolic schematic representation of the flow system of the apparatus of FIG. 10.
Figure 15:
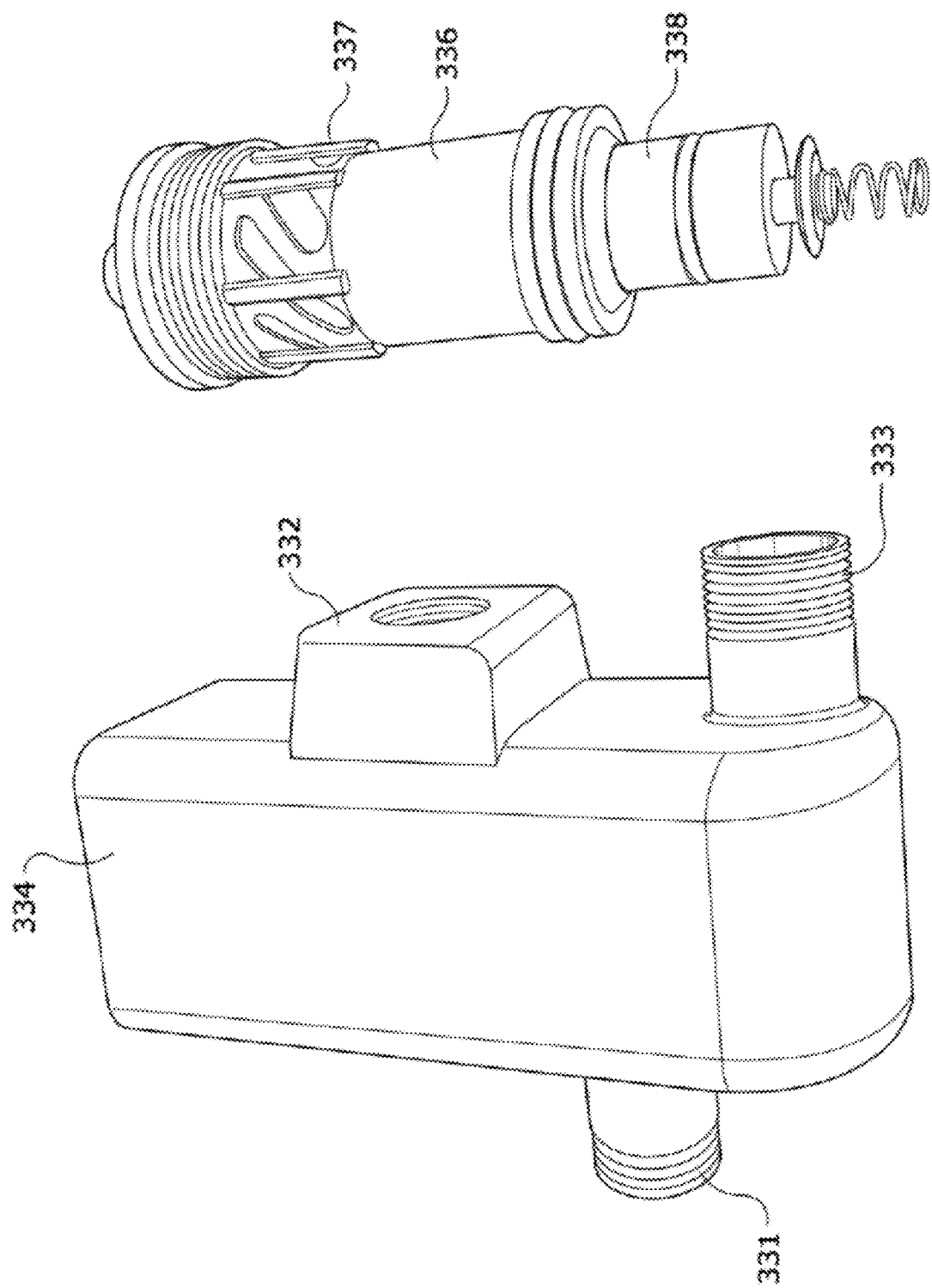
FIG. 15A is a line drawing of a photographic representation of a portion of the thermostatic control valve from the apparatus of FIG. 10.
FIG. 15B is line drawings from a photographic representation of a portion of the thermostatic control valve from the apparatus FIG. 10.

FIG. 11 shows a simplified schematic representation of symbols representing the flowpath of a system 320 according to one embodiment of the present invention. Cold water source 322 and hot water source 324 provide water to hot and cold inlets 331 and 333, respectively, of thermostatically controlled valve 330. Referring briefly to FIGS. 15A and 15B, valve 330 includes a cartridge valve 336 received within a body 334. Cartridge 336 includes a metering section 338 that controls the flow of hot water to a thermostat (not shown) within cartridge 336. The mixture of hot and cold water exiting metering section 338 is turbulently mixed by one or more mixing outlets 337, and then provided to an outlet 332 as tempered water. Mixing outlets 337 are adapted and configured to provide turbulent mixing of hot and cold flows within valves 330. Further examples of such means for creating turbulence or mixing can be found in U.S. patent application Ser. No. 13/657,218, filed 22 Oct. 2012, and titled METHODS AND APPARATUS FOR CREATING TURBULENCE IN A THERMOSTATIC MIXING VALVE, incorporated herein by reference.

As shown in FIGS. 15A and 15B, body 334 includes a single tempered outlet 332 that provides tempered water to the eyewash dispensing caps 321. However, yet other embodiments include an additional tempered fluid outlet 332 that provides tempered water to the showerhead assembly 380, such as by the top mounted outlet 332 best seen in FIG. 10.

Figure 12:
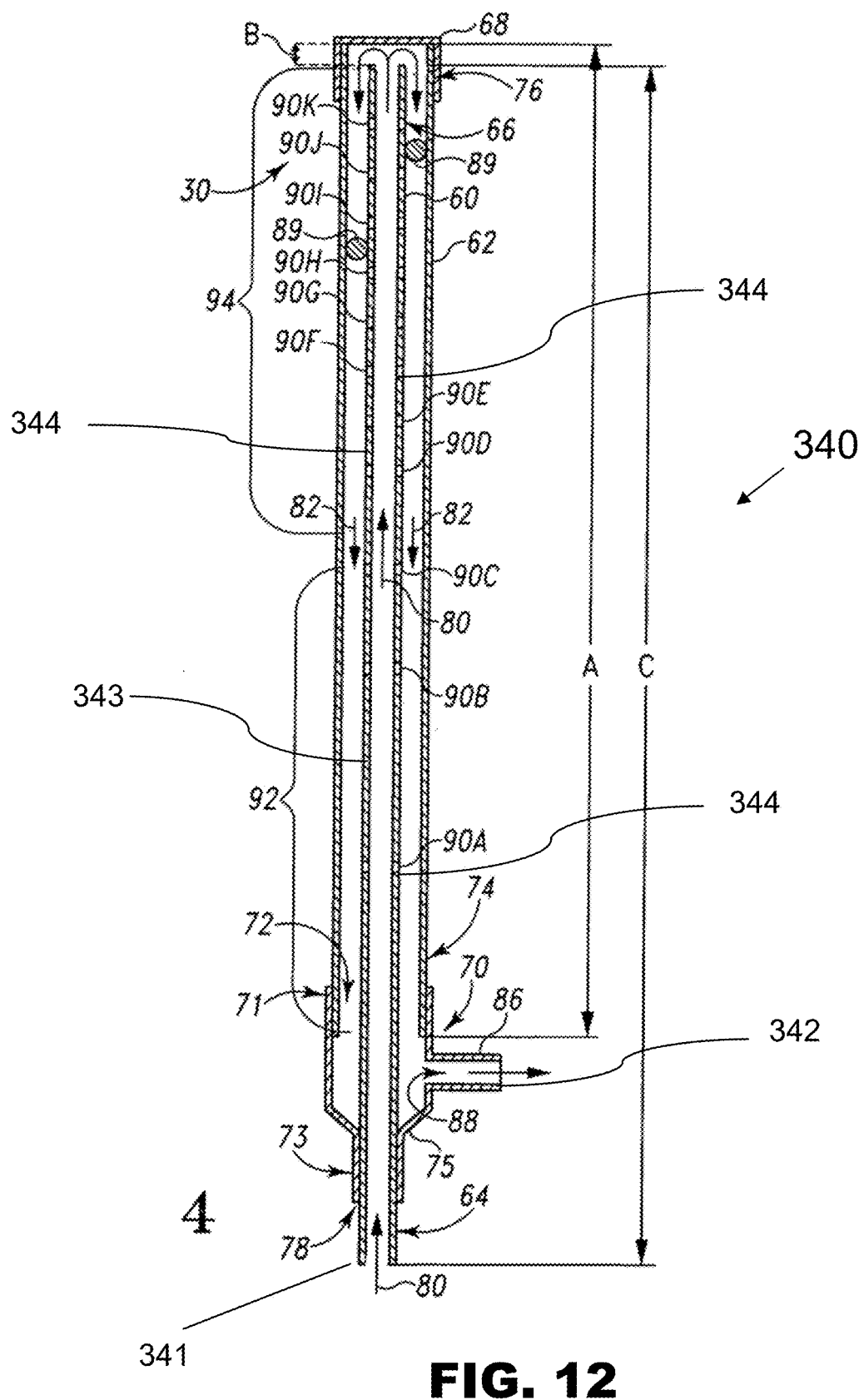
FIG. 12 is a cutaway side view of an accumulator (diffuser) according to one embodiment of the present invention.

Referring again to FIG. 11, the tempered fluid exiting valve 330 from outlet 332 passes through an accumulator (diffuser) 340 in some embodiments. A cross-sectional view of accumulator (diffuser) 340 in one embodiment is shown in FIG. 12. Diffuser 340 includes an inlet 341 and outlet 342 that are in fluid communication by way of a serpentine passage 343. Passage 343 includes a plurality of apertures in the sidewalls of the passageway that encourage fluid mixing along the length of the passageway. Further discussion of diffuser 340 can be found in U.S. patent application Ser. No. 13/213,811, filed Aug. 19, 2011, SYSTEM AND METHOD FOR PROVIDING TEMPERED FLUID, incorporated herein by reference, such discussion of the diffuser being incorporated herein by reference. Diffuser 340 reduces any sharp temperature rise that would otherwise be seen when tempered water first flows out of the outlet 332 valve 330. It is further understood that a second diffuser 340 can further be installed in the fluid pathway from the outlet of control valve 332 showerhead assembly 380.

Tempered fluid exiting accumulator (diffuser) 340 flows to a manually operated, normally closed shutoff valve 350. In one embodiment, valve 350 is a ball valve. A paddle and handle 352 control the state of shutoff valve 350. Referring to FIGS. 10 and 13, it can be seen that handle 352 is located generally in the center of return basin 370, and behind the eyewash dispensing caps 321. With this central design, paddle 352 is readily accessed by either left-handed or right-handed persons needing an eyewash. To open valve 350, paddle 352 (and its handle) are pushed backwards, away from dispensing caps 321. Preferably, the outlet of valve 350 includes a quick disconnect type of fitting, so as to facilitate removal of outlet valve 360.

Water exiting shell 350 is provided to dispensing valve 360. Valve 360 includes three separate flow channels: two eyewash outlets 364 that provide tempered water to dispensing caps 321, and a variable orifice 356 that provides fluid to drain 372. In some embodiments valve 360 includes an internal chamber for receiving a filter, such as a charcoal filter. Preferably, valve 360 is coupled to valve 350 by a quick connect coupling that permits easy removal and replacement (or refurbishment) of valve 360. Preferably valve 360 is adapted and configured such that there are no internal volumes in which water is permitted to sit when system 320 is not in use. Instead, after a user has opened shutoff valve 350 for emergency wash, any water within valve 360 flows out of outlet 368 and into drain 372.

Figure 16:
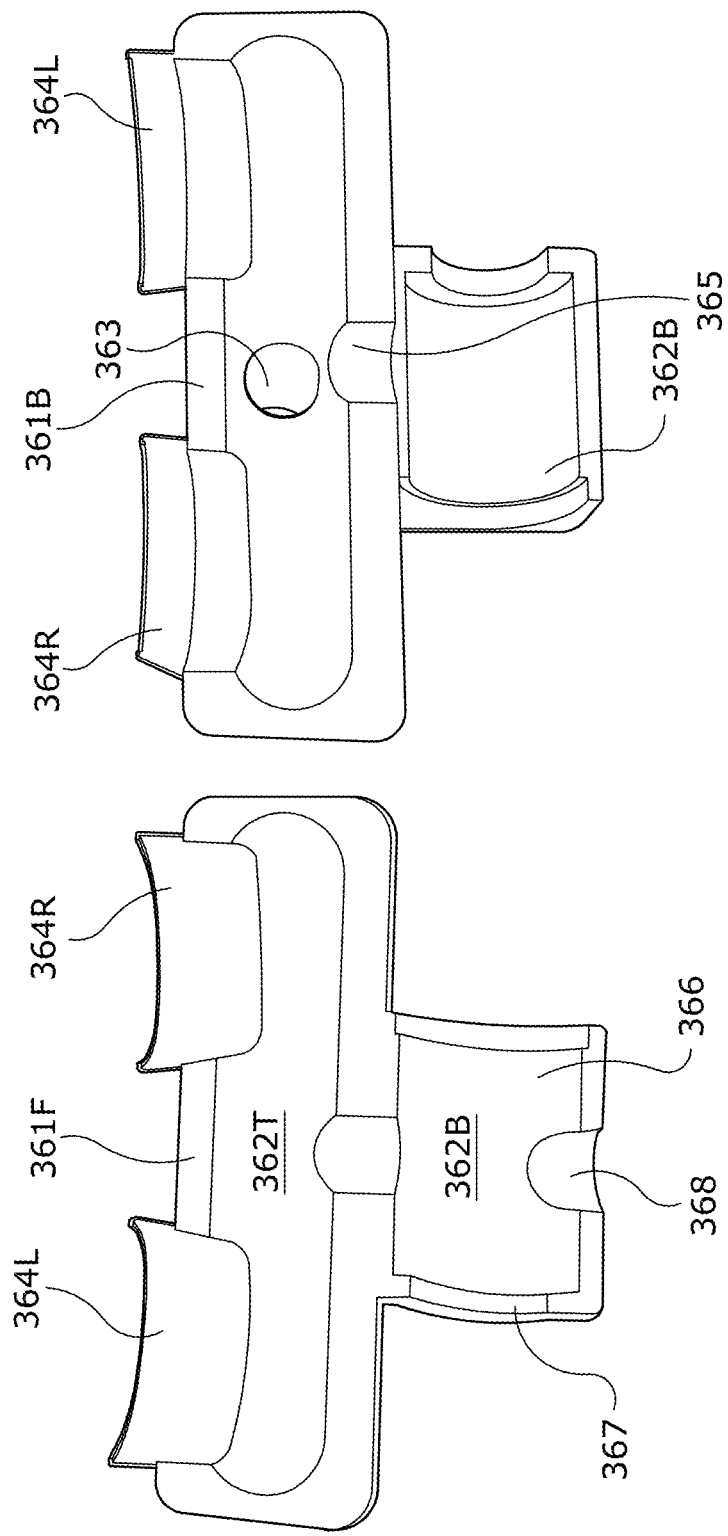
FIG. 16A is a line drawing of a photographic representation of the front half of the eye/face wash block (outlet valve) of FIG. 10.
FIG. 16B is a line drawing of a photographic representation of the back half of the eye/face wash block (outlet valve) of FIG. 10.
Figure 17:
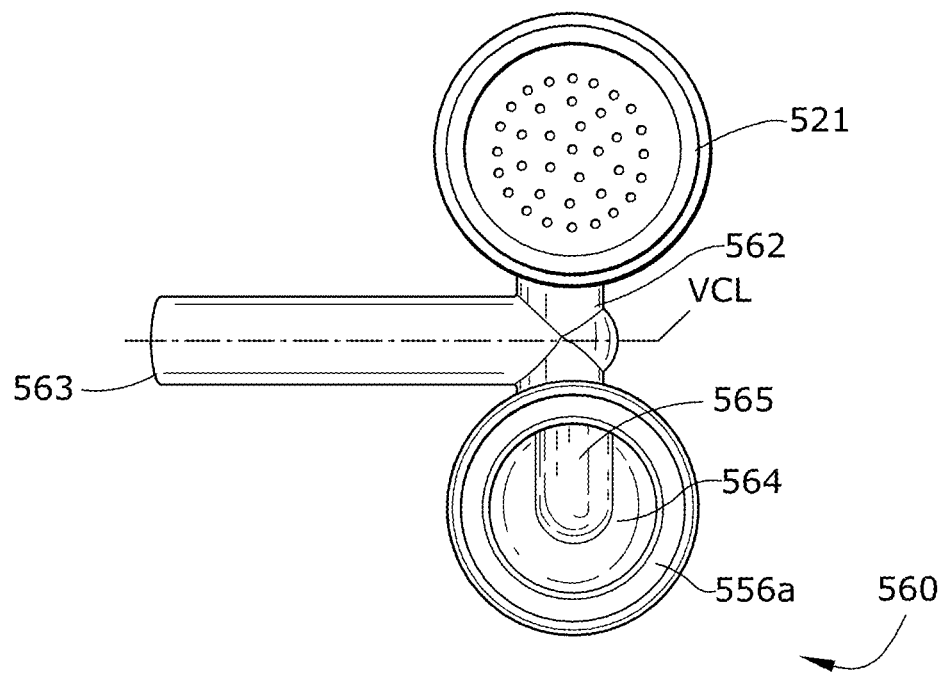
FIG. 17 is a line drawing of a top photographic representation of an eyewash valve assembly according to one embodiment of the present invention.

Variable orifice 356 includes an internal valve the position of which can be manually adjusted by the user at an interface 367 on one side of valve 360. FIGS. 16A and 16B show front and back halves 361F and 361B, respectively, which comprise the body of outlet valve 360. Tempered water flows into the inlet 363 of valve 360 and flows into internal chambers 362T and 362B. The amount of water that flows from the right and left outlets 364R and 364L, respectively, can be adjusted by varying the flow resistance of valve 356. In some embodiments, there is an internal stop that prevents full closure of valve 356, so that water within valve 360 can always drain out.

By way of interface 367, valve 356 can be rotated to a substantially closed position, in which most of the fluid received through inlet 363 flows out of outlets 364R and 364R. If the user rotates valve 356 to the fully open position, then some of the water entering through inlet 361B flows out of outlet 368 into drain 372. Dispensing valve 360 therefore permits accurate adjustment of the amount of water dispensed through outlets 364R and 364L by adjustment of variable orifice valve 356.

Water exiting through dispensing caps 321 or valve outlet 368 flows into a return basin 370. As best seen in FIG. 14, outlet valve 360 is generally suspended above the drain surface of the basin 370 by shutoff valve 350. Therefore, wash system 320 is substantially self-draining for all water that exits shutoff valve 350.

FIGS. 17 through 25 depict and explain various features pertaining to an eyewash system 520 according to one embodiment of the present invention.

FIGS. 17 through 20 depict various external views of an eyewash nozzle assembly or outlet valve 560 according to one embodiment of the present invention. It will be appreciated that valve 560 is related and similar to the previously defined outlet valves 160, 360, and 460, even though there are external differences in shape. It is further understood that the various functions that will now be described for valve 560 apply equally to these other outlet valves disclosed herein.

Valve assembly 560 includes an inlet 563 for water and a pair of outlets 568 which can be capped with dispensing caps 521. Preferably, the housing of outlet valve 560 includes a groove 556a that is adapted and configured to hold within it a filter disk 556. In some embodiments, these features are arranged symmetrically about a vertical center line (VCL) that extends forward toward the user when valve 560 is installed in an eyewash system.

The inlet 563 includes within it a flow regulator or variable orifice valve 566, such as those made by Neoperl.

These flow regulators provide a substantially constant flow of water there through; especially after a threshold pressure has been obtained. As one example, with a flow regulator from Neoperl of the type MR03 US Type, flows can be selected to flow from about one gallon per minute to about two and two-tenths gallons per minute within a tolerance band. Preferably, the flow regulators are press fit into the housing at the inlet 563.

Valve assembly 560 includes a central passage 562 that interconnects inlet 563 to an internal connection 565 and outlets 564. By transitioning from central passage 562 with a relatively small cross section to the larger eyewash outlets 564 (which are capped with dispensing caps 521), the velocity of water within valve 560 is reduced greatly and thereby emerges from the apertures 521a of cap 521 more gently, yet extends upwardly the required distance of eight inches as noted in Enzi standard Z358-1-2009. Further, it has been found that the velocity of water is not so great as to extend greatly beyond this eight inch limit, thus making the eyewash system more user-friendly, and therefore more likely to be used. In some embodiments, the area ratio (the combined cross sectional area of outlets 564 to the cross sectional area of central passage 562) is from about 8 to about 11, with a preferred range being greater than about 9. With this sizing, it has been determined that a wash flow less than about two gallons per minute can be provided. In this manner, the flow valve 560 is less wasteful of water during usage.

Figure 19:
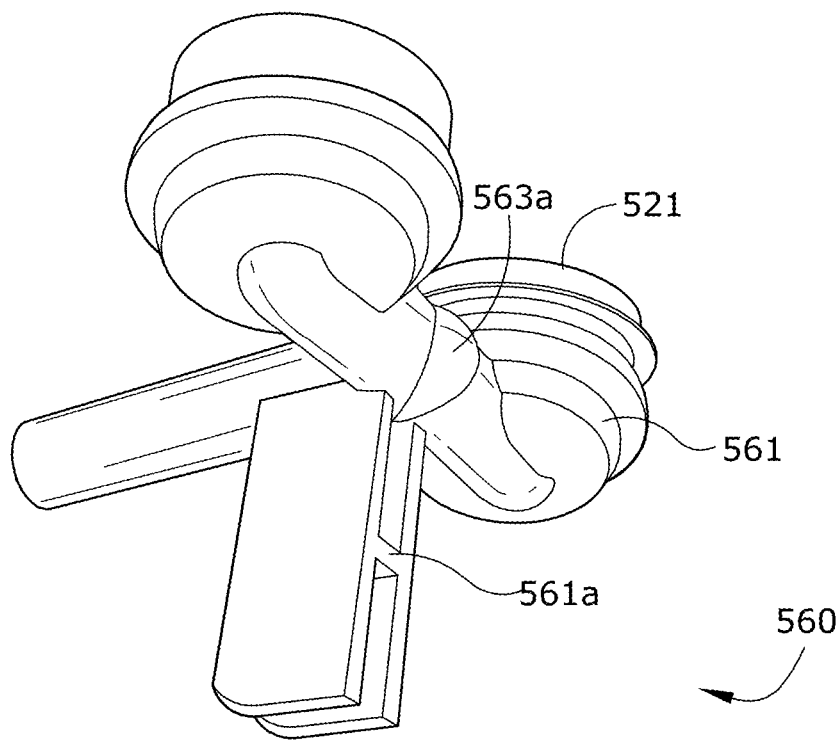
FIG. 19 is a line drawing of a perspective photographic representation of the apparatus of FIG. 17.
Figure 20:
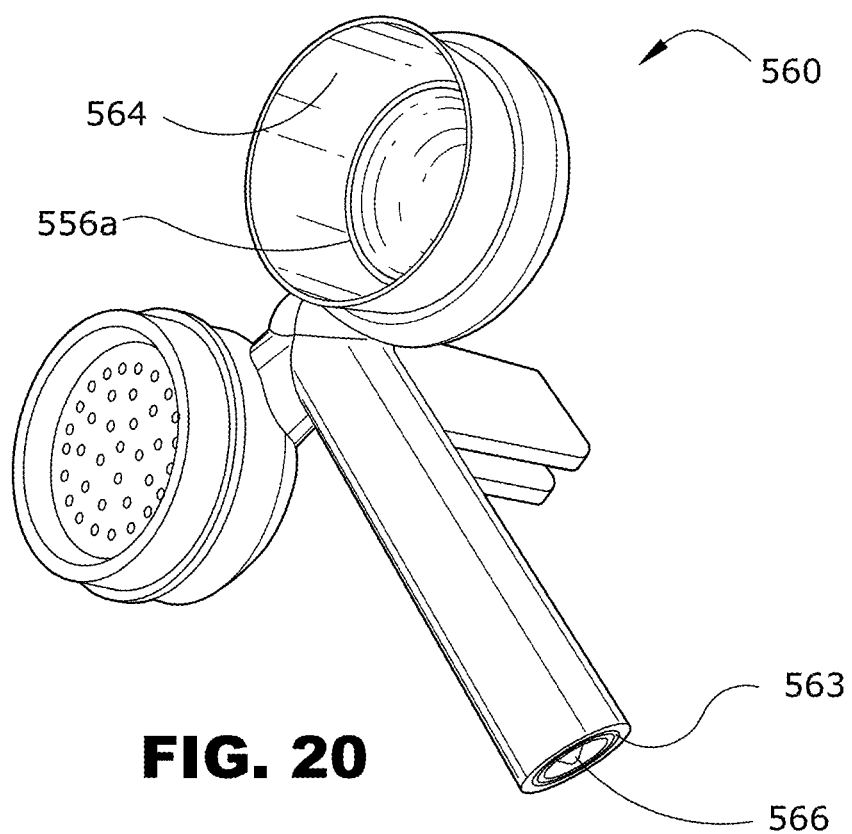
FIG. 20 is a line drawing of a perspective photographic representation of the apparatus of FIG. 17.
Figure 21A:
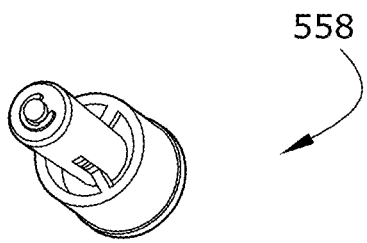
FIG. 21A is a line drawing from a photographic top side view of a valve from the apparatus of FIG. 17.
Figure 22A:
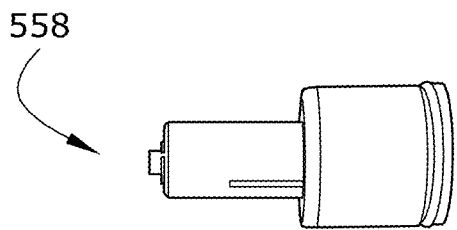
FIG. 22A is a line drawing from a photographic bottom side view of a valve from the apparatus of FIG. 17.
Figure 21B:
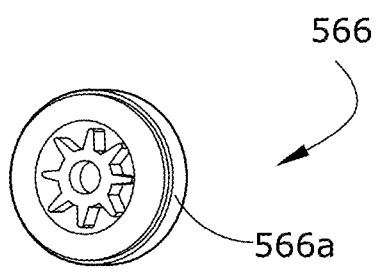
FIG. 21B is a line drawing from a photographic top side view of a regulator from the apparatus of FIG. 17.
Figure 22B:
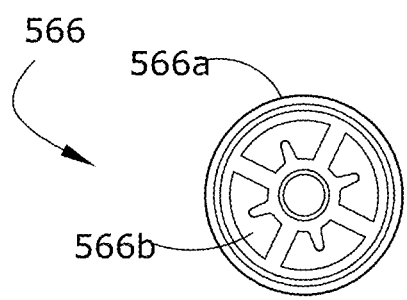
FIG. 22B is a line drawing from a photographic bottom side view of a regulator from the apparatus of FIG. 17.
Figure 21C:
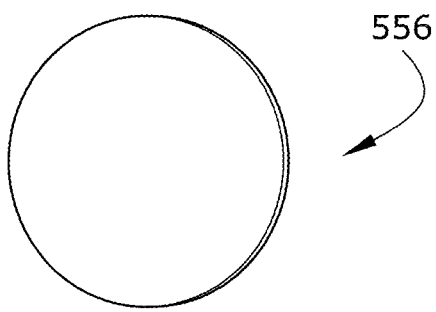
FIG. 21C is a line drawing from a photographic top side view of a filter from the apparatus of FIG. 17.
Figure 22C:
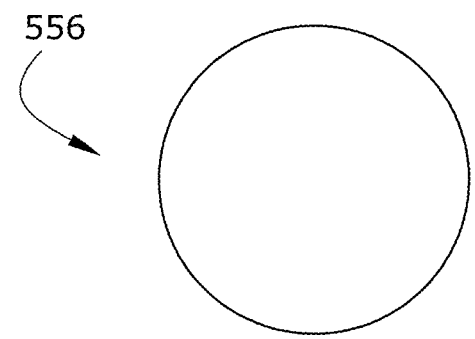
FIG. 22C is a line drawing from a photographic bottom side view of a filter from the apparatus of FIG. 17.
Figure 21D:
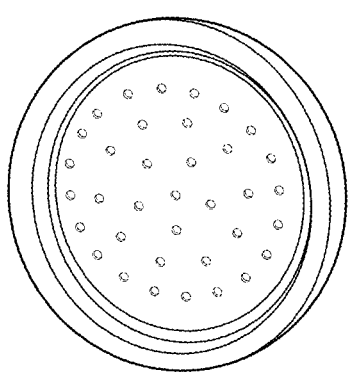
FIG. 21D is a line drawing from a photographic top side view of a dispensing cap from the apparatus of FIG. 17.
Figure 22D:
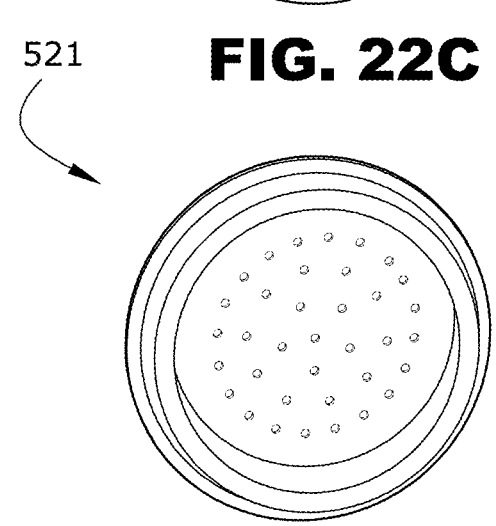
FIG. 22D is a line drawing from a photographic bottom side view of a dispensing cap from the apparatus of FIG. 17.

In some embodiments, central passage 562 terminates at a distal-most end 563a, as best seen in FIG. 19. Some versions of valve assembly 560 include an aperture at the termination 563a of internal chamber 562. This aperture can be provided with a male or female feature that can be coupled to the inlet 563 of a second valve assembly 560. This coupling of two valve assemblies provides four eyewash nozzles, and this modular construction thus makes valve 560 suitable for emergency eyewash applications and emergency face wash applications. A corresponding flow schematic can be seen in FIG. 24, where the additional valve 560 is represented by outlets 564' and dispensing caps 261'. Further, the modified, inlet is identified as element 663', and the secondary outlet of the first valve is identified as 563a.

Figure 18:
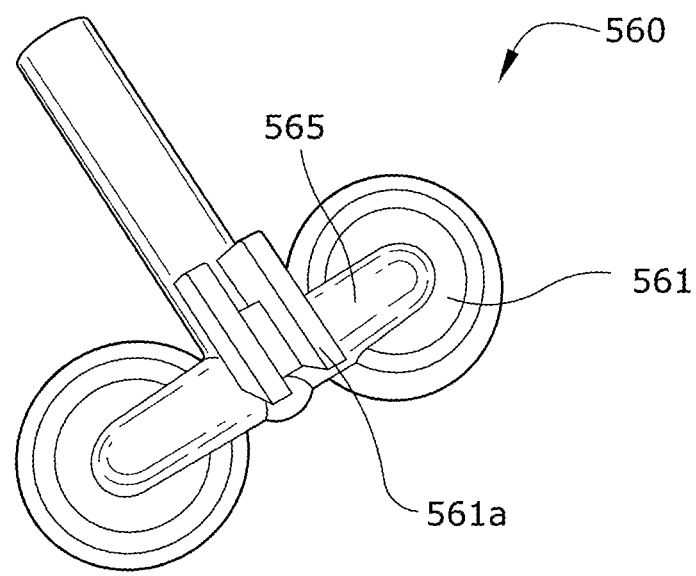
FIG. 18 is a line drawing of a bottom photographic representation of the apparatus of FIG. 17.
Figure 23A:
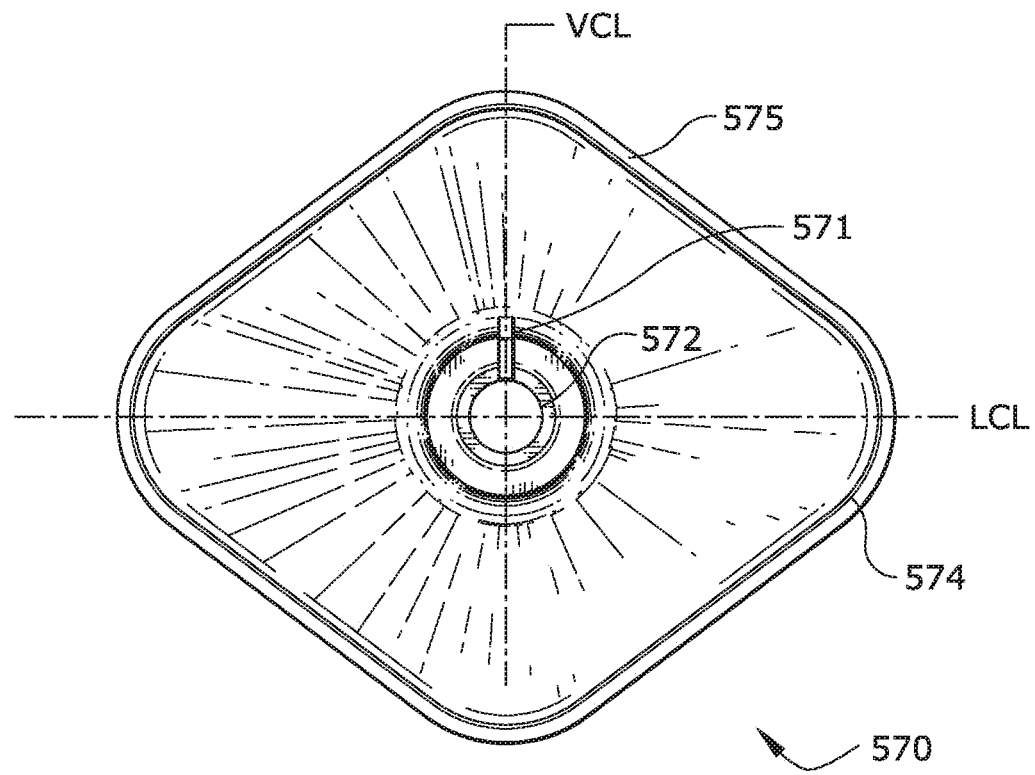
FIG. 23A is a line drawing of a top photographic representation of a basin according to one embodiment of the present invention.
Figure 23B:
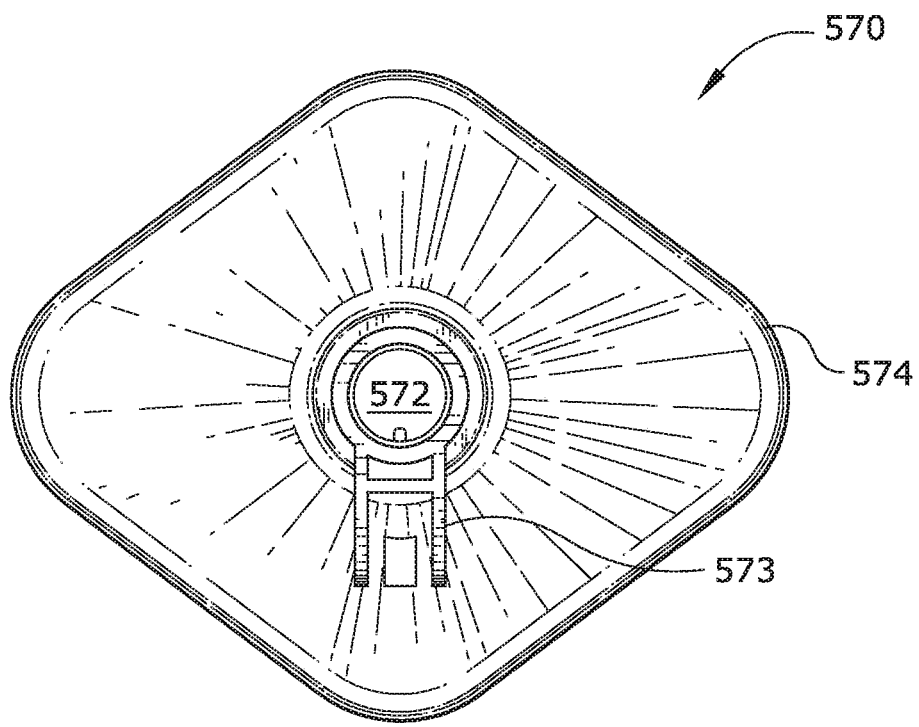
FIG. 23B is a line drawing of the bottom of the apparatus of FIG. 23A.
Figure 23C:
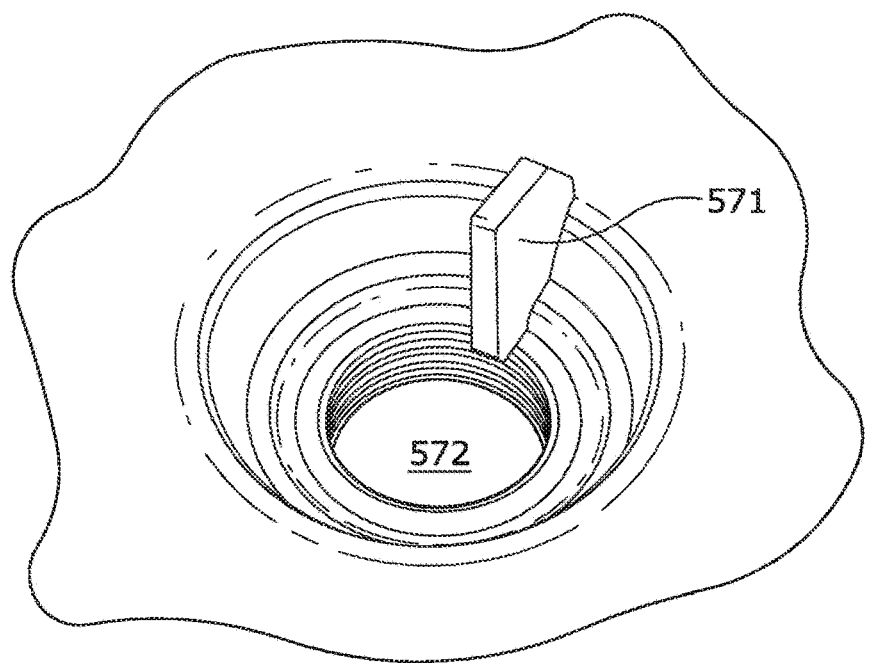
FIG. 23C is a close-up line drawing of a portion of the apparatus of FIG. 23A.
Figure 23D:
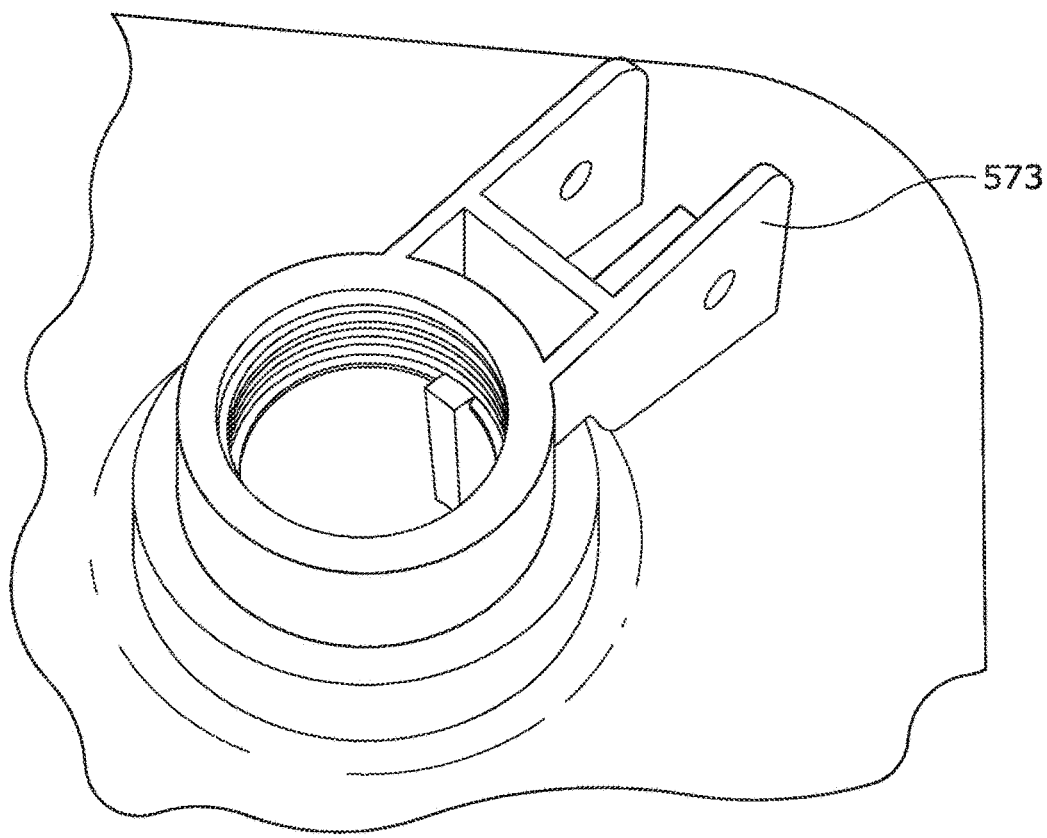
FIG. 23D is a line drawing of a portion of the apparatus of FIG. 23B.
Figure 23E:
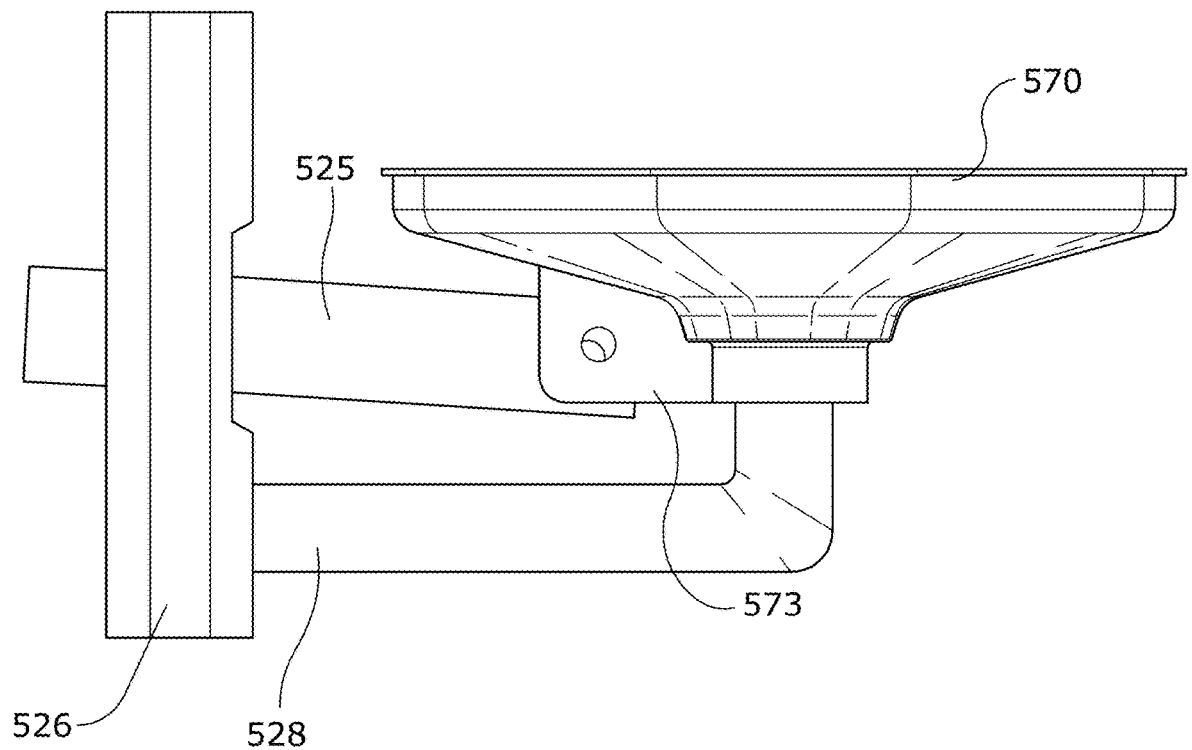
FIG. 23E is a line drawing of a side photographic representation of a portion of an eyewash assembly according to one embodiment of the present invention.
Figure 24:
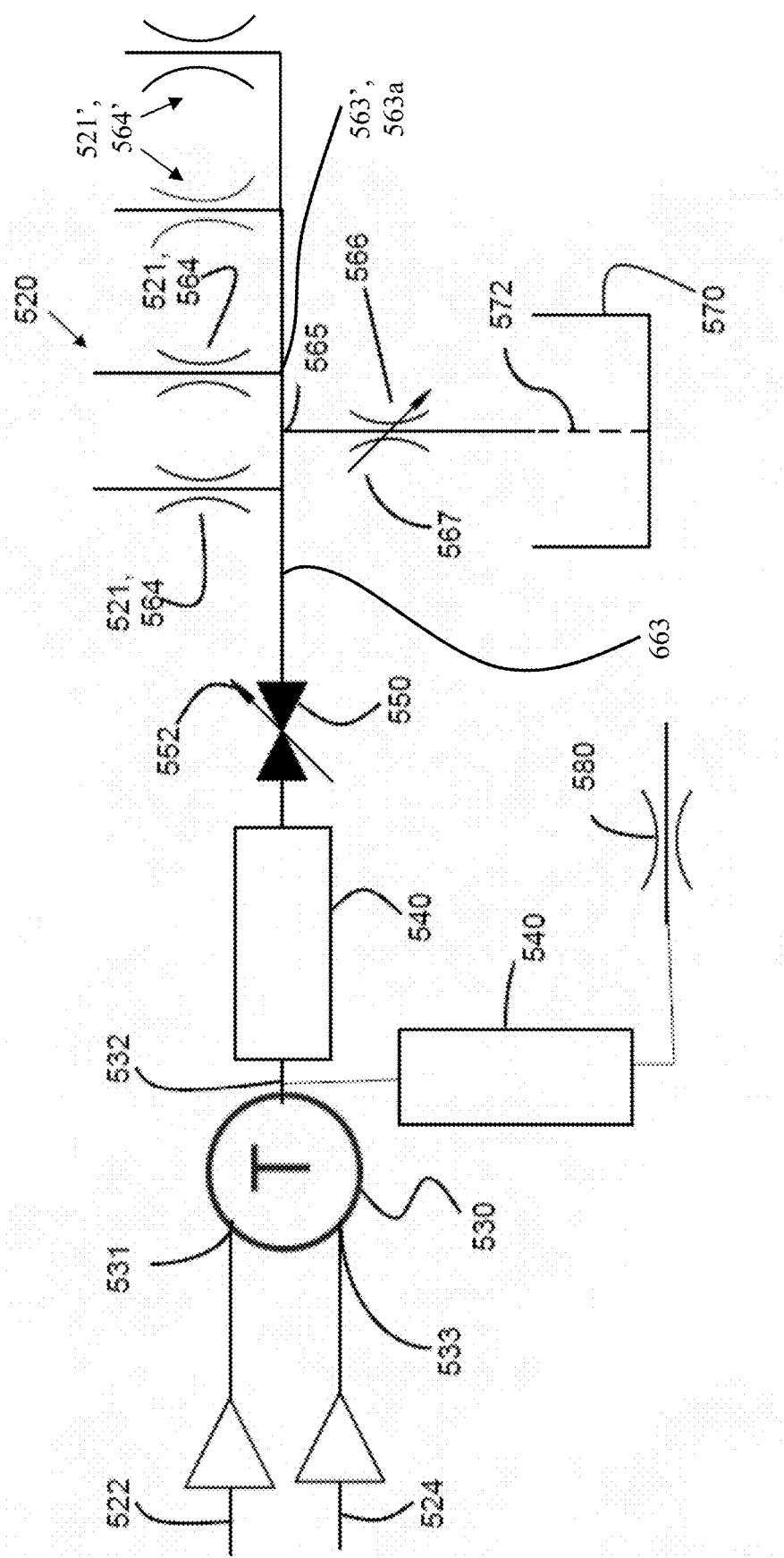
FIG. 24 is a hydraulic schematic representation of a system according to one embodiment of the present invention.
Figure 25:
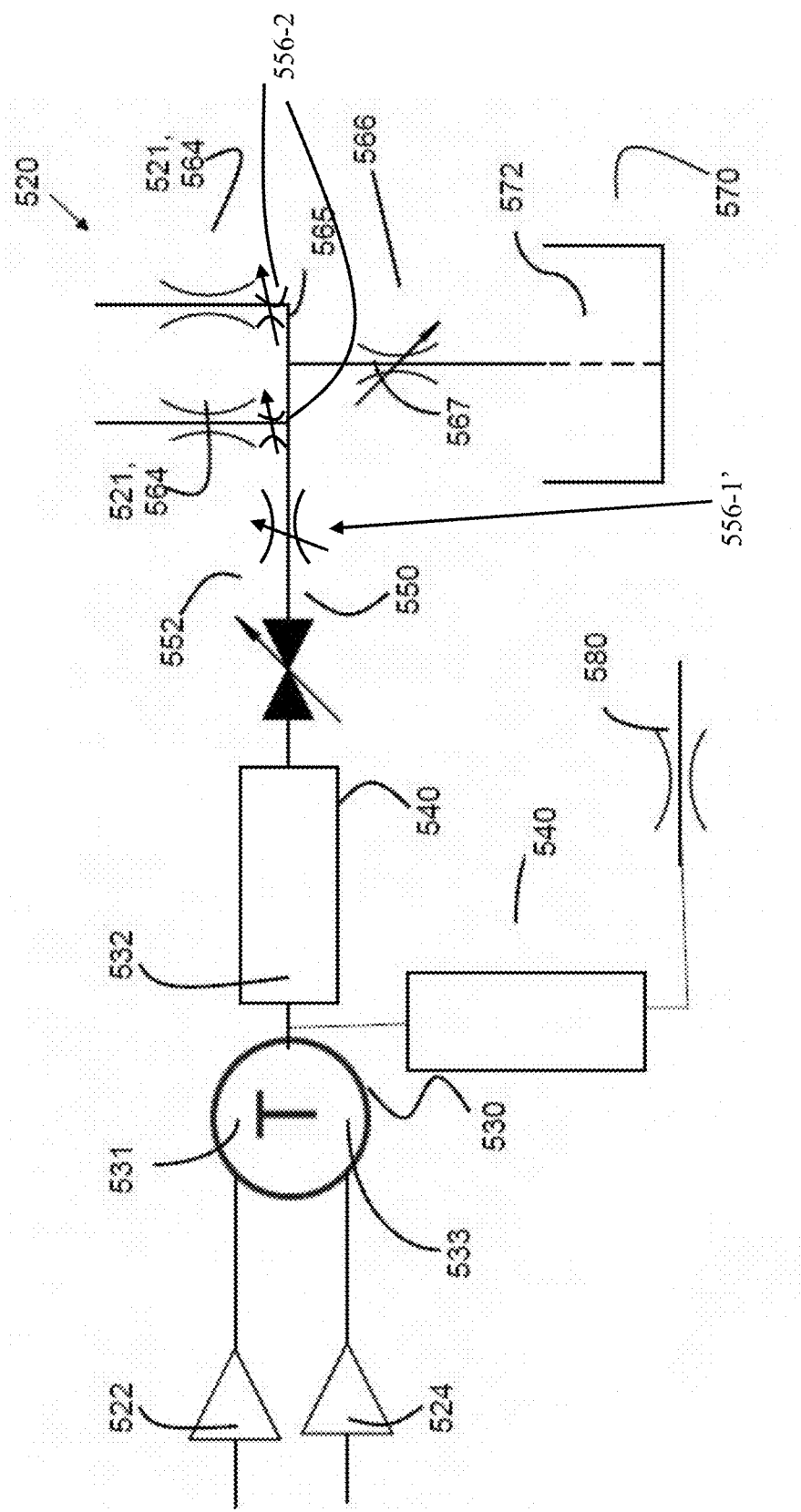
FIG. 25 is a hydraulic schematic representation of a system according to one embodiment of the present invention.

Valve 560 further includes an indexing feature 561a located centrally on the bottom of the housing 561. As best seen in FIGS. 18 and 19, indexing feature 561a includes a pair of downwardly extending arms that define a gap therebetween. Referring briefly to FIGS. 23A and 23C it can be seen that this gap is sized to accept therebetween the indexing feature 571 of wash basin 570. This indexing feature combined with the quick connect fittings on outlet of the shut-off valve 550 and the inlet to the outlet valve 560 combine to make valve 560 modular and easily replaceable by an unskilled person. The quick connect fittings of the shut-off valve and the outlet valve combine to align valve 560 along the length of the vertical axis VCL. The indexing features 561a and 771 do not interfere with this fore and aft alignment, since indexing feature 571 can fit easily between the parallel arms of indexing feature 561a. However, the indexing features 561a and 571 combine to laterally locate valve 560 in a lateral direction (i.e., as along the lateral center line LCL, best seen in FIG. 23A). Valve 560 is preferably not attached to basin 570. Therefore, the person replacing valve 560 has only a single quick connection to achieve, and does not have to further connect body 561 to basin 570. It can be further seen that the shape of feature 561 is generally complementary in shape to indexing feature 571.

FIGS. 21 and 22 show various components located internally in some embodiments of valve 560. Filters 556 in one embodiment are preferably porous, centered metal wafers. In one example, housing 561 is a two-piece, molded plastic housing having a groove within wash outlet 564. During manufacturing, a filter 556 is inserted in the groove of one-half of the housing 561, and the other half is then mated with the first half, trapping filter 556 in place. A Neoperl regulator 566 is shown in FIG. 21B (from one side) and FIG. 22B (from the other side). Each regulator includes a static, generally rigid structure 556b that cooperates with the rigid members 556a that cooperates with a resilient member 566b, such as an O-ring to produce a variable orifice effect.

Flow schematic 25 depicts yet another embodiment of the present invention. Various embodiments contemplate one, two, or there flow regulators 656 within valve assembly 560. As has been previously discussed, a first flow regulator 656-1 is selected to provide a total eyewash flow to both eyewash outlets 564. However, in yet other embodiments this first, central flow regulator is not needed, and the valve assembly can otherwise include a pair of flow regulators each selected for regulation of flow to a single eyewash outlet 564.

Figure 26:
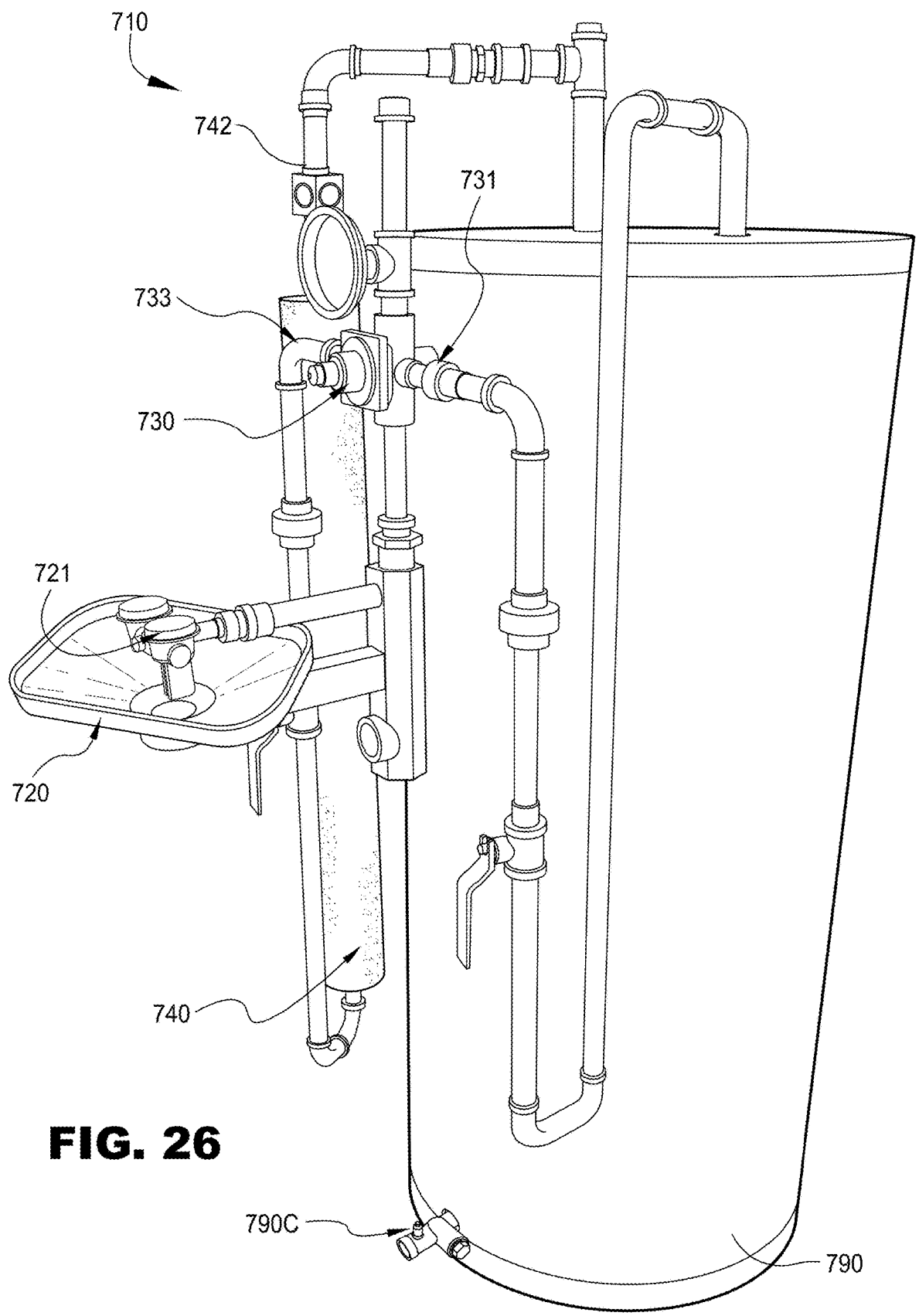
FIG. 26 is a line drawing of a photographic representation from the side of an emergency eye wash system according to one embodiment of the present invention.
Figure 27:
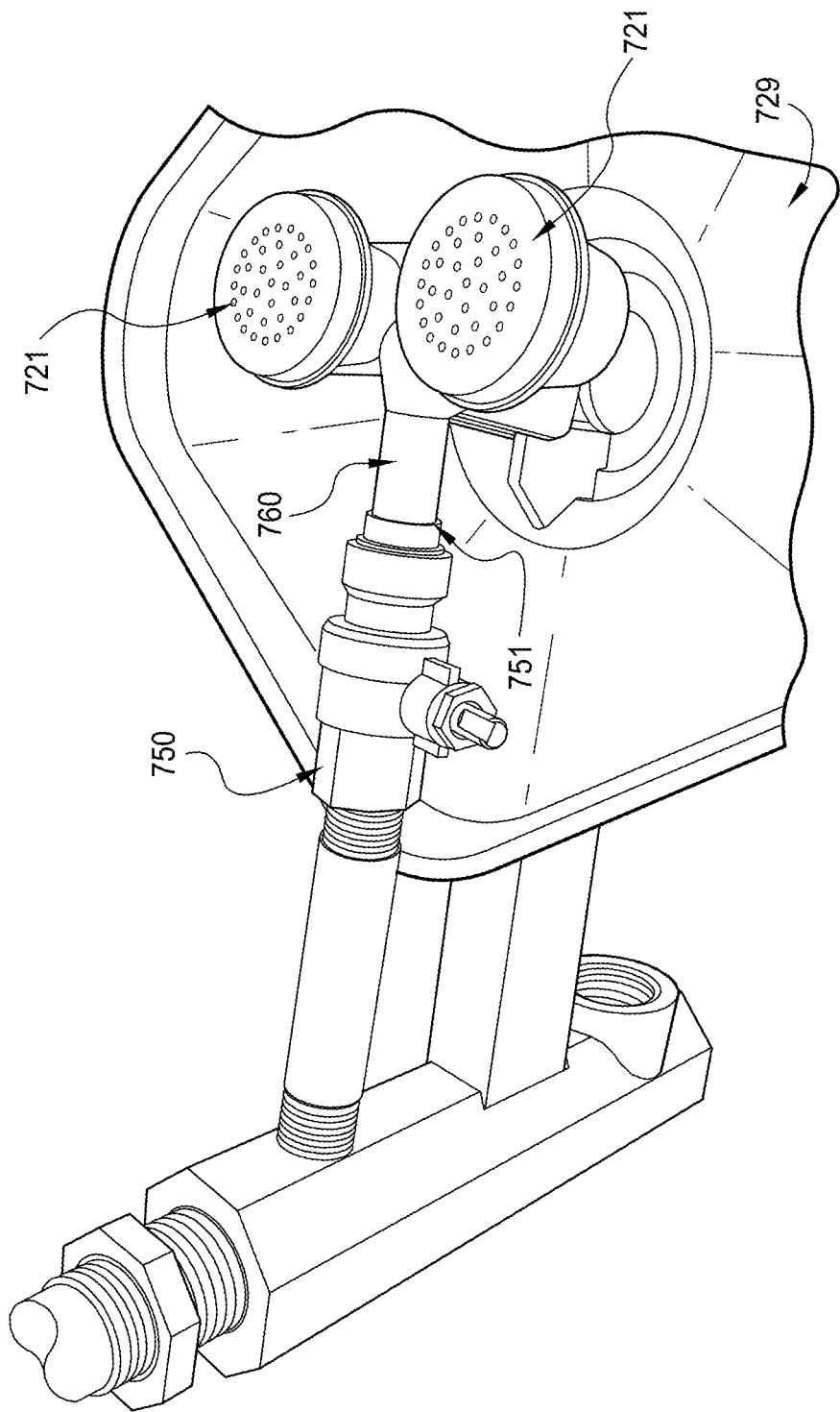
FIG. 27 is a line drawing of a close up photographic representation of a portion of the system of FIG. 26.

FIGS. 26 and 27 are line drawings of photographic representations of an emergency eye wash system 710 according to one embodiment of the present invention. Eye wash system 710 includes a heater 790, such as a gas or electric heater that receives cold water from an inlet 790C. System 710 is adapted and configured such that cold water from inlet 790C is provided both to an internal heating unit for the subsequent production of heated water, and also to a cold water inlet 731 of thermostatically controlled valve 730. The hot water inlet 733 of valve 730 is provided with heated fluid from a diffuser 740. During typical operation, diffuser 740 contains a supply of water that is more or less at room temperature. During operation, the inlet 742 of diffuser 740 receives heated water from an outlet of heater 790. Diffuser 740 provides mixing of the stored internal volume with new heated fluid, and thereby provides water to the hot inlet 733 of valve 730 that has a relatively slow increase in temperature. Therefore, diffuser 740 helps prevent spikes in temperature when eye wash 720 is first turned on.

Further during operation, FIG. 27 shows that water is provided to right and left dispensing caps that provide an upward flow of tempered water. This water is received for drainage within basin 729, and subsequently drained out (the drainage attachment not being shown). Dispensing caps 721 are provided to an outlet valve 760 that is coupled by a quick connect fitting 751 to a shut off valve 750.

Figure 28:
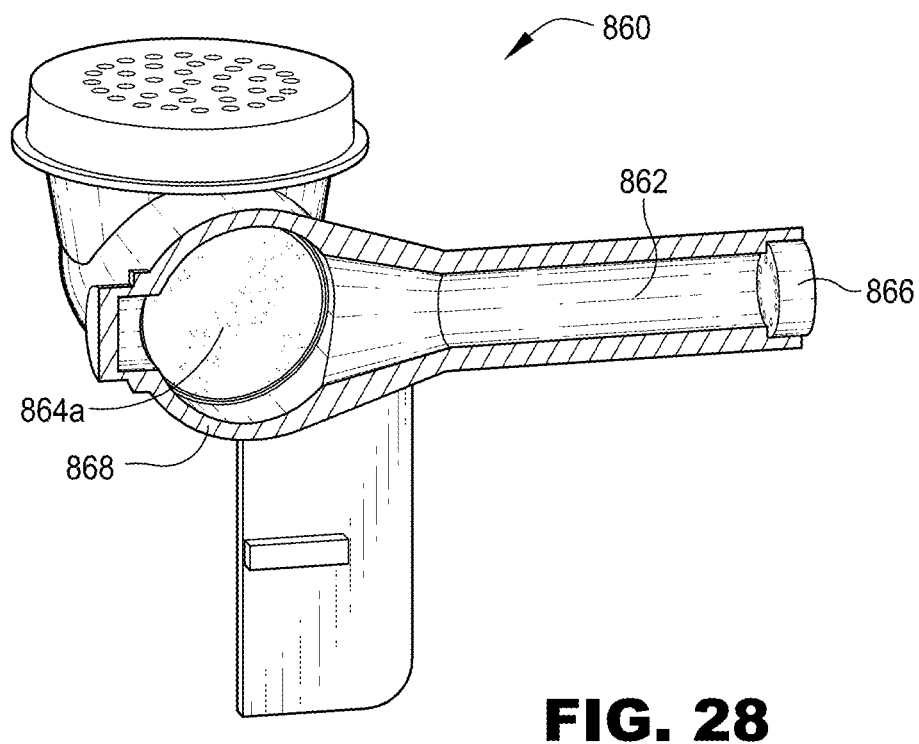
FIG. 28 is a line drawing of a cutaway view of a CAD model of an outlet valve according to another embodiment of the present invention.
Figure 29:
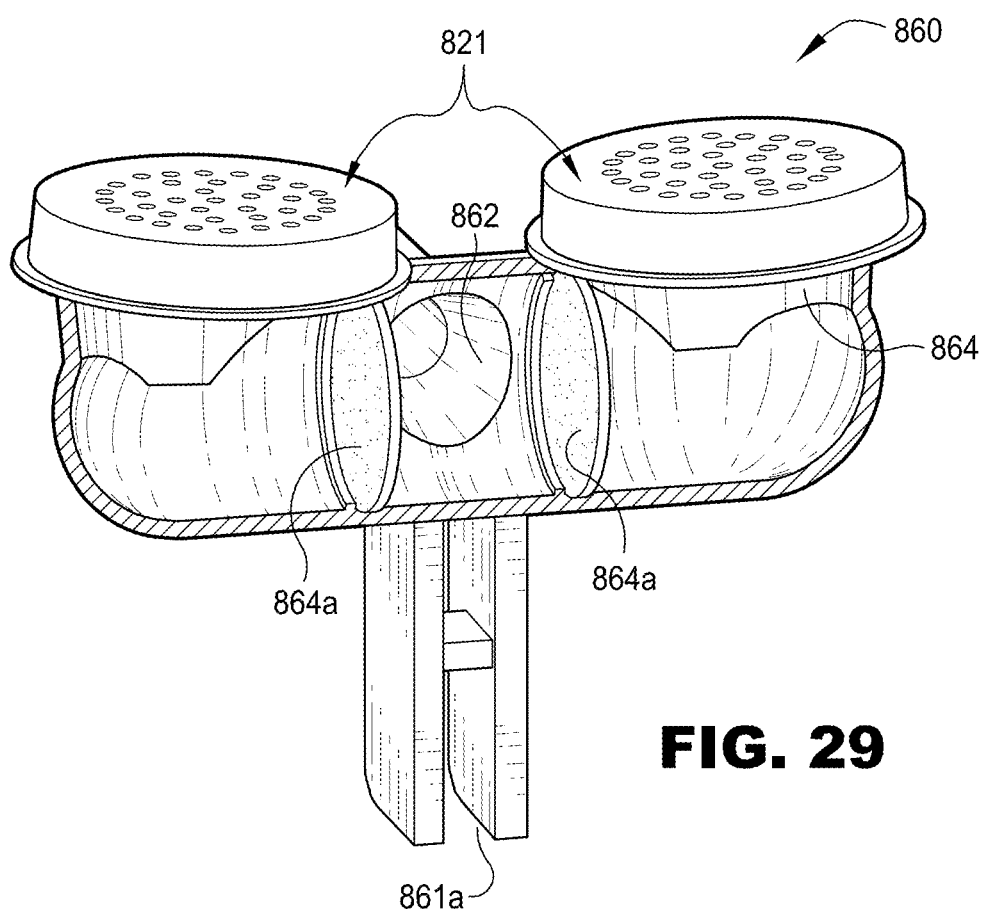
FIG. 29 is a different cutaway of the outlet valve of FIG. 28.

FIGS. 28 and 29 show cut away views of an outlet valve 860 according to another embodiment of the present invention. Outlet valve 860 can be used in an eye was system X20, as described elsewhere herein. Valve 860 includes a variable orifice 866 that provides a predetermined range of flows of tempered water from the outlet of the shut off valve (not shown) to an internal flow chamber 862.

Water from central chamber 862 is then provided to right and left eye wash outlets 864 through respective filter elements 864a. Each of the filter elements 864a provide some resistance to flow, and therefore, each assists in pressure balancing the central flow of water as it is provided to the right and left outlets. In some embodiments, the filters 864a have a nominal filter rating in the range of forty to sixty microns. In yet other embodiments, the filters are equivalent to about two hundred mesh or about seventy to eighty microns.

In some embodiments, valve 860 further includes a drainage outlet 868 that is located between the inlets to the right and left filters 864a, and preferably located lower that the center line of internal chamber 862. During operation, water exiting the shut off valve fills chamber 862 under sufficient pressure to force the water through respective right and left filter elements 864a. Filtered water is then provided to right and left chambers 864, and subsequently through right and left dispenser caps 821 to the user. Location of the drainage outlet 868 as described can provide, in some embodiments, several features. One such feature is to drain the internal chamber 862 and 864 under the influence of gravity. Yet another feature is to assist in a backwashing through filters 864a. During backwashing, as the shut off valve is closed, any water collected in right and left chambers 864 will flow in reverse direction (i.e., from outlet to inlet though filters 864A), and subsequently out of drain 868. This backwashing feature can increase the usable life of filters 864a.

FIGS. 30 to 39 pertain to yet another embodiment of the present invention in which a flush line, preferably of high capacity flow, is provided proximate to an emergency wash system. Preferably, the flush line and associated valving is placed very close to the wash system, and in some embodiments made integral to the wash system. This close proximity of the flush line to the wash system minimizes any trapped water that cannot be flushed from the flush line. Various embodiments of the present invention pertain to a kit of parts that can be added to an existing emergency wash system, and still others pertain to emergency wash systems in which the means for flushing is integrated into other components of the emergency wash system.

In the plumbing systems of some facilities, water is supplied by a pipe to an emergency wash system. Water is supplied at system pressure levels in this pipe to the shutoff valve(s) of the emergency wash system. If there is no actuation of this emergency valve, then the water will remain in the plumbing feeding the emergency wash system, with no opportunity for flow to a drain or for recirculation.

Therefore, if the emergency wash system is not used for a long period of time, then it is possible that this plumbing that feeds the emergency wash system can contain water that has been contaminated. This contamination could include particulate matter that has entered the wash feeding plumbing by gravity, or include harmful chemicals that have diffused into the feed plumbing, or include bacteriological organisms (such as those that are responsible for Legionnaires disease) that have found their way into the feeding system. Should these contaminants exist in the water provided to the shutoff valve of the emergency wash system, then if the wash system is actuated to the open position, this contaminated water will be provided onto the body of the user. In those situations in which the washing system includes an eye rinse station, the contaminants may be provided directly onto the user's eyes.

Various embodiments of the invention described herein, especially with reference to FIGS. 30 to 39, pertain to an emergency wash system in which means for flushing the feed pipe is provided. Preferably, this flushing means includes a multi-position valve. This multi-position valve, which can be part of a kit for modifying an existing wash system, provided separately with the a new washing system, or integrated into a shutoff valve of the wash system, can be moved in one embodiment to multiple flow mode positions consistent with "off" (a complete stoppage of any flow); "in-use" (in which water is provided to the emergency system, either to a manually operated shutoff valve, or directly to the washing nozzles); and "flush" (in which water is flushed from the valve to a drain).

In yet another embodiment, water to the emergency wash system is provided from a feed pipe through a valve that has only two positions: "ready for use" (in which water is provided under pressure to a shutoff valve of the emergency system); and "flush" (in which water from the feed pipe is provided to a drain. In this embodiment, the multi-position valve does not have a setting in which water is not provided to the emergency wash shutoff valve. Even in the "flush" position and while water from the feed pipe is draining, water under pressure is still being provided to the face of the emergency system shutoff valve. This system may be preferable in some situations in which the owner of the emergency wash system wants a high degree of confidence that the emergency wash is always available, and to make the system less susceptible to a maintenance worker keeping the multi-position valve in a completely "off" position.

Figure 30:
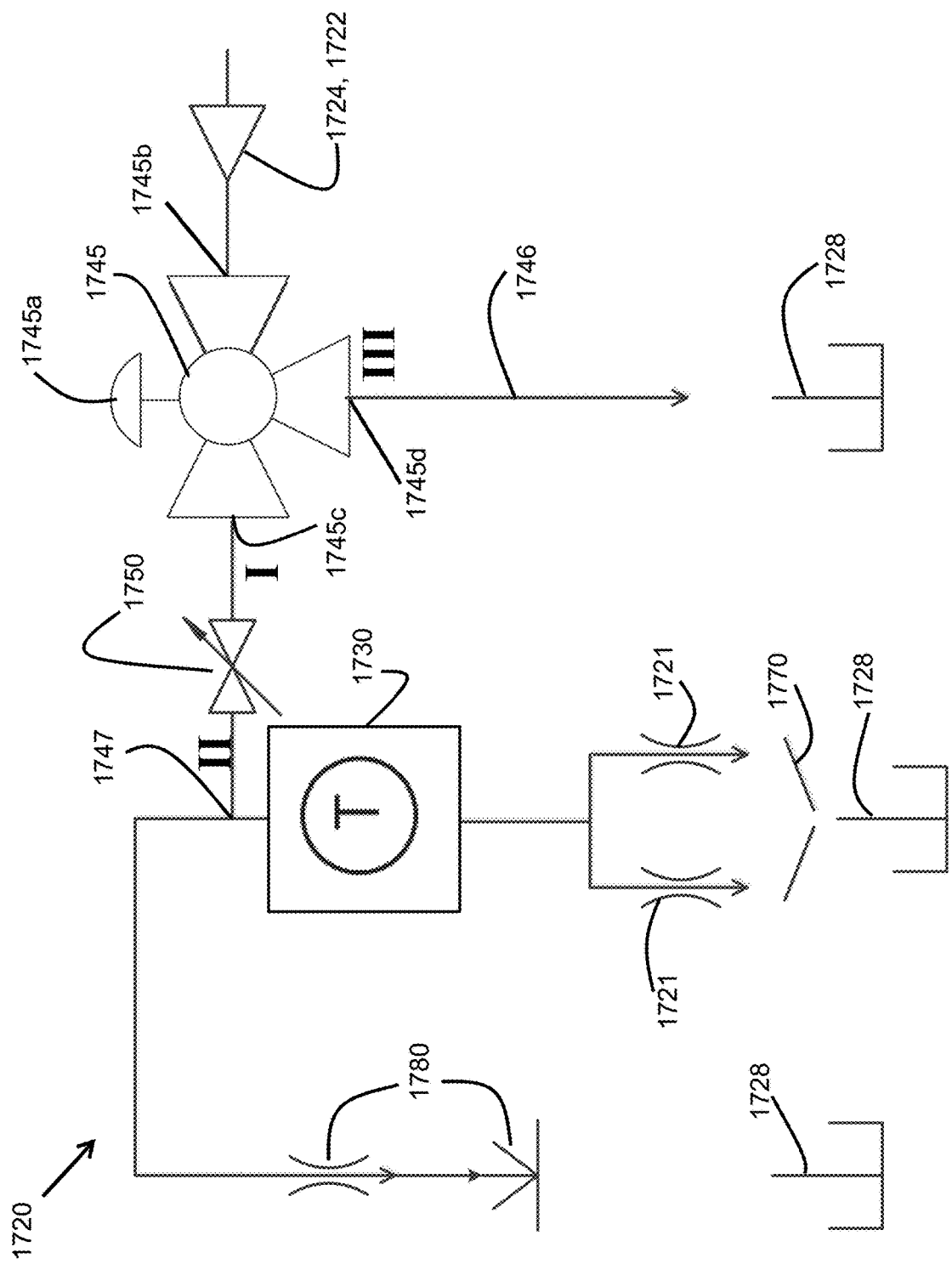
FIG. 30 is a hydraulic flow schematic of an emergency wash system according to another embodiment of the present invention.

FIG. 30 is a schematic representation of one embodiment of an emergency wash system provided with a flushing capability. It is understood that FIG. 30 represents a system that can be provided in a variety of configurations, and in that respect FIG. 30 could be considered a schematic representation of a schematic representation. For example, FIG. 30 shows a shut off valve receiving water from cold and hot sources 1722, 1724, respectively, and a thermostatically controlled valve having a single inlet for the introduction of water. It is understood that a person of ordinary skill in the art would recognize that the schematic shown in FIG. 30 is a blending of multiple concepts. For example, one concept would include a multi-way valve that includes separate inlets for hot and cold, and separate outlets for hot and cold (along with an alternate outlet that drains). Both of these outlet flows would be provided to the thermostatically controlled valve. In yet another embodiment, the separate cold and hot flows are provided to the inlet of a thermostatically controlled valve, and the tempered water exiting that valve would instead be provided to a shut off valve (such as 1750), and subsequently to a multi-way valve (such as 1745), that would provide one of its outlets to the dispensing cups, and the other of its outlets to the drain. Pictorially, this latter configuration conceptually swaps the positions of valves 1745 and 1730 in FIG. 30.

Referring to FIG. 30 water is provided from a source 1722, 1724 to the entrance of a multi-position valve 1745. It is understood that the source of water can be hot, cold, or tempered according to particular design aspects of the specific washing system. In one embodiment, multi-position valve 1745 includes an inlet 1745b, a first outlet 1745c, and a second outlet 1745d. A handle 1745a permits a user such as a maintenance worker to manually change the flowpath of the incoming water to either outlet 1745c or outlet 1745d. It is understood that in yet other embodiments, valve 1745 may be electrically actuated, in which case one or more solenoids are incorporated into multi-position valve 1745.

In one position of operation, water from the source is provided through the outlet 1745c to the inlet of a manually operated shutoff valve 1750. As discussed earlier with respect to shutoff valves X50, shutoff valve 1750 is manually operated by the user under emergency conditions. When open, water is provided to the nozzles of a shower 1780 over the user's head, and simultaneously to a pair of eyewash nozzles 1721.

In some embodiments, water is also provided to a thermostatically controlled valve 1730, which is shown in FIG. 30 providing water to the eyewash nozzles 1721. In yet other embodiments, this thermostatic control valve 1730 may also provide water to the overhead shower 1780, and those of ordinary skill in the art can recognize a change to the schematic of FIG. 30 that would reflect such a flowpath. Further, for the sake of clarity, a hot water inlet to thermostatically controlled valve 1730 is not shown, but again those of ordinary skill in the art can recognize that in some embodiments there is further a source of hot water (not shown in FIG. 30, but shown otherwise herein) provided to a hot water inlet (not shown in FIG. 30, but shown otherwise herein). In still further embodiments, the wash system may not include a thermostatically controlled mixing valve.

The operational modes of the system of FIG. 30 are shown in the following table. Persons of ordinary skill in the art will recognize the applicability of the concepts described by this table with regards to the alternative schematic interpretations provided earlier regarding alternative interpretations of FIG. 30. This table uses Roman numerals I, II, and III in reference to the outlets as shown on FIG. 30.

| Mode | I | II | III |
|---|---|---|---|
| ready for use | open | closed | closed |
| in use | open | open | closed |
| flush | closed | closed | open |

However, it is understood that the modes described in the above table apply to some embodiments of the present invention, but not others. As discussed earlier, there are yet other embodiments in which for the flush mode of operation outlets I and III are both open.

FIG. 30 also shows a common drain 1728 for water that exits system 1720. Water exiting the head wash 1780 is shown to the far left in the figure exiting into a far left drain 1728. Water exiting the eyewash nozzles is captured within a basin 1770, which drains to a central common drain 1728. Water exiting from a flush line 1746 is provided to a right-most common drain 1728.

System 1720 includes a flushing line 1746 that can be used by a maintenance worker to periodically flush potentially contaminated, dead-ended water provided to inlet 1745b of valve 1745. In use, valve 1745 is placed in a flush mode of operation such that water from source 1722, 1724 is sent to drain 1728 through flush line 1746. For purposes of facilitating this maintenance event, flush line 1746 and the outlet 1745d are preferably adapted and configured for high water flow rates, and in some embodiments flow rates that are significantly higher than the flow rate of the emergency washing water that would otherwise exit through nozzles 1780 and 1721. By adapting and configuring the flushing means of system 1720 for high flow, the maintenance event can be kept to a short duration of time. This can be especially important when the piping that feeds into inlet 1745b is of significant volume. In some embodiments, the effective flow diameter of pipe 1746 is greater than 2 inches, and in yet other embodiments greater than 3 inches, and in still further embodiments, greater than 4 inches. This is in contrast to the flow diameter of the emergency wash system, which can be less than 2 inches.

Figure 31:
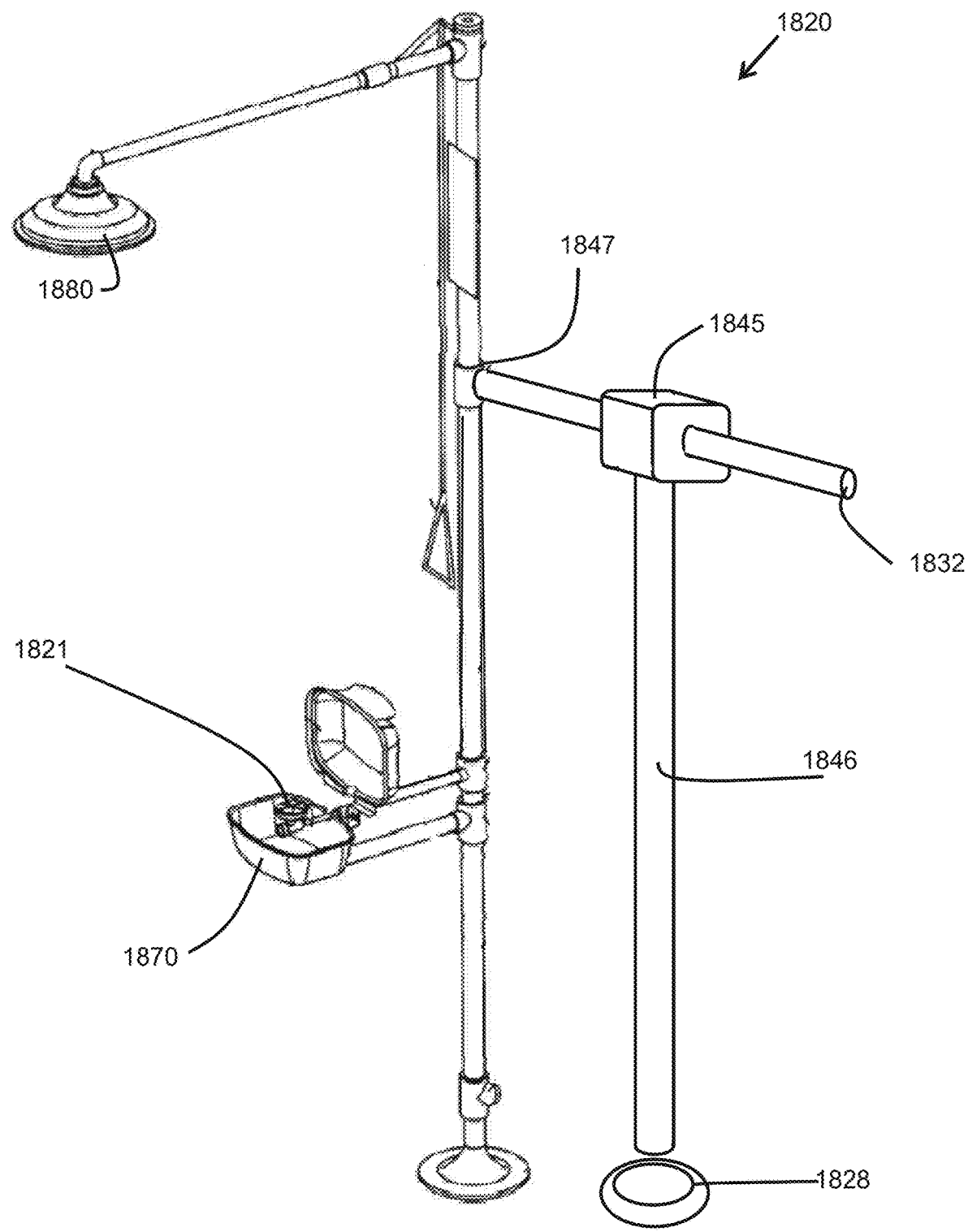
FIG. 31 is a side perspective view of an emergency wash station including some of the features of FIG. 30 or FIG. 39.

FIG. 31 shows an emergency wash system provided with flushing means 1820 according to one embodiment of the present invention. Water from a source is provided in a pipe to a multi-position valve 1845 (the valve being shown schematically). A flush tube 1846 extends generally downward from an outlet of valve 1845 toward a drain 1828. Another outlet of valve 1845 is connected by an intermediate pipe to a T-fitting 1847 of an emergency wash system.

Figure 32:
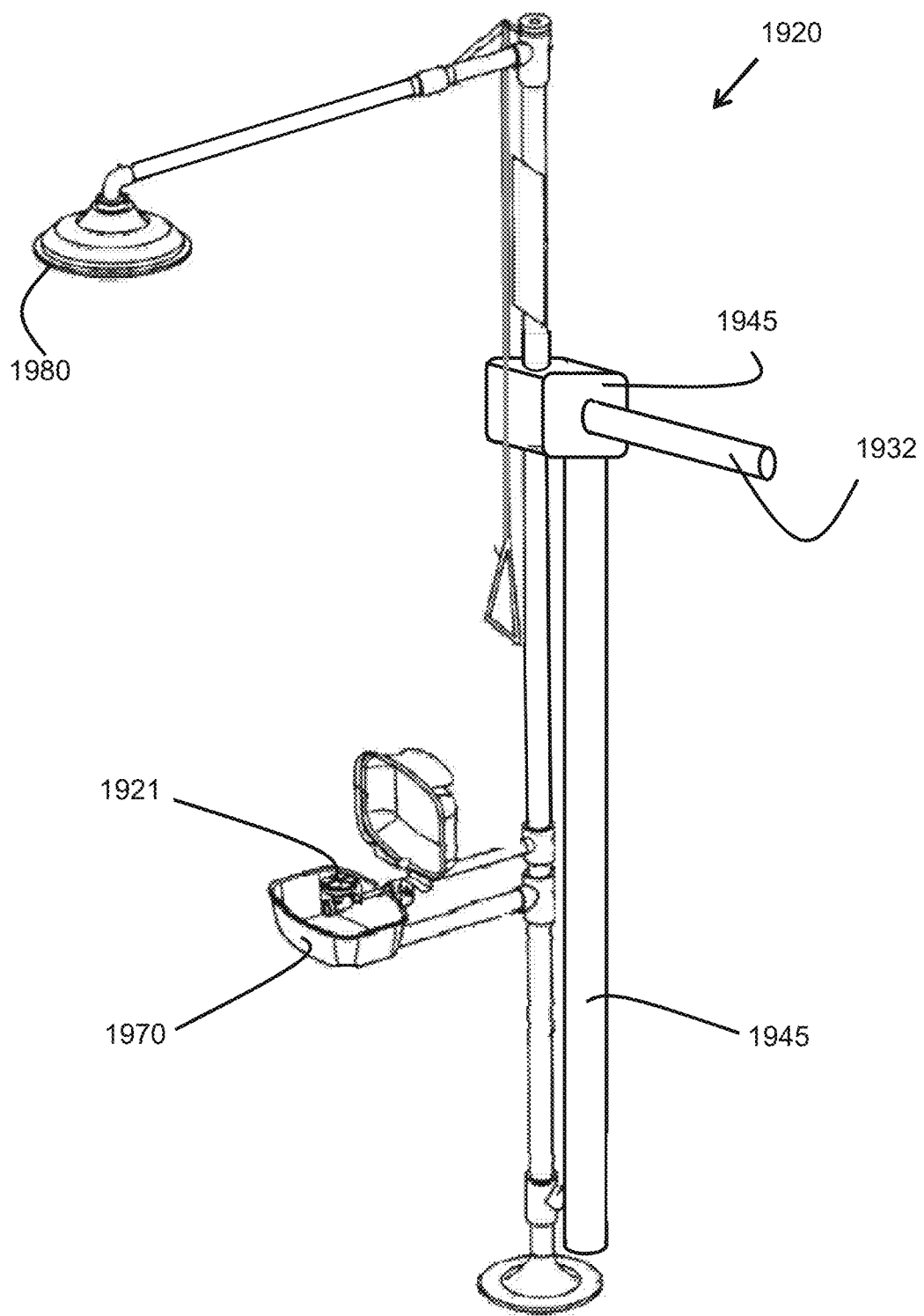
FIG. 32 is a side perspective view of an emergency wash station including some of the features of FIG. 30 or FIG. 39.

From this T-fitting 1847 water can be provided both upward to a shower nozzle 1880 and downward toward one or more eye and face washing nozzles 1821. In some embodiments, the use of a short length of intermediate pipe between the outlet of valve 1845 and an entrance to the emergency washing system is preferred because of the specific installation of the washing system. In some embodiments, a means for flushing kit is provided for installation with an existing wash system. Such a kit can include a multi-position valve (X45), a flush tube (X46), T-fitting (X47), and intermediate pipe (as graphically represented in FIG. 31). The diagram of FIG. 32 shows water being provided to the multi-way valve 1845 from the mixing outlet 1832 of a thermostatically controlled valve. It is further understood that, as discussed earlier with regards to FIG. 30, valve 1845 could include two, parallel input paths for hot and cold water, and two, commonly-controlled outputs providing that water to a thermostatically controlled mixing valve (not shown in FIG. 32).

FIG. 32 shows yet another embodiment of an emergency wash and flushing system 1920 similar to the system shown in FIG. 31. However, in system 1920 the multi-position valve 1945 is adapted and configured to fit integrally into the plumbing of an emergency wash system (including existing, installed systems). In such a system, the intermediate pipe (shown in FIG. 31 feeding T-fitting 1847) can be avoided. This intermediate pipe is potentially a source of dead-ended water, such as in those emergency washing systems that do not incorporate drain valves. In systems in which the means for flushing is integrated into the means for emergency washing, it is possible to combine the functions of the multi-purpose valve X45 and the emergency shutoff valve X50, suitable for operation by a single paddle shutoff X52.

The diagram of FIG. 32 shows water being provided to the multi-way valve 1945 from the mixing outlet 1932 of a thermostatically controlled valve. It is further understood that, as discussed earlier with regards to FIG. 30, valve 1945 could include two, parallel input paths for hot and cold water, and two, commonly-controlled outputs providing that water to a thermostatically controlled mixing valve (not shown in FIG. 32).

Figure 33:
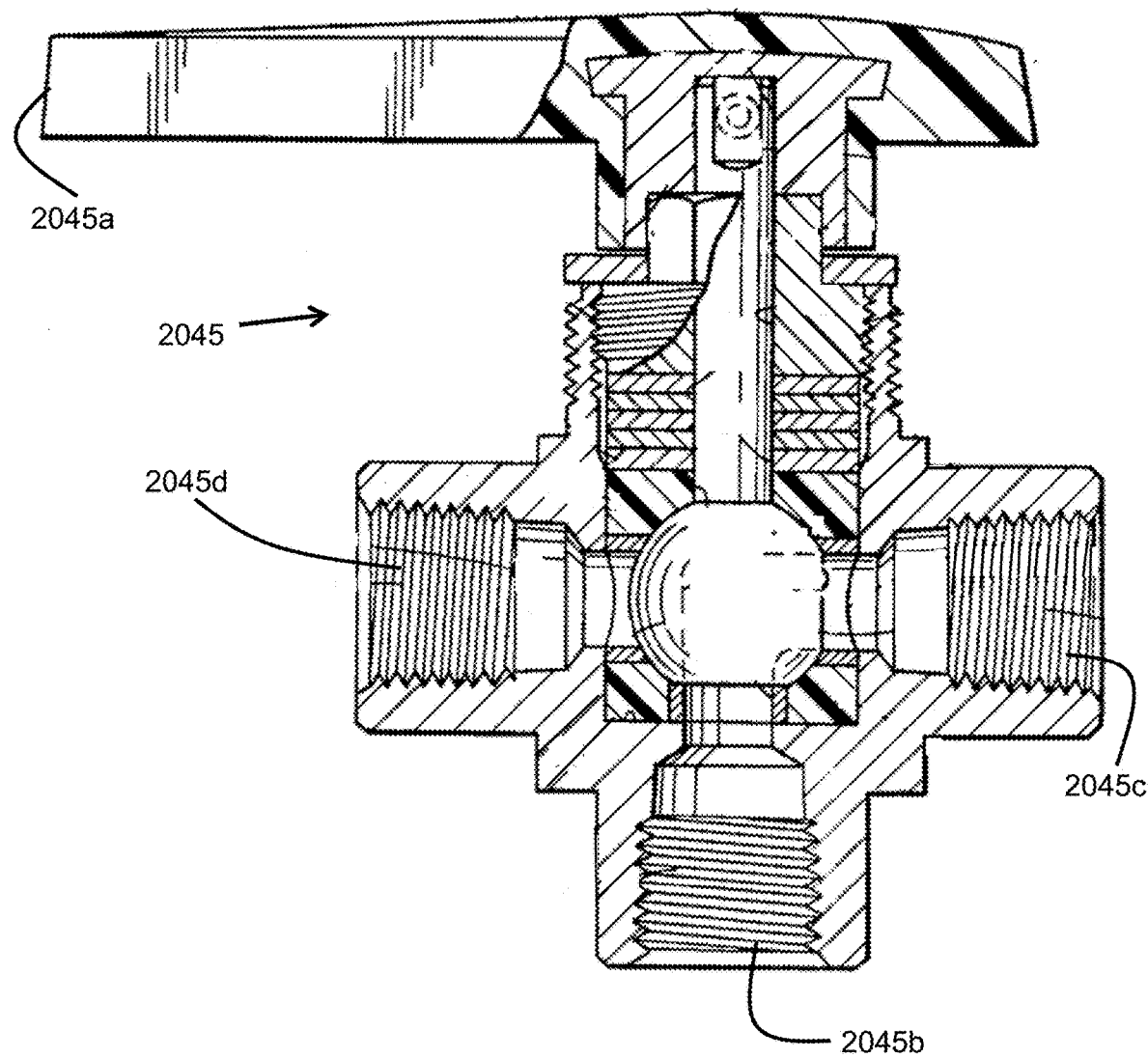
FIG. 33 is a cutaway side elevational view of a side elevational view of a multi-position valve according to one embodiment of the present invention.

FIG. 33 is a cutaway representation of a representation of a multi-position valve 2045 useful in some embodiments of the present invention. It can be seen that valve 2045 incorporates a single inlet 2045b and two outlets 2045c and 2045d. Preferably, movement of handle 2045a results in fluid communication between ports 2045b and 2045c, or between ports 2045b and 2045d. One of the outlets provides water to the flushing tube, and the other of the outlets provides water the emergency wash system.

Figure 34:
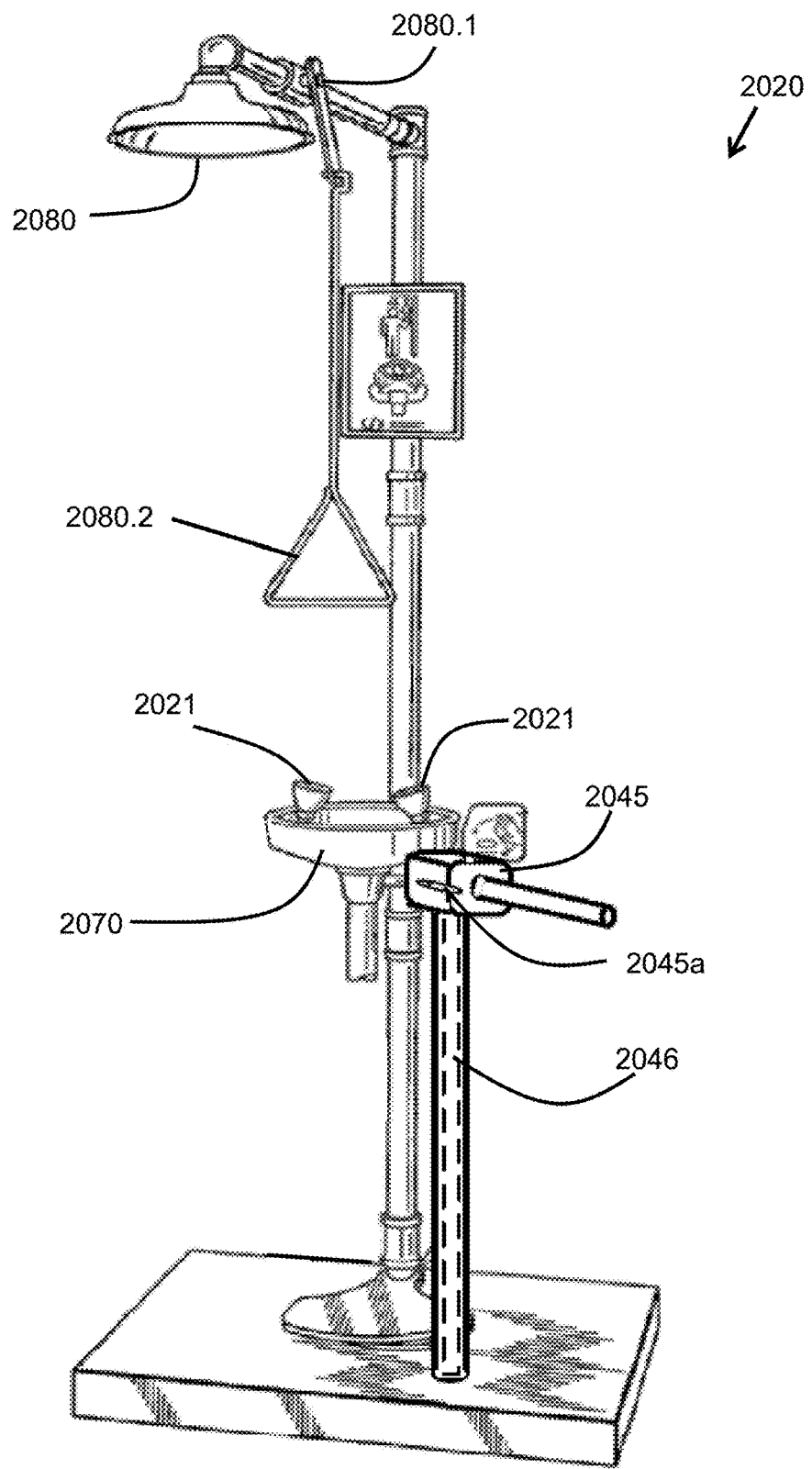
FIG. 34 is a side perspective view of an emergency wash station including some of the features of FIG. 30 or FIG. 39.

In some embodiments, the water provided to the emergency wash system from valve 2045 flows directly to the shower nozzle and eye nozzles that provide the water onto the user. However, in still further embodiments, water from an outlet of valve 2045 is provided to one or more downstream shutoff valves. In one embodiment (such as that shown in FIG. 30) the downstream shutoff valve, such as a valve 1750, has an output which is adapted to flow simultaneously to both the shower nozzle and the eyewash nozzles. In still other embodiments, there are separate shutoff valves for the shower nozzle and eyewash nozzle. Some embodiments of eyewash systems shown herein include a shutoff valve X-50 that controls the flow of water to the eyewash dispensing caps. In still further embodiments, an outlet of multi-position valve 2045 directs flow to a shower shutoff valve 2080.1, as best seen in FIG. 34. The user pulls on actuating handle 2080.2 to initiate flow of water from shower fixture 2080. It is understood that the design features of this valve 2045, as well as design features of other existing multi-directional valves, can be integrated into any of the multi-position valves X45 shown and described herein.

FIG. 34 shows an emergency wash and flushing system 2020 according to another embodiment of the present invention. Valve 2045 is shown closely integrated into an existing emergency wash system. As can be seen in comparing FIGS. 34 and 32, various embodiments of the present invention contemplate hydraulically coupling into the emergency wash system at any location between nozzles X80 and X21.

Figure 35:
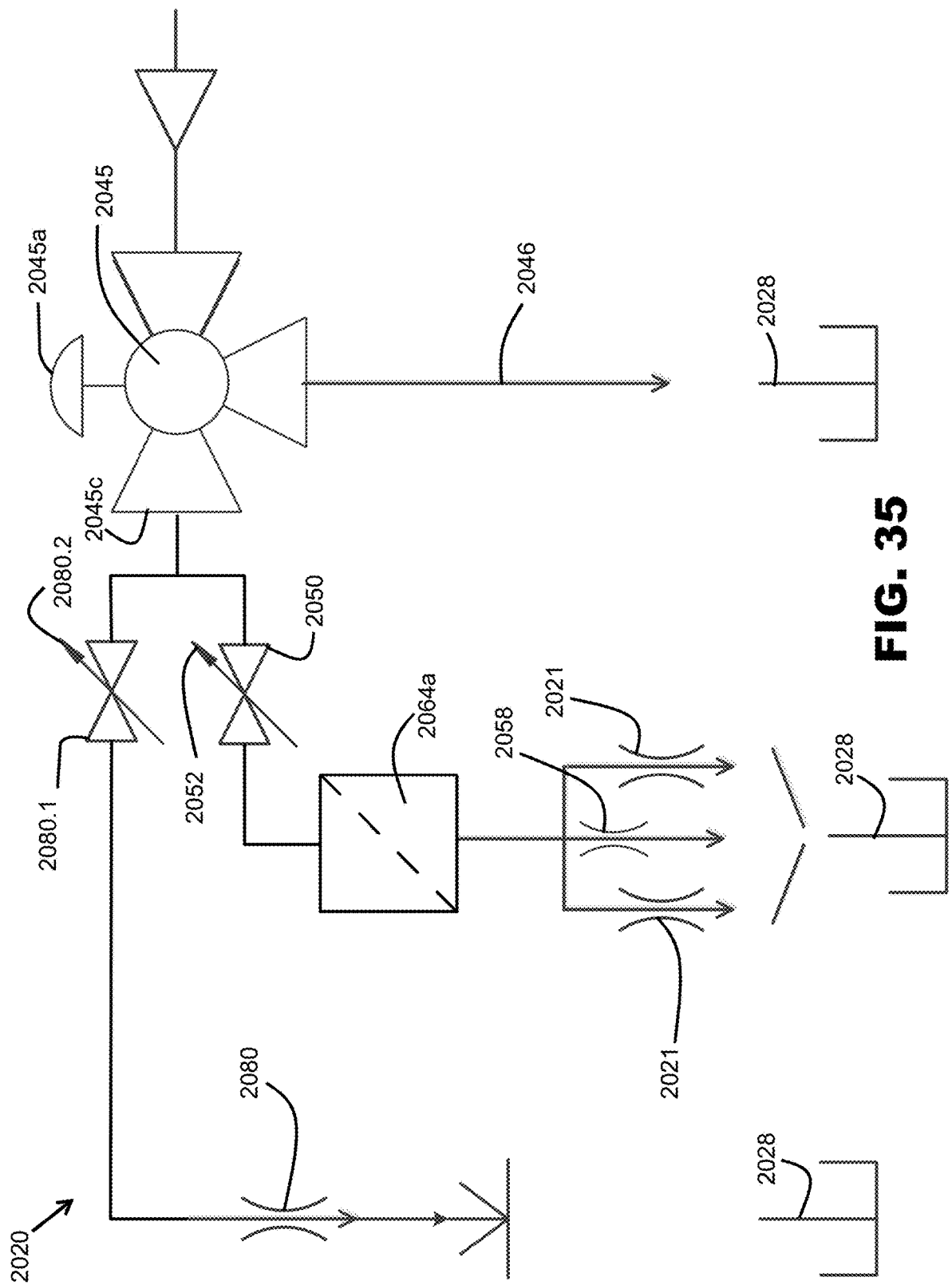
FIG. 35 is a schematic representation of the emergency wash system of FIG. 34.

FIG. 35 schematically represents various features of an emergency wash and flushing system 2020. Water flowing from exit 2045c of multi-position valve 2045 is directed to the inlets of manually-operated shutoff valves 2080.1 and 2050. Upon actuation of shutoff valve 2080.1 by pulling on handle 2080.2, water is provided to shower fixture 2080. In a similar manner, actuation of paddle 2052 by the user permits the flow of water through shutoff valve 2050 to one or more filters 2064a, and then through one or more dispensing caps 2020 and onto the eyes of the user. Although valves 2045, 2080.1, and 2050 have been shown separately, it is understood that the various on and off features of these components can be integrated into a single package, and further that the actuation handles 2045a, 2080.1, and 2052 can likewise be integrated from three handles into two handles, and in some embodiments from three handles into a single, multi-position handle.

System 2020 further includes a draining orifice 2058 that is in fluid communication with any chamber that feeds dispensing caps 2021. Preferably, draining orifice 2058 is a draining hole that is located in the appropriate housing of the dispenser caps at a location that is at the lowest point of that housing. Drain orifice 2058 in some embodiments is an aperture (preferably of a diameter greater than one-eighth of an inch) that is always able to provide water into drain 2028. Therefore, even when shutoff valve 2050 is closed, any water within the system from the outlet of shutoff valve 2050 to the internal chamber of the housing of dispensing caps 2020 is able to drain. Still further, when shutoff valve 2050 is opened and water under pressure is provided through filter 2064 to dispensing caps 2021, water likewise flows out of drain aperture 2058.

Still further, FIG. 34 shows a flushing tube 2046 that is substantially transparent. By having a transparent flushing tube 2046, the maintenance operator is able to visually verify that water is being flushed from the supply to the drain. This confirmation can be important in providing an entry in a maintenance log (which may be legally required in some jurisdictions) that the flushing did occur. Still further, in those embodiments in which tube 2046 is sufficiently transparent, the maintenance operator may be able to visually sense the clarity of the water being flushed. In yet other embodiments, the flushing means includes an electronic sensor located downstream of the outlet of the multi-purpose valve to verify by electronic signal that water was being flushed from the piping system through the flush tube.

Figure 36:
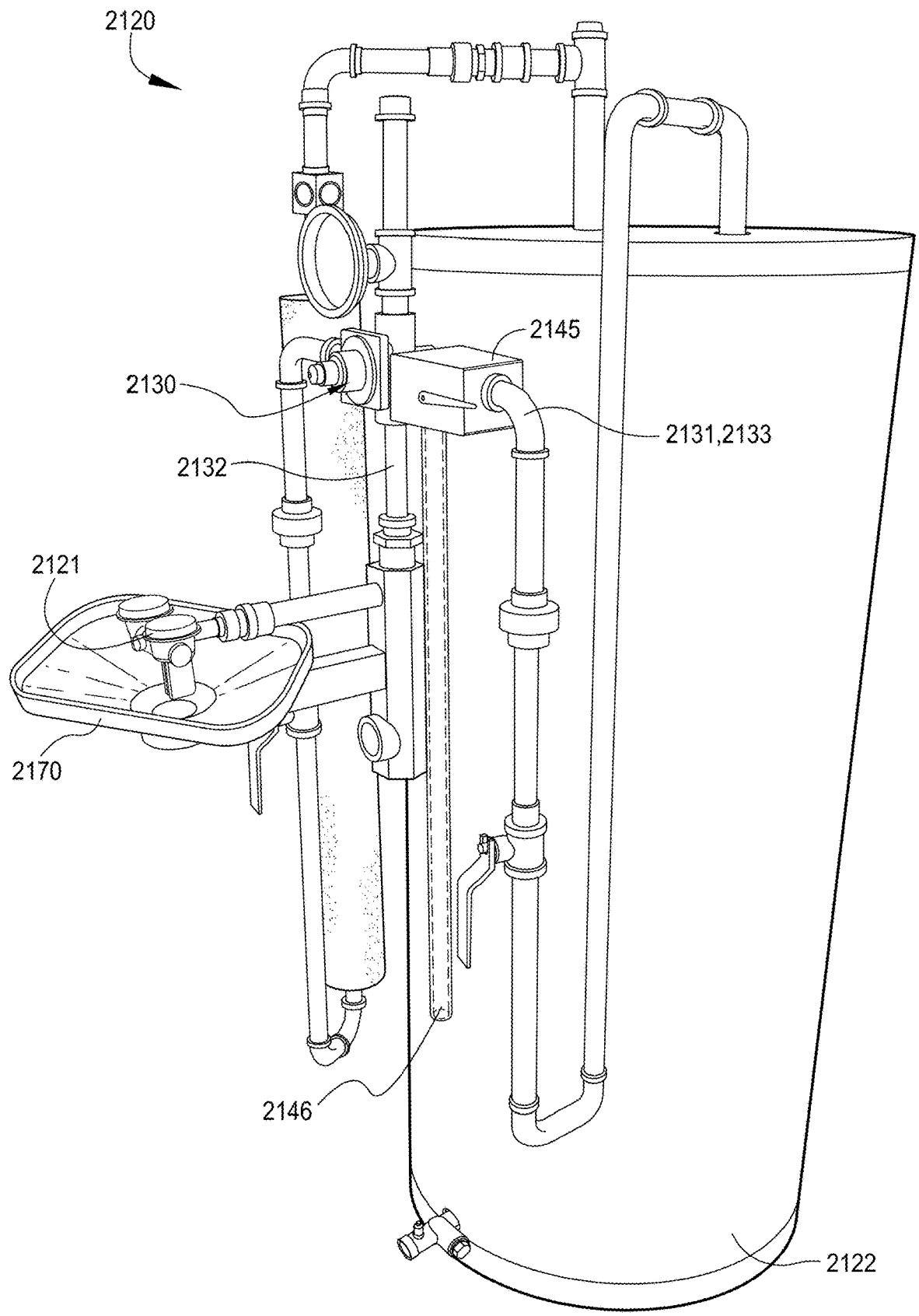
FIG. 36 is a side perspective view of an emergency wash station including some of the features of FIG. 30 or FIG. 39.

FIG. 36 shows an emergency wash and flushing system 2120 according to another embodiment of the present invention. System 2120 includes a source of hot water from a water heater that is provided to the eye washing nozzles 2120 by way of a thermostatically controlled valve. FIG. 36 schematically shows a multi-position valve 2145 and flushing tube 2146 provided to either or both of the cold inlet 2131 or hot inlet 2133 to the wash system. Although a single multi-position valve is shown and described, it is understood that still other embodiments include a second multi-position valve for the other of the hot or cold sources. Still further embodiments include a multi-position flushing valve that is located downstream of the thermostatically controlled valve (not shown in FIG. 36 for purposes of clarity).

Figure 37:
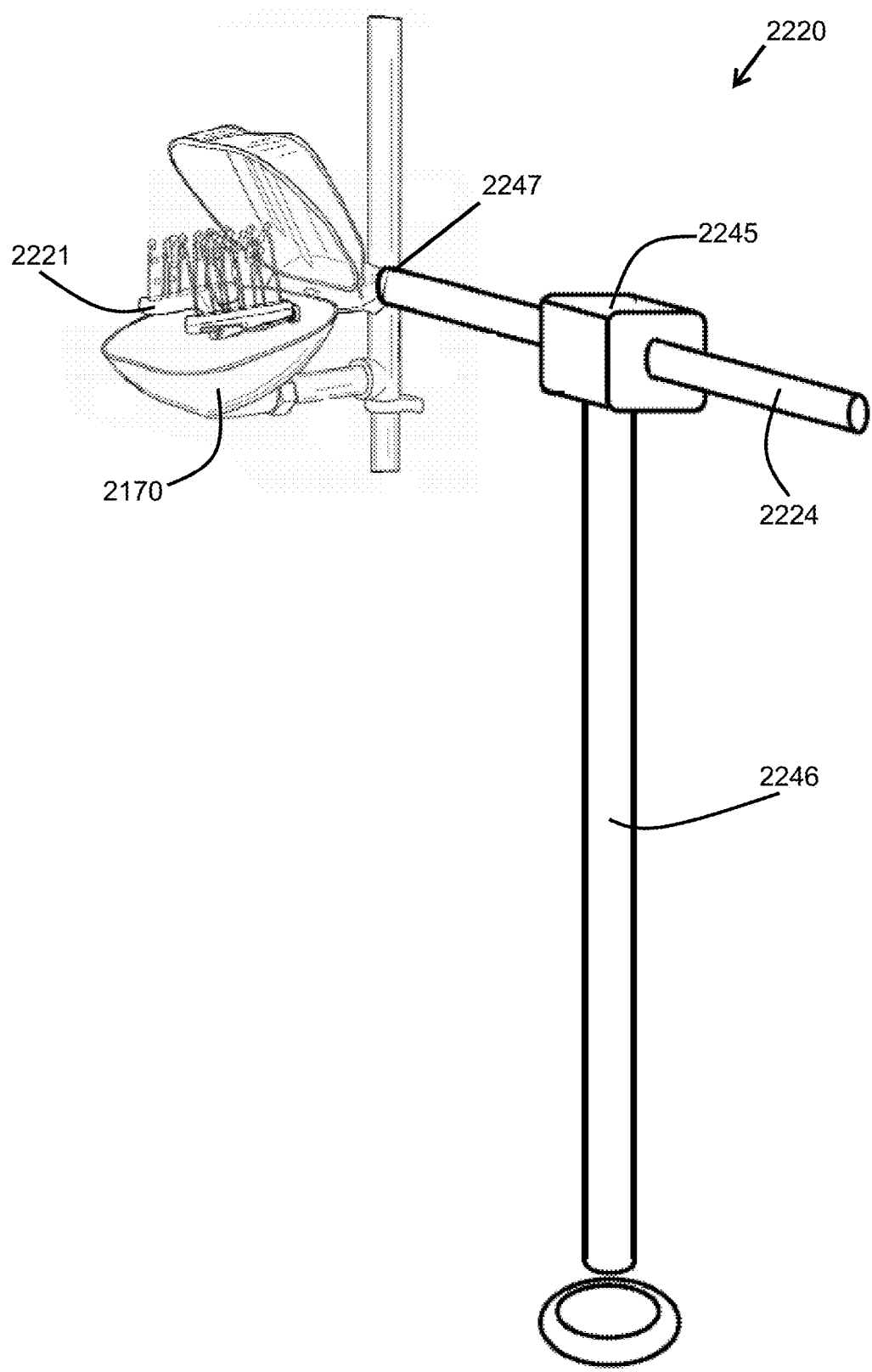
FIG. 37 is a side perspective view of an emergency wash station including some of the features of FIG. 30 or FIG. 39.
Figure 38:
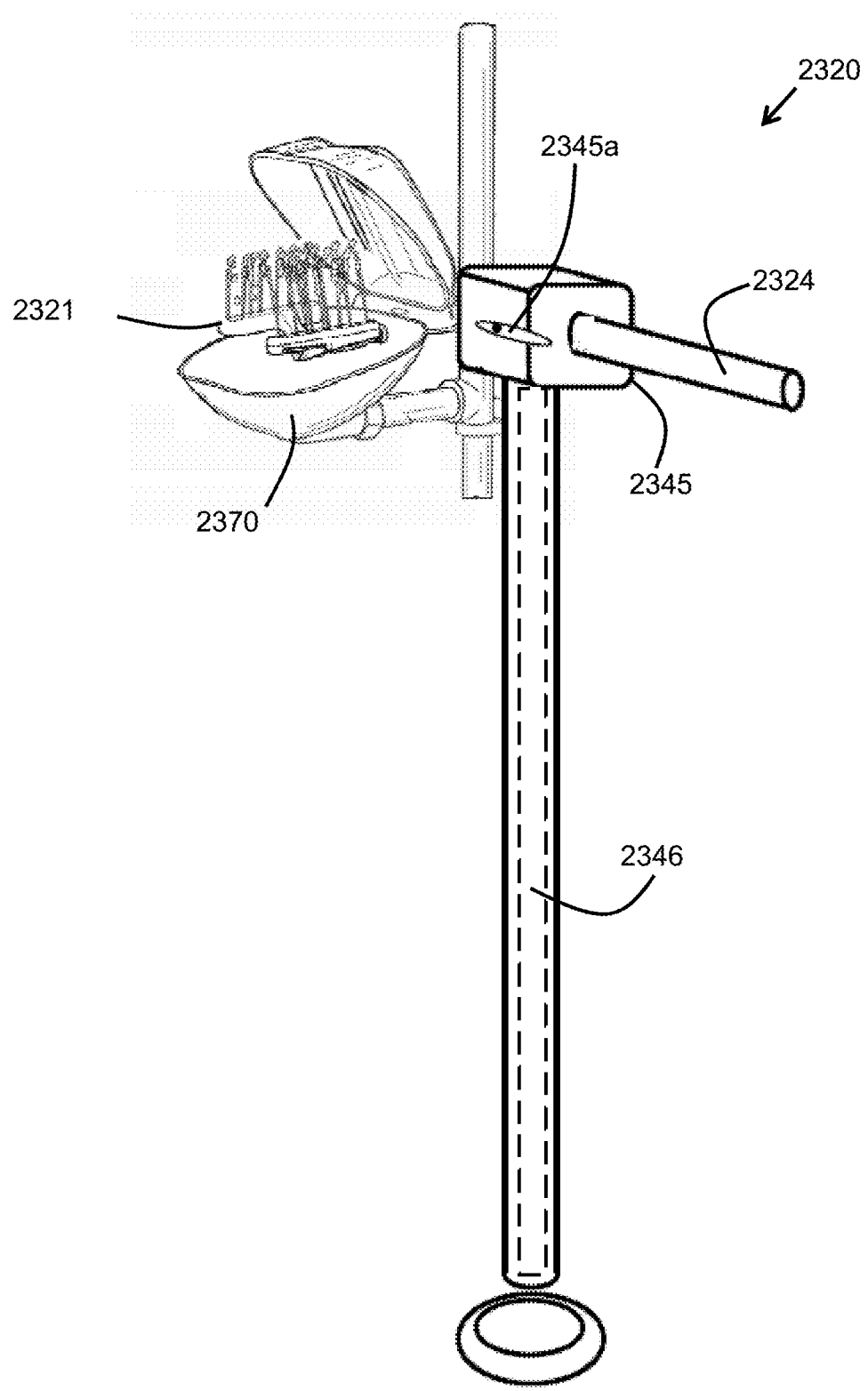
FIG. 38 is a side perspective view of an emergency wash station including some of the features of FIG. 30 or FIG. 39.

FIG. 37 shows a washing and flushing system 2220 according to yet another embodiment of the present invention. System 2220 illustrates that the flushing means described herein can be integrated into any type of emergency washing system. FIG. 38 illustrates the coupling of a washing system similar to that of FIG. 37, but incorporating a close coupled flushing system, and further incorporating a generally transparent flushing tube 2346.

Figure 39:
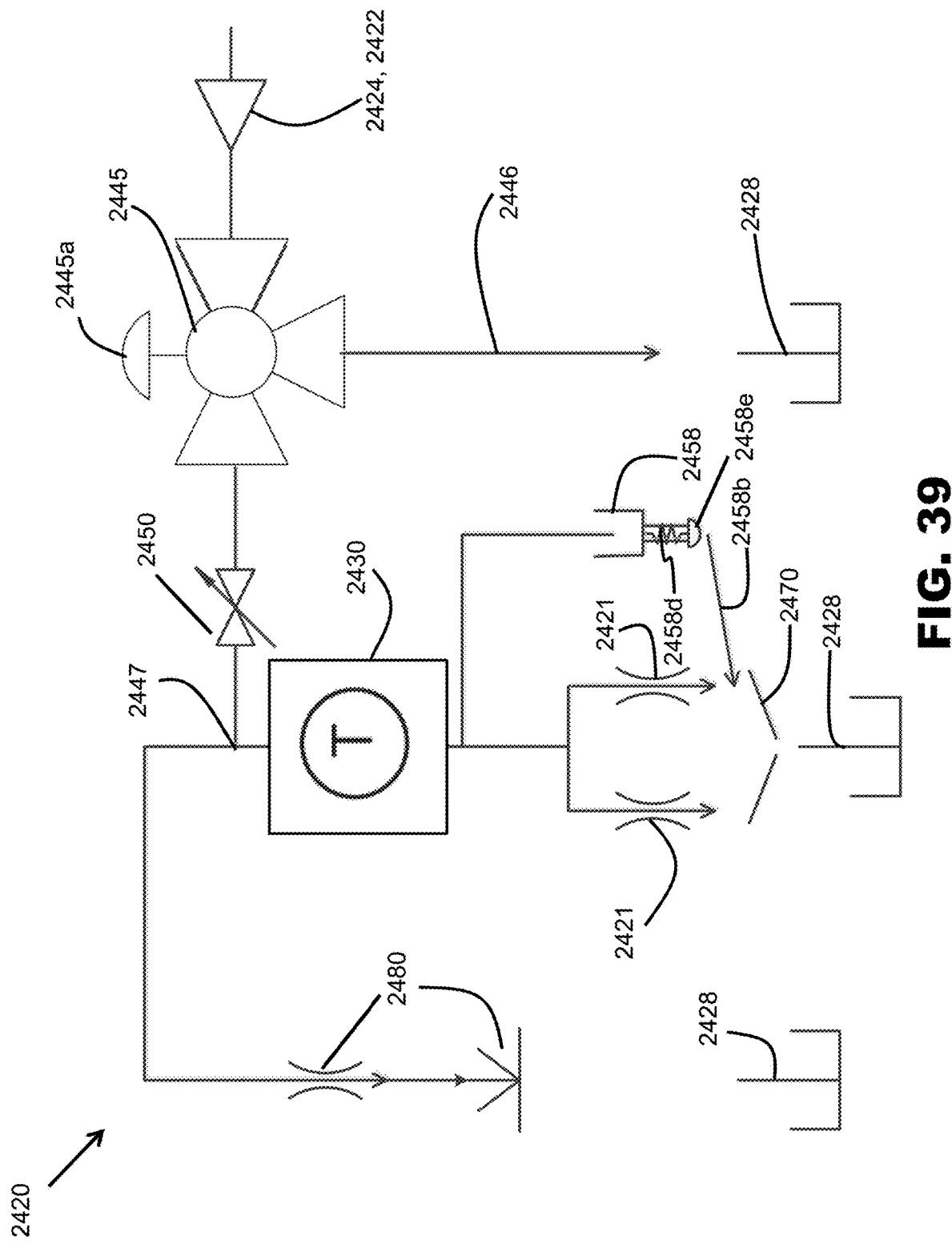
FIG. 39 is a hydraulic flow schematic of an emergency wash system according to yet another embodiment of the present invention.

FIG. 39 schematically represents a washing and flushing system 2420 according to another embodiment of the present invention. It is understood that FIG. 39 represents a system that can be provided in a variety of configurations, and in that respect FIG. 39 could be considered a schematic representation of a schematic representation. For example, FIG. 39 shows a shut off valve receiving water from cold and hot sources 2422, 2424, respectively, and a thermostatically controlled valve having a single inlet for the introduction of water. It is understood that a person of ordinary skill in the art would recognize that the schematic shown in FIG. 39 is a blending of multiple concepts. For example, one concept would include a multi-way valve that includes separate inlets for hot and cold, and separate outlets for hot and cold (along with an alternate outlet that drains). Both of these outlet flows would be provided to the thermostatically controlled valve. In yet another embodiment, the separate cold and hot flows are provided to the inlet of a thermostatically controlled valve, and the tempered water exiting that valve would instead be provided to a shut off valve (such as 2450), and subsequently to a multi-way valve (such as 2445), that would provide one of its outlets to the dispensing cups, and the other of its outlets to the drain. Pictorially, this latter configuration conceptually swaps the positions of valves 2445 and 2430 in FIG. 39.

System 2420 incorporates an expulsion valve 2458 located downstream of the emergency shutoff valve 2450. In some embodiments, expulsion valve 2458 is manually actuated by a maintenance operator to permit drainage of water that is downstream of outlet 2445c of multi-position valve 2445. By actuation of this manual valve, the maintenance operator is able to periodically flush any water that could be trapped in the emergency wash system, which could also contain contaminants. In one embodiment, valve 2548 includes a push button 2458e that is biased by a spring 2458d to maintain the valve at a closed position. When the maintenance operator pushes inward on button 2458e, water drains from the expulsion valve by way of drain 2458b. It is further understood that the other expulsion valves X58 disclosed and discussed herein can also be incorporated into a washing and flushing system.

Figure 40A:
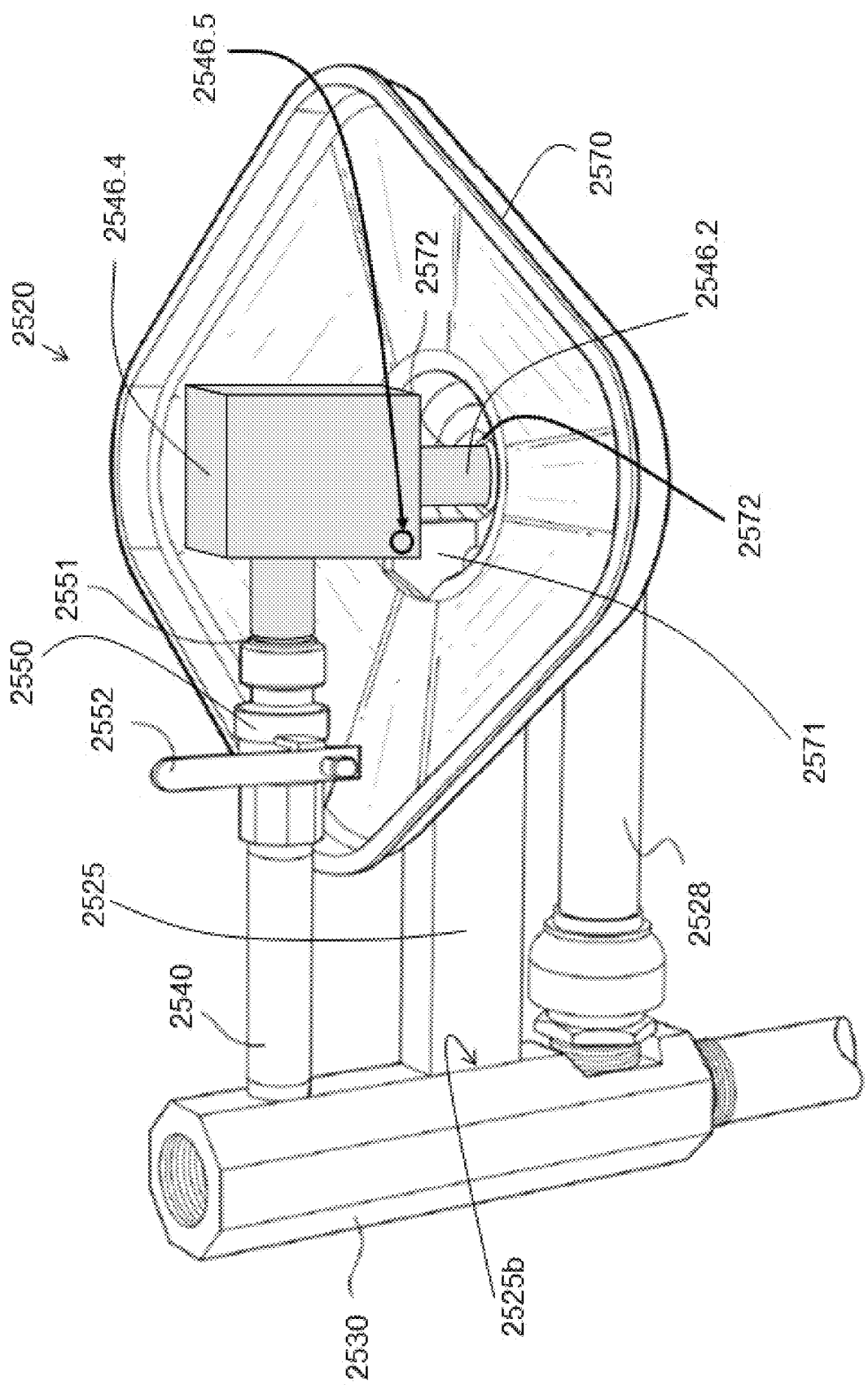
FIG. 40A is a left side, top perspective line drawing of an apparatus according to one embodiment of the present invention.
Figure 40B:
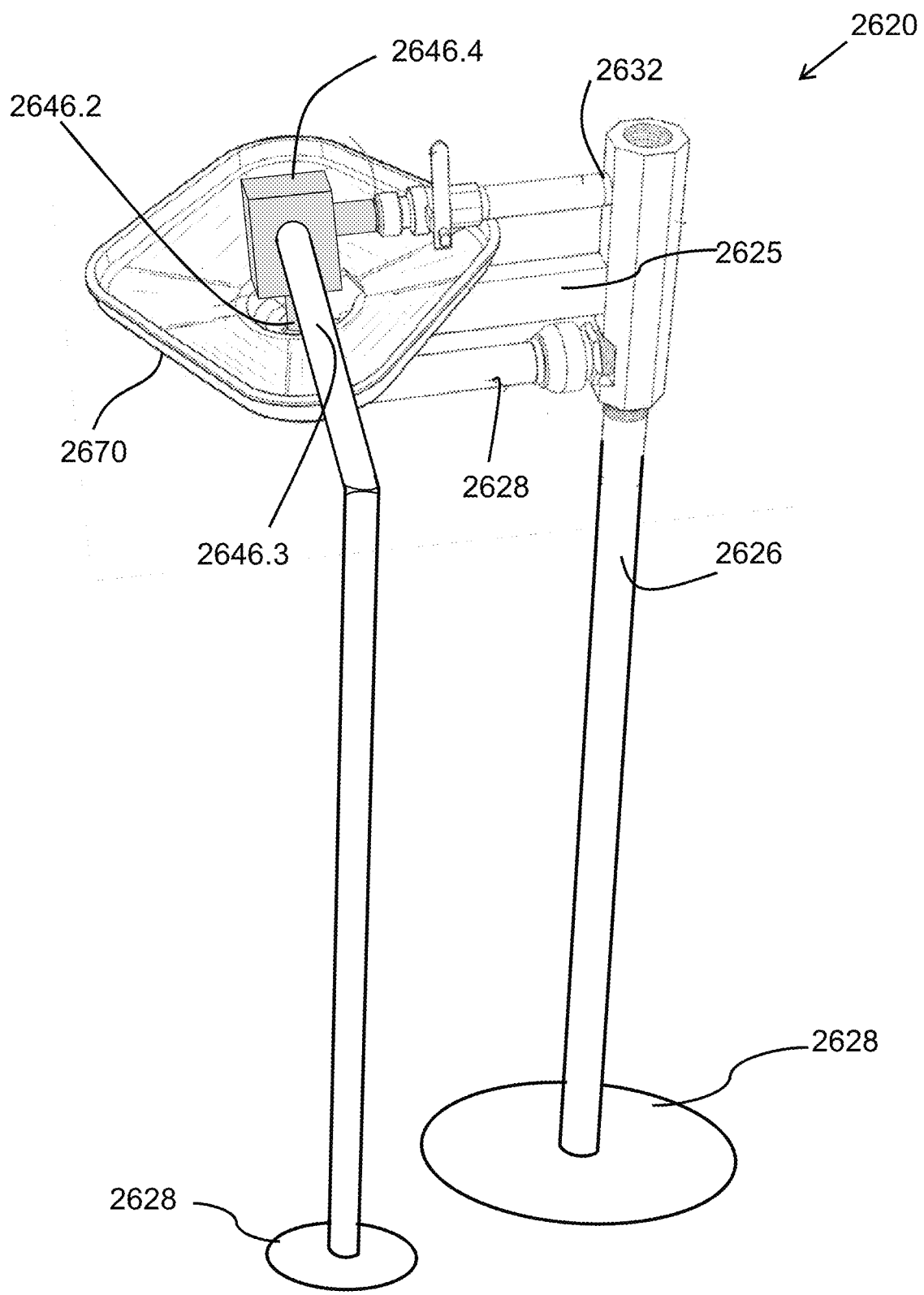
FIG. 40B is a top, right side perspective view of an apparatus according to yet another embodiment of the present invention.

FIGS. 40A and 40B show various embodiments of emergency washing systems adapted and configured to provide flushing of various components of the emergency washing system, and also to provide flushing of the source of water. It has been found in some applications that if the emergency washing system is not used on a regular basis that the stagnant water within the source plumbing can become unhealthy to use. Still further, simply flowing water through the standard emergency washing system may not adequately flush the source plumbing if the operator does not run a sufficient quantity of water through the emergency washing system. Since these washing systems typically have flow rates less than seven gallons per minute, and sometimes half of that, it is possible that the operator will not run the emergency washing system for a sufficient period of time to remove all of the contaminated water in the source plumbing.

In FIG. 40A, it can be seen that the outlet valve that incorporates the eyewash dispensing caps has been removed in its entirety, and replaced with a flushing housing 2546.4. In some embodiments, this outlet valve (X60) can include various water flow conditioning features (such as filters (X64a), flow restrictors, or flow control valves (X66), as examples), which create pressure drops that lower the flowrate. In order to achieve a fast flush, it is helpful to remove these water flow conditioning features. These features preferably are not present in flushing housing 2546.4 that replaces the outlet valve (X60). A flushing housing according to various embodiments of the present invention preferably has an internal flowpath substantially unobstructed, so as to permit the large flow of water with minimum pressure drop. However, it is understood that in some embodiments the flushing housing may include sediment traps, filters, and the like for collecting samples of the contamination that was present in the dead end leg of the plumbing for later analysis.

Preferably, flush housing 2546.4 is internally configured to provide minimal restriction to the flow of water, in order to facilitate a quick flushing. Still further, the body of the flush housing 2546.4 preferably includes at least one transparent portion in order to provide assurance of a sufficient flushing. As shown in FIG. 40A, flushing member 2546.4 includes an inlet that preferably couples to the same connection as the washing valve. In one embodiment, flush housing 2546.4 includes a quick connect fitting that readily couples to quick connect fitting 2551 of shutoff valve 2550. Water received from the shutoff valve is provided through this inlet into a system flushing outlet 2546.2 that provides the flushed water to the drain 2572 of basin 2570.

When the shutoff lever arm 2552 is moved to the flow position, water flows at a rate that is at least twice the flow rate when the eyewash dispensing caps are dispensing water for an emergency wash. Therefore, eye washing system 2520 can be operated in two modes: a flushing mode that is preferably optimized to provide a high flow rate of water, and an eyewash mode, in which the system provides tepid water at a range of flow rates suitable for washing the eyes of a person bent over basin 2570. In some embodiments, flush housing 2546.4 includes a portion that is substantially transparent, which permits the flushing operator to maintain the flush mode of operation until there is visual indication of clear water.

It can be seen that system 2520 includes an indexing feature 2571 on bowl 2570. This indexing feature 2571 couples into a complementary-shaped indexing feature (such as a groove) of the body of flushing housing 2546.4. Further, it has been found in some systems that if there is a sufficiently high flowrate through flushing block 2546.4, that the source drain may not be able to accommodate the high flowrate, such that water backs up through drain 2572, and subsequently spills out of basin 2570. To address this situation, various embodiments of the present invention include a system flushing connection 2546.2 that seals within the drain 2572. In such embodiments, the first connection of housing 2546.4 to shutoff valve 2550 can include a flexible joint (or flexible tube) to permit the alignment created by the sealing of connection 2546.2 within drain 2572. In still further embodiments, flush housing 2546.4 includes means for attaching the flush housing to the basin 2570. As shown in FIG. 40A, in one embodiment there is a setscrew 2546.5 that can be tightened to provide a frictional fit with attachment feature 2571. In still further embodiments, instead of a setscrew, this coupling feature includes a cylindrical pin that extends through the flush housing, and also through a hole in alignment feature 2571.

In still further embodiments of the present invention, the flushing housing can be substantially the same as the body XX61 of an outlet valve XX60. As previously discussed, an outlet valve assembly XX60 in one embodiment includes a body XX61, filters XX64a, flow control valve XX66, and supports a pair of dispensing caps (or spray nozzle assemblies) XX21. Some embodiments of the present invention utilize only the body XX61 as a flushing housing XX46. By removing the filters, flow control valve, and spray nozzle assembly, the internal flowpath of the body XX61 is substantially unobstructed in comparison to the assembled outlet valve XX60. Therefore, in some embodiments, an emergency washing system XX20 can be provided in kit form, and including a second outlet valve body XX61. When used as a flush housing, this body XX61 is preferably turned upside down, so that the outlets XX64 are directed toward the return basin XX70. In still further embodiments, the flushing housing is the same as the body of the outlet valve XX60 being used, except that the maintenance technician removes the obstructions in the outlet valve assembly, including the filters, flow control valve, and removing the dispensing caps.

Referring to FIG. 40B, there can be seen an emergency eyewash system 2620 similar to the system 2520, except for having a flush housing 2646.4 that incorporates two outlets. A first system flush outlet 2646.2 provides water to the normal drain for the washing system, and a second flushing flowpath 2646.3 provides a parallel route for flushed water into a drain 2628.

FIGS. 41-45 show various aspects of an emergency washing system 2720 according to another embodiment of the present invention. Referring to FIGS. 41A and 41B, system 2720 can be seen in front and side orthogonal views. A stand 2726 that also functions as part of a flowpath leading to drain 2728 can be seen connected to the housing 2734 of a thermostatically controlled mixing valve 2730. Housing 2734 is preferably an integrally cast body that provides both water flow functions as well as support functions for system 2720.

Figures 41A, 41B:
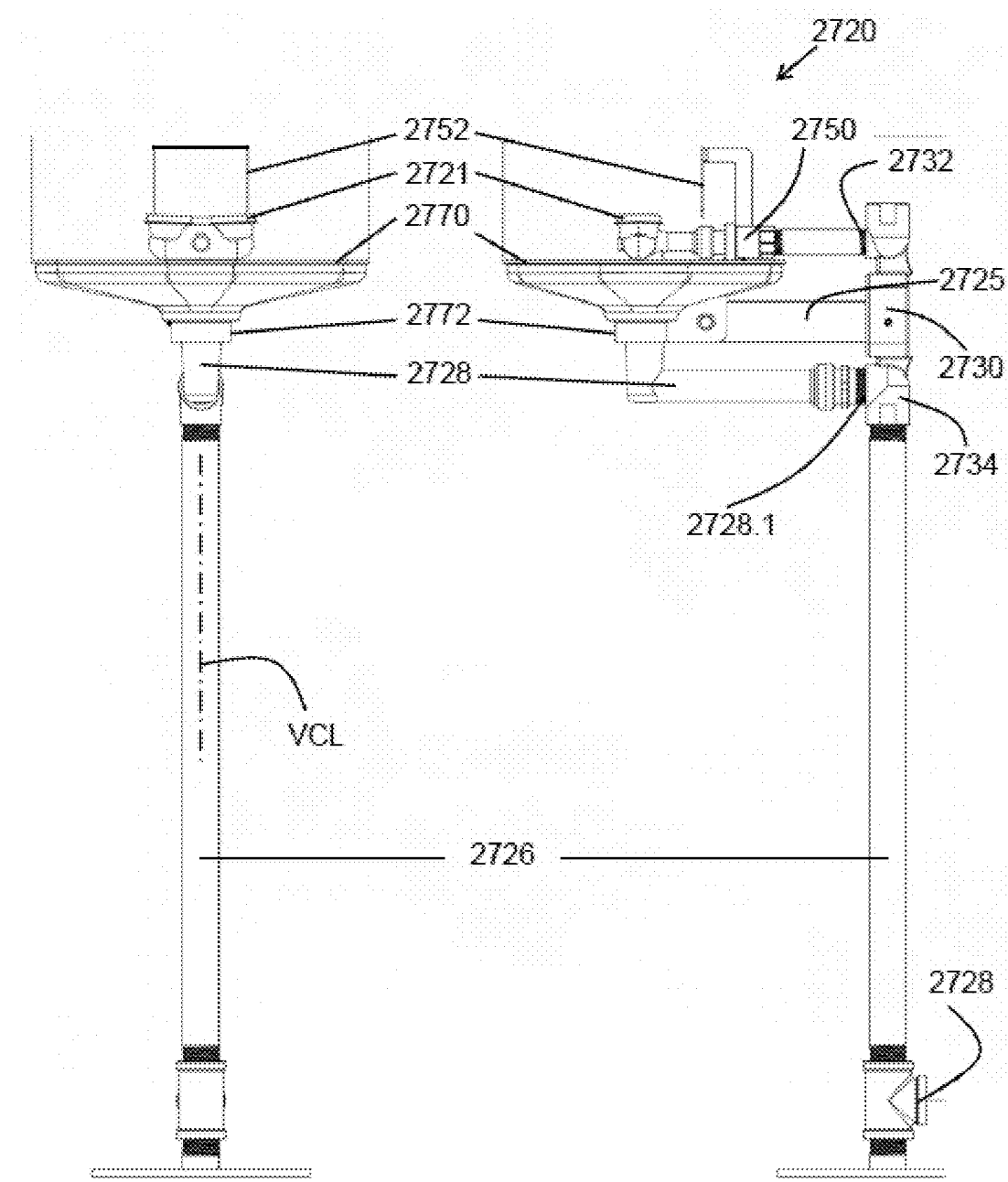
FIG. 41A shows a front view of an eye washing system according to another embodiment of the present invention.
FIG. 41B shows a side elevational view of the apparatus of FIG. 41A.

As best seen in the side view of FIG. 41B, housing 2734 incorporates a cartridge valve for thermostatic mixing, two water inlets, two water outlets, a water return outlet, an attachment feature (such as an aperture) for physical support of the drain basin, and a provision for supporting the entire emergency washing system, including the shutoff valve, flow control valve, water dispensing caps, and the like. Extending in a frontal direction from housing 2734 can be seen a topmost tube that provides flow communication and physical support from the metered flow outlet 2732 to the inlet of the shutoff valve 2750. A bottommost tube also extending frontally outward can be seen interconnecting a water return port 2728.1 to the draining aperture 2772 of basin 2770. In between these tubes is a support arm 2725 that extends frontally outward in the same direction as the two tubes, and which is coupled at one end to body 2734, and at the other end to basin 2770. Referring to the front elevational view of FIG. 40A, it can be seen that the top tube, support arm, and bottom tube are in substantial alignment along a vertical center line (VCL) of system 2720.

In one embodiment, washing system 2720 is substantially balanced above a pedestal base. With this packaging and alignment, there are substantially no right and left imbalances that act to topple system 2720 to either the right or left. Instead, the pedestal base can be adapted and configured primarily for support of the vertical weight, and for support of the imbalance extending frontward (as best seen in the side elevational view of FIG. 40B). In another embodiment (not shown), washing system 2720 includes a flow return pipe that receives drained water from second water compartment 2730b and provides the drained water to the plumbing system return (such as a sewer system). However, the pipe providing the returned water to the floor drain is preferably supported above the floor drainage hole by an air gap. This air gap is established to limit the possibility of back flow.

FIGS. 42 through 45 show additional exterior and cross sectional views of valve 2730. It can be seen that the housing 2734 incorporates cold water and hot water inlets 2731 and 2733, respectively, and each being oriented substantially perpendicular to a mixed flow outlet 3732. For purposes of efficient packaging of the internal mechanisms of valve 2730, preferably the cold and hot inlets 2731 and 2733 are placed at different elevations. In some embodiments, there is an auxiliary tempered fluid outlet 2732b that provides mixed water to a showerhead or other dispensing nozzle.

Figure 42A:
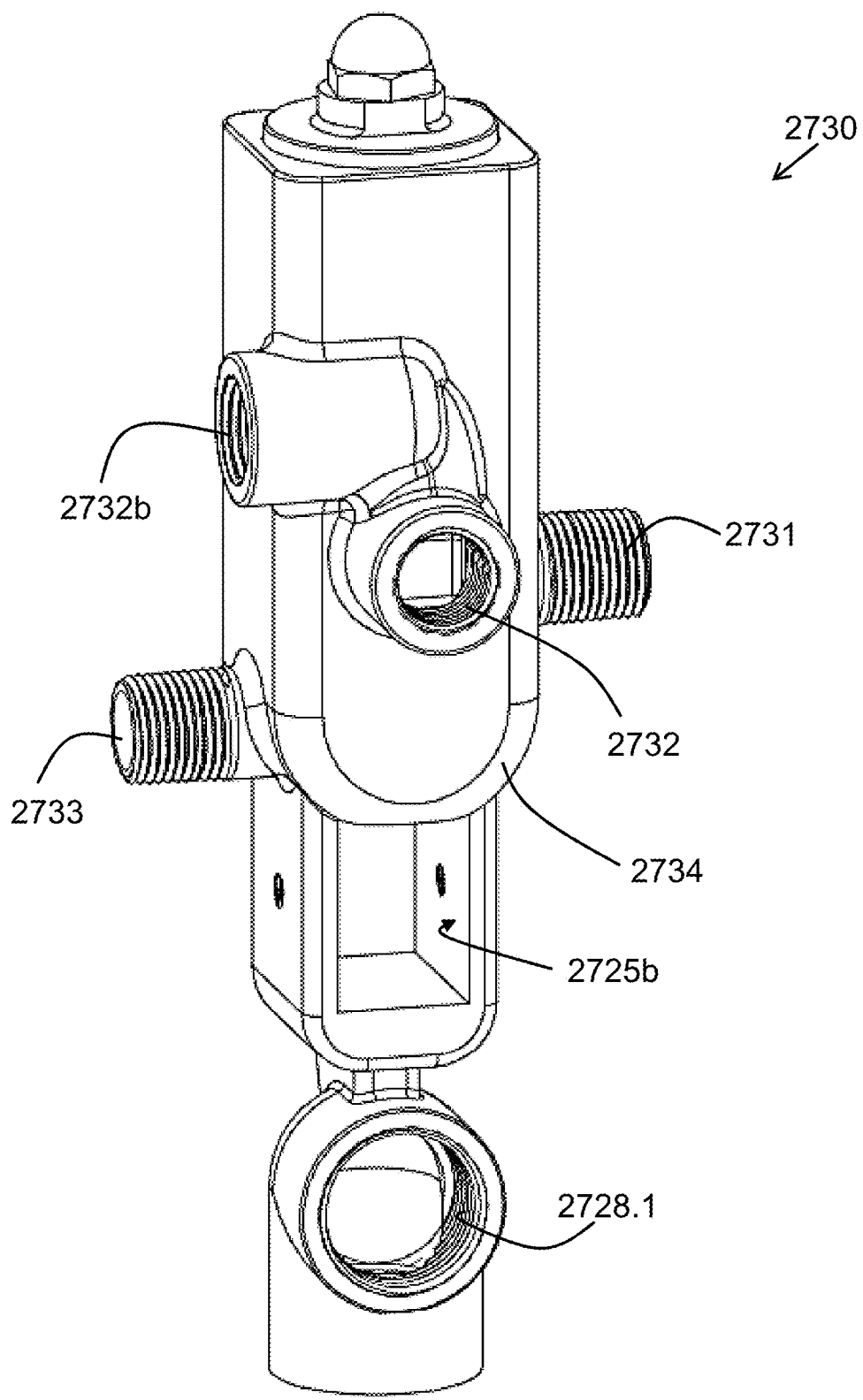
FIG. 42A is a left, front, top perspective line drawings of the integrated assembly according to one embodiment of the present invention as shown in FIG. 41A and FIG. 41B.
Figure 42B:
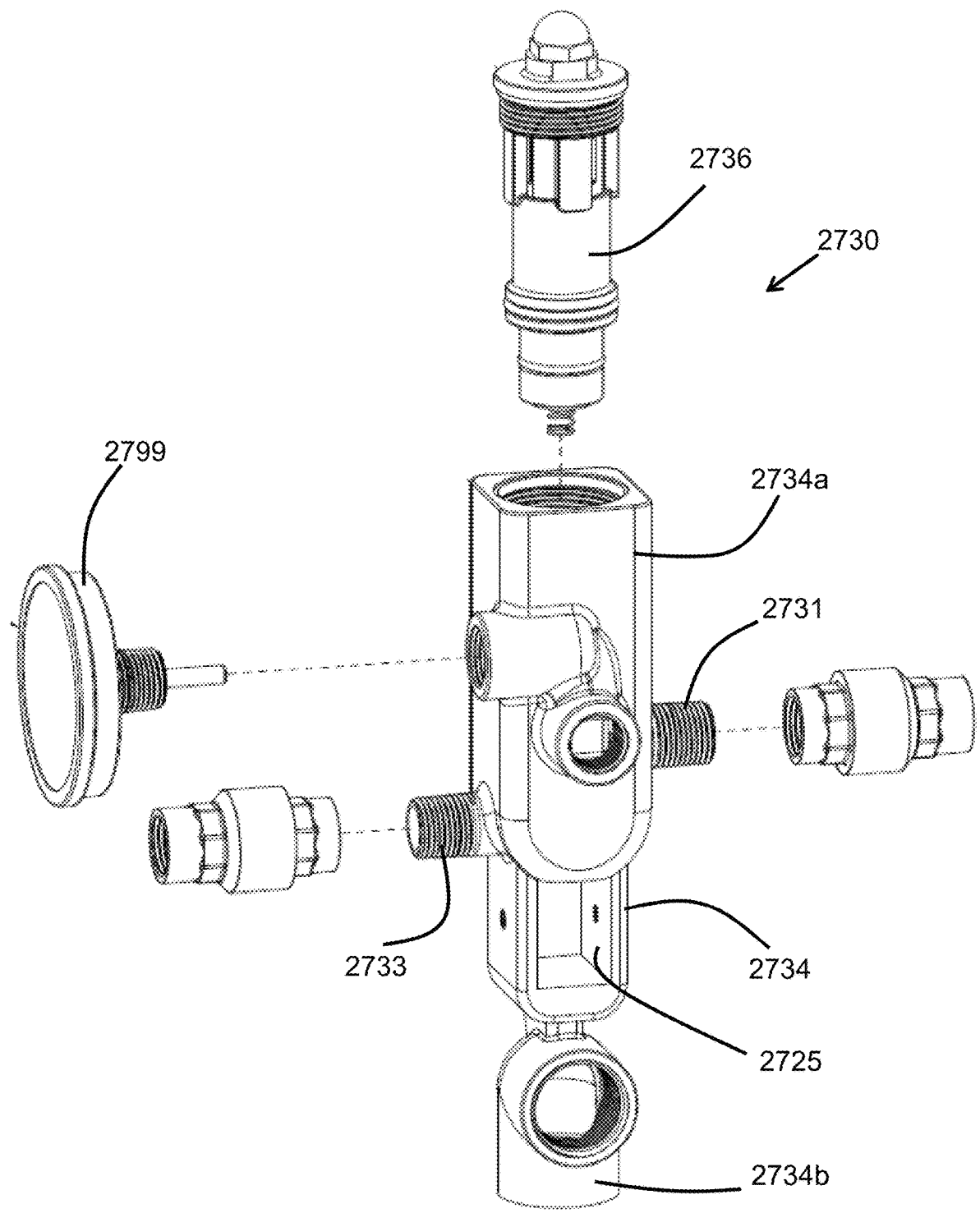
FIG. 42B is an exploded view of the apparatus of FIG. 42A, and including some other components typically attached thereto.

FIG. 42B presents an exploded view of a thermostatically controlled mixing valve 2730 according to one embodiment of the present invention. Valve 2730 preferably includes a body 2734 having a first water compartment 2734a located above a second, separate water compartment 2734b. Separating the two compartments is a structural section that defines a support aperture 2725b. The first water compartment 2734a preferably receives an assembled cartridge valve 2736. Cold and hot inlets 2731 and 2733 are preferably coupled to sources of cold and hot water, respectively, by way of check valves. In the embodiment shown in FIG. 42B, a thermometer 2799 is threadably received within a port of body 2734, by which a temperature sensor is placed in the contact with mixed fluid within first water compartment 2734a.

Figure 42C:
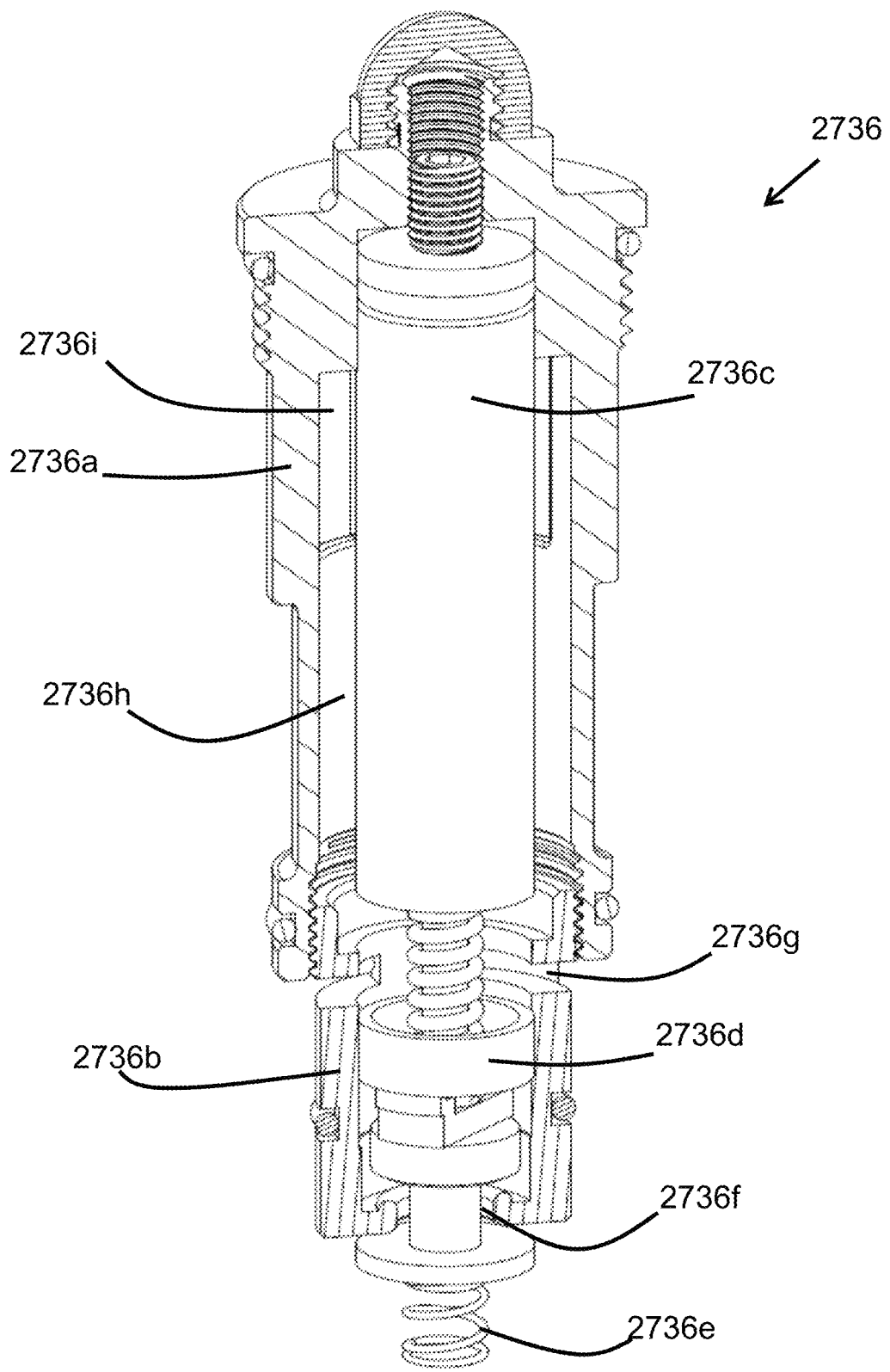
FIG. 42C is a partial cross sectional view of a portion of the apparatus of FIG. 42A.

FIG. 42C shows a partial cutaway view of a cartridge valve 2736 according to one embodiment of the present invention. Cartridge valve 2736 comprises a first cartridge body 2736a that is threadably coupled to a second cartridge body 2736b. It can been seen that first body 2736a includes a sealing O-ring near the top and a second sealing O-ring outside of the threads, this top O-ring sealing the cartridge within the valve housing 2734, the bottom O-ring sealing an internal chamber containing mixed flow from internal chamber containing cold flow. Second cartridge body 2736b includes an O-ring around its outer diameter that separates the hot flow chamber from the cold flow chamber.

Contained within the first cartridge body is a thermostat assembly 2736c. An acorn nut at the top of the cartridge assembly covers a temperature adjusting screw. The bottom end of thermostat assembly 2736c extends downward and controls the position of a multi-piece shuttle valve 2736d. Second cartridge body 2736b includes hot and cold inlet passages 2736f and 2736g, respectively, each of which is in fluid communication with the corresponding source of water. The sliding movement of shuttle 2736d relative to the slots 2736f and g controls the relative proportions of hot and cold water that flow into a mixing chamber 2736h that generally surrounds thermostat assembly 2736c. Mixed water from chamber 2736h flows out of one or more mixed flow outlet slots 2736i, and on toward the emergency wash nozzle housing. The sliding action of the shuttle valve relative to the second cartridge body 2736b establishes variable flow area openings for each of the hot and cold water flows. Each variable flow opening has one boundary defined by the second cartridge body 2736b, and the other boundary defined by the relative placement of shuttle valve 2736d.

A coil spring 2736e biases the shuttle valve 2736d upward toward a position that would seal hot inlet 2736f. In the event of some types of failure of the thermostat assembly 2736c, the axial load of the thermostat on the shuttle is relieved, and the biasing force from spring 2736e pushes shuttle 2736d to a position that seals off the flow of hot water, and prevents hot water from entering chamber 2736h.

It can be seen by inspection of FIG. 42B that the top, first water compartment 2734a is generally maintained at an internal pressure that is about the same as the pressure of the source water of the building's plumbing system. In contrast, the internal pressure within the bottom, second compartment 2734b is maintained substantially at atmospheric pressure. Preferably, this lower water compartment is in fluid communication with the return system of the building plumbing, and it is still further preferred that the drain pipe extending downward from compartment 2734b be provided with an air gap relative to the floor return opening, either of which maintain this compartment at ambient pressure.

Body 2734 further includes a water return port 2728.1 located below mixed fluid outlet 2732. Return port 2728.1 provides water expelled from the dispensing caps and collected in the basin into a flow channel that provides the water to a drain system. In between the mixed flow outlet 2732 and the water return port 2728.1, there can be seen a support aperture 2725b that is adapted and configured to provide physical support and stability to the support basin 2720. If a user of the emergency wash system 2720 were to place their weight on wash basin 2770, at least part of this weight would be supported by a load path from the basin 2720 to an arm 2725, and ultimately into housing 2734 by way of support aperture 2725b. Otherwise, the weight of the user would be supported by the bottommost drain tube. In some applications, this bottommost drain tube may not be structurally sufficient to support the leaning weight of user, and in yet other embodiments may be a flexible coupling incapable of supporting any weight. Still further, supporting the weight of the user through the bottommost tube can lead to leakage at the couplings.

In one embodiment body 2734 is cast to include a support aperture 2725b that has a cross sectional shape that is substantially the same as the cross sectional shape of the support arm 2725 which is received in the aperture in an assembled system 2720. In some embodiments, aperture 2725b is a thru-aperture that is substantially rectangular and close-fitting around the rectangular periphery of a support arm 2725. By having a non-circular cross sectional shape, aperture 2725b is able to resist any torque that is applied to arm 2725 by the weight of the user or the weight of the basin 2770. The interconnection of the support arm 2725 and basin 2770 can be of any type, including by way of example the connection depicted in FIG. 23E.

Figure 43A:
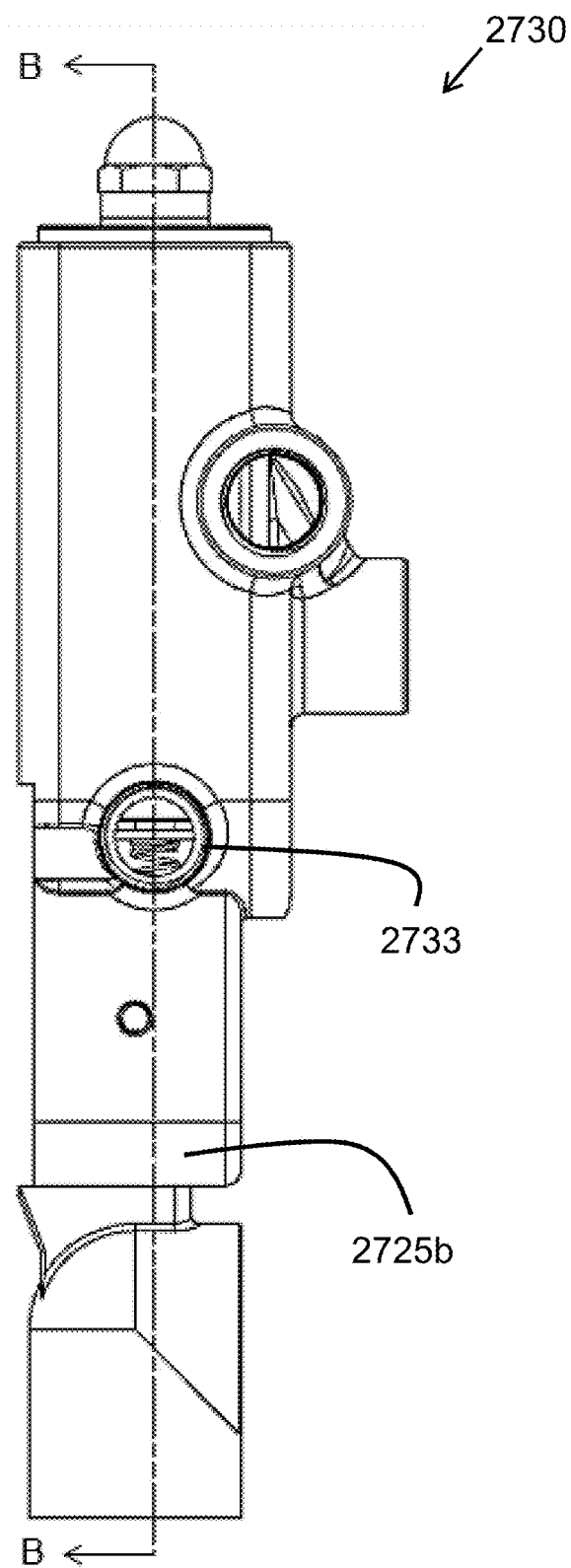
FIG. 43A shows an elevational exterior side view of the apparatus of FIG. 42A.
Figure 44A:
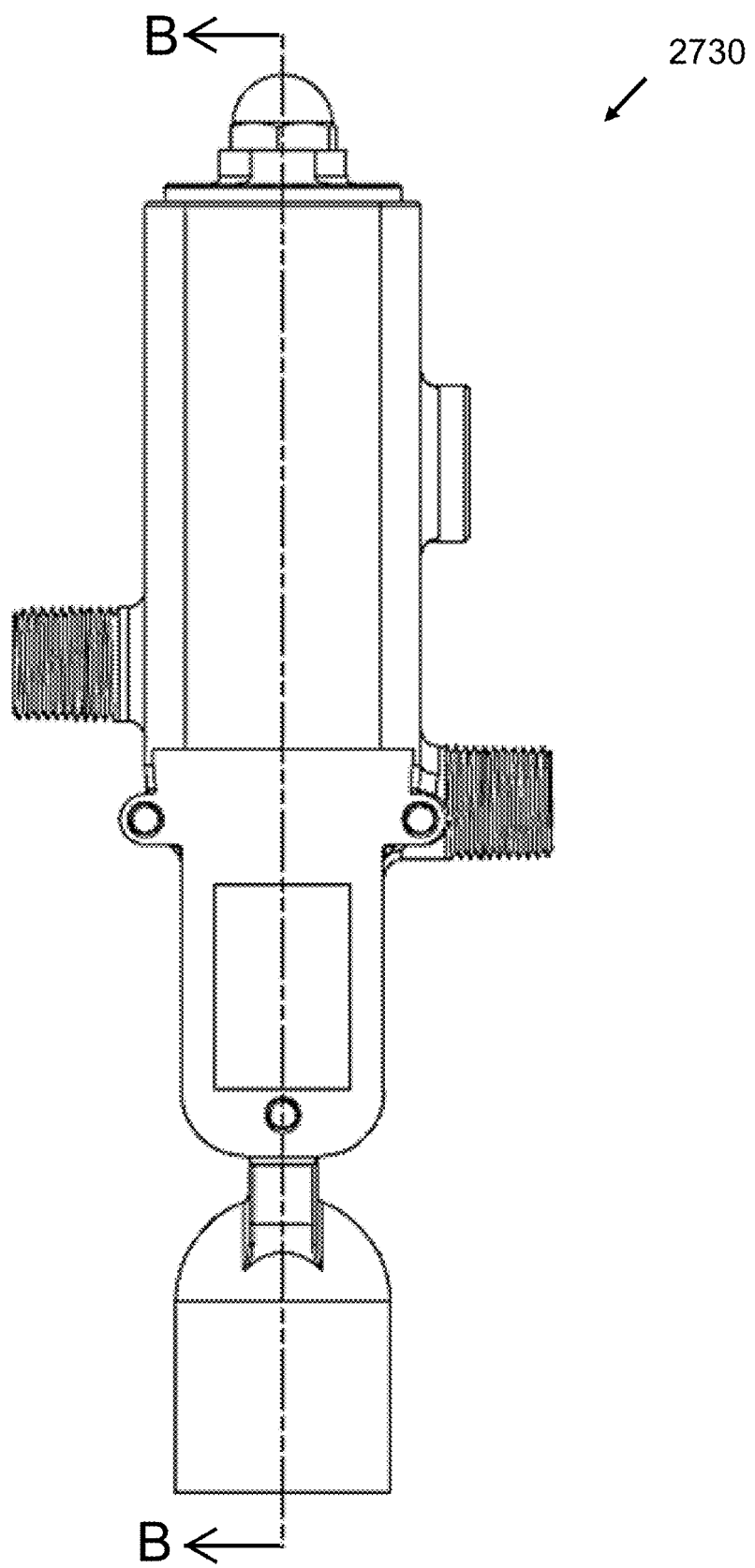
FIG. 44A shows an elevational rear exterior side view of the apparatus of FIG. 42A.
Figure 44B:
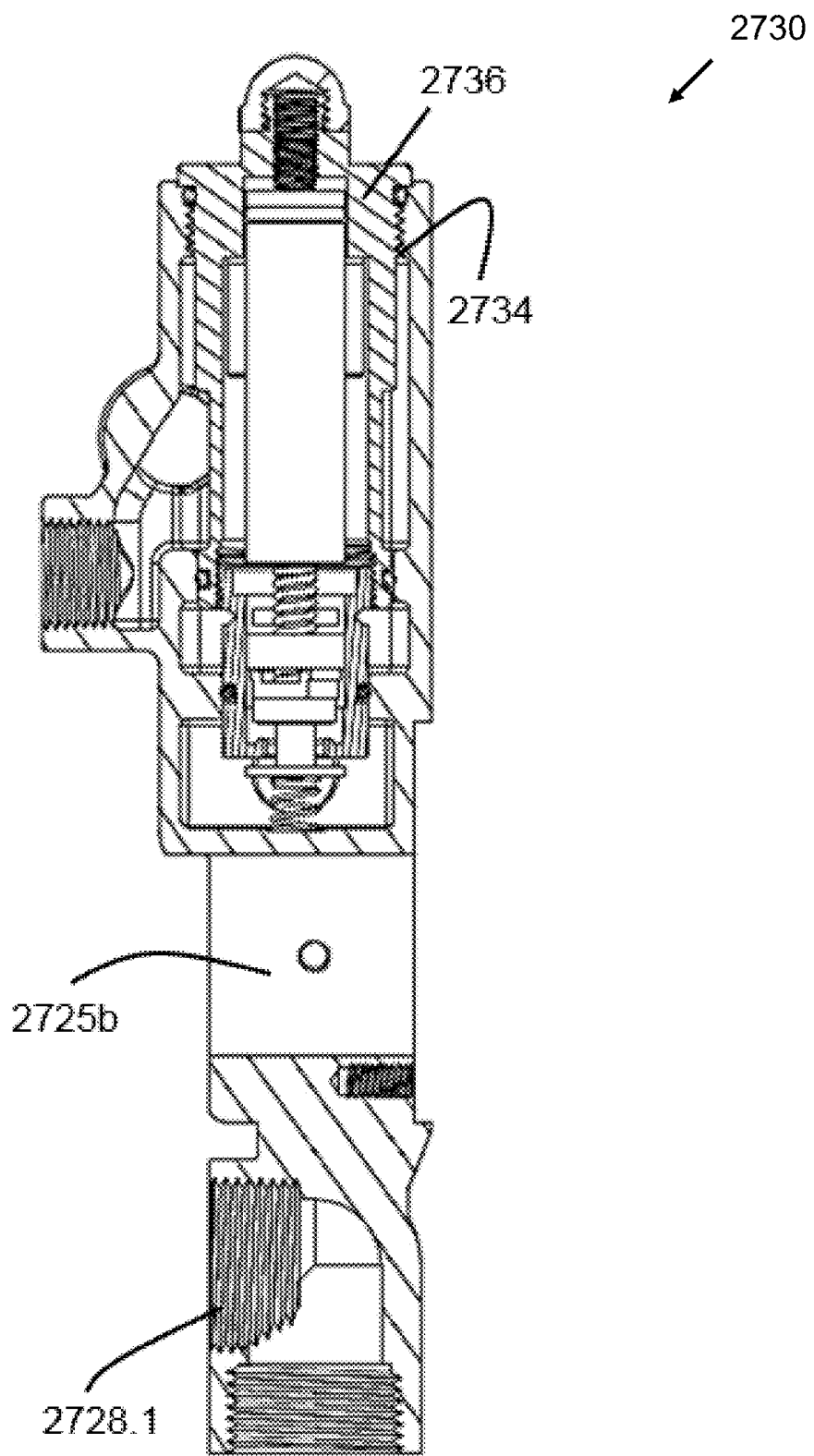
FIG. 44B is a cross sectional view of the apparatus of FIG. 44A as taken along line B-B.

As can be seen in FIGS. 42A, 43A, and 44B, a sidewall that partially defines aperture 2725b can include, in some embodiments, a threaded hole. In such applications, and especially where support arm 2725 is close fitting within the aperture, a setscrew can be torqued into the threaded hole to remove any looseness between the support arm and the support aperture.

Figure 43B:
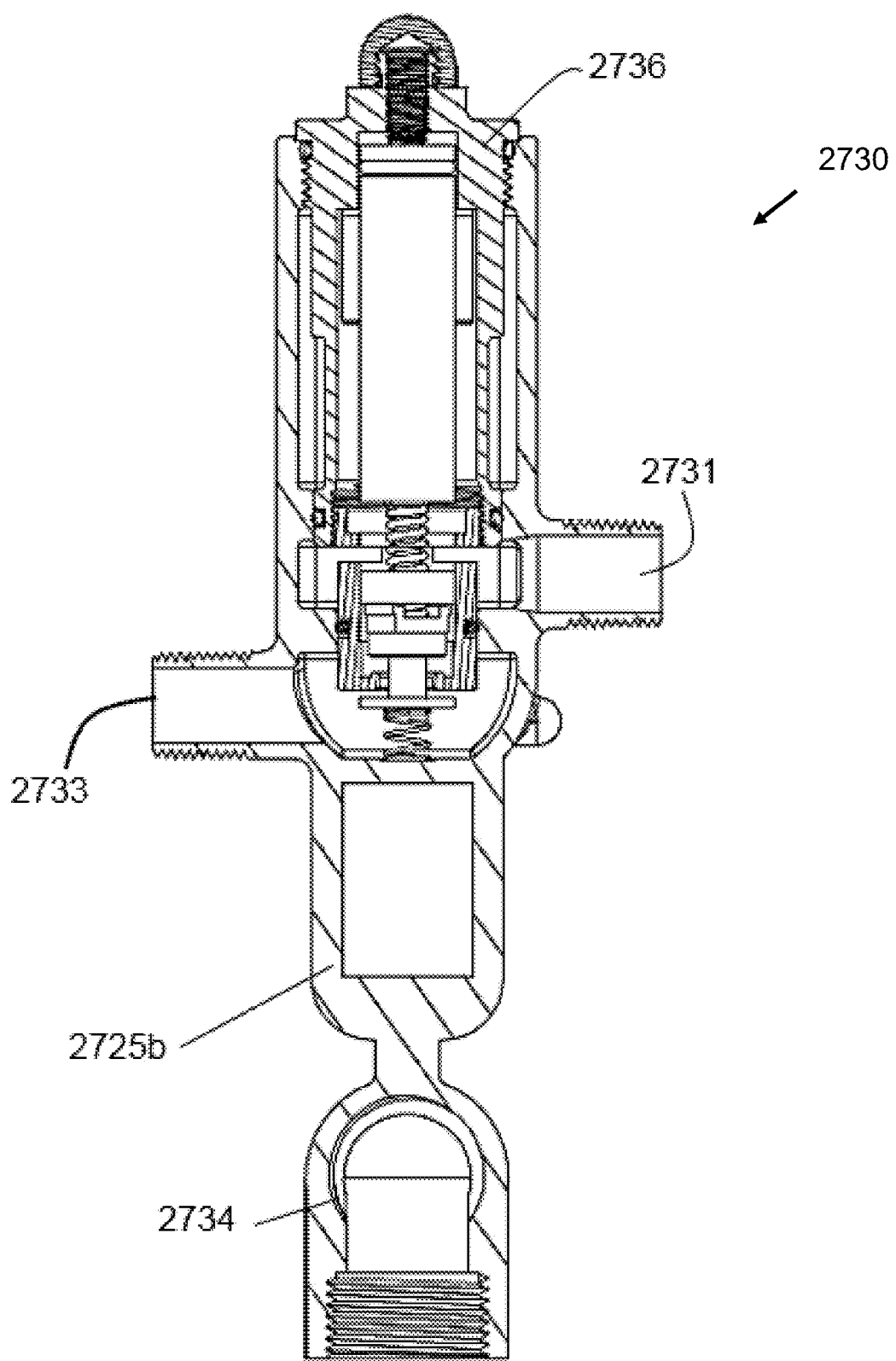
FIG. 43B is a cross sectional view of the apparatus of FIG. 43A as taken along line B-B.

Referring to FIGS. 43B and 44B, it can be seen that the structure surrounding the aperture blends into the structure surrounding the water return 2728.1. In some embodiments, this structural interconnection between the support aperture 2725b and the water return 2728.1 is necked down to minimize the usage of material (such as brass), while still maintaining a vertical support structure able to support vertical loads, lateral loads, and bending moments applied to body 2734.

Figure 45:
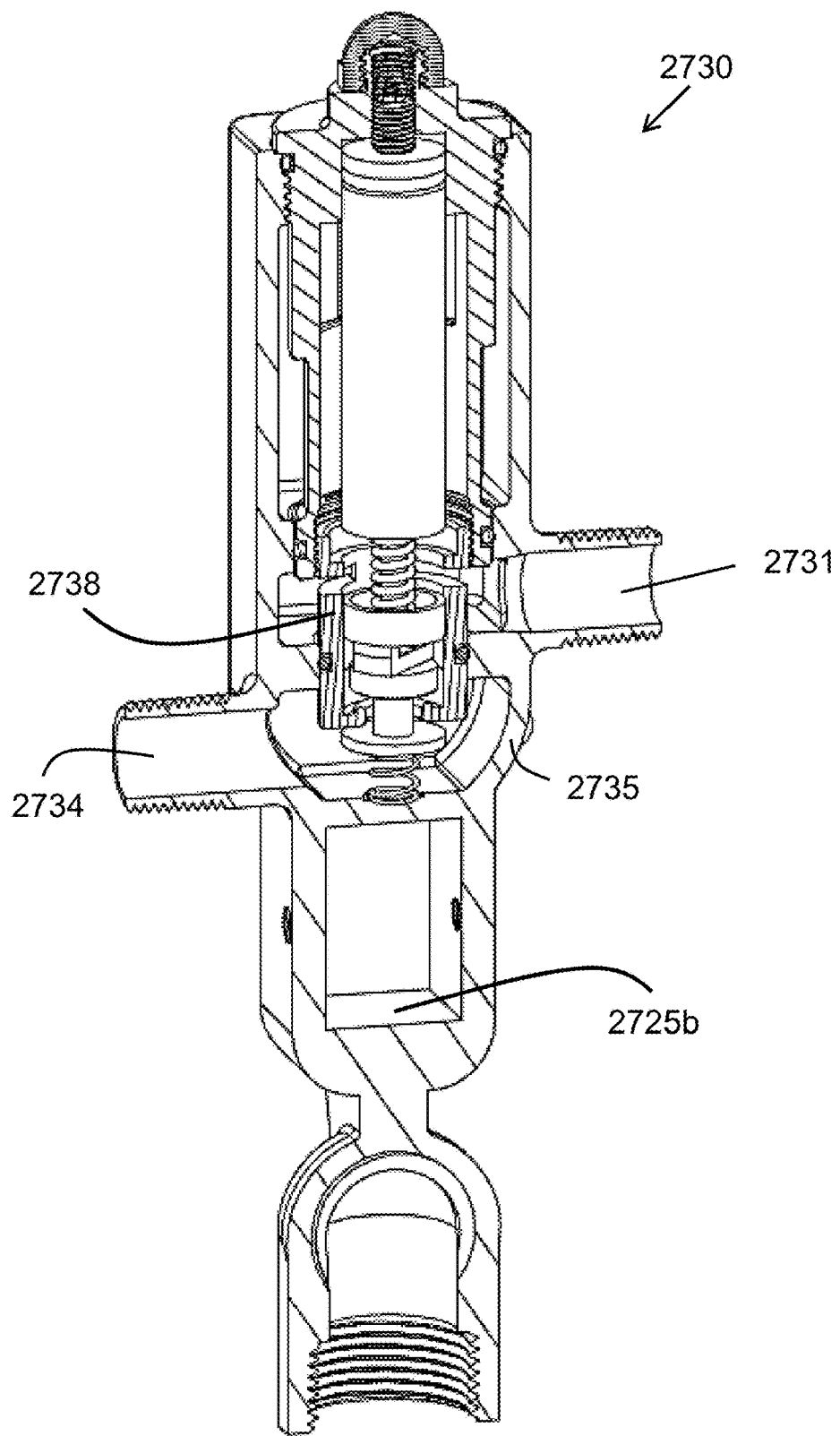
FIG. 45 is a perspective representation of the apparatus of FIG. 43B.

FIGS. 43B, 44B, and 45 show the internal structure of one embodiment of valve 2730. Preferably, a cartridge-type thermostatically control valve is threadably received within housing 2734. Cartridge valve 2736 includes a thermostat that is operably connected to a metering section in order to mix hot and cold flows of water, and provide a mixed, tempered water at a tepid temperature to outlets 2732. In yet other embodiments the body 2734 is further configured to include one or more check valves (X39) or pressure modifying valves (X57) or the heater (X90), each of which will be discussed with regards to emergency washing system 2820.

Figure 46:
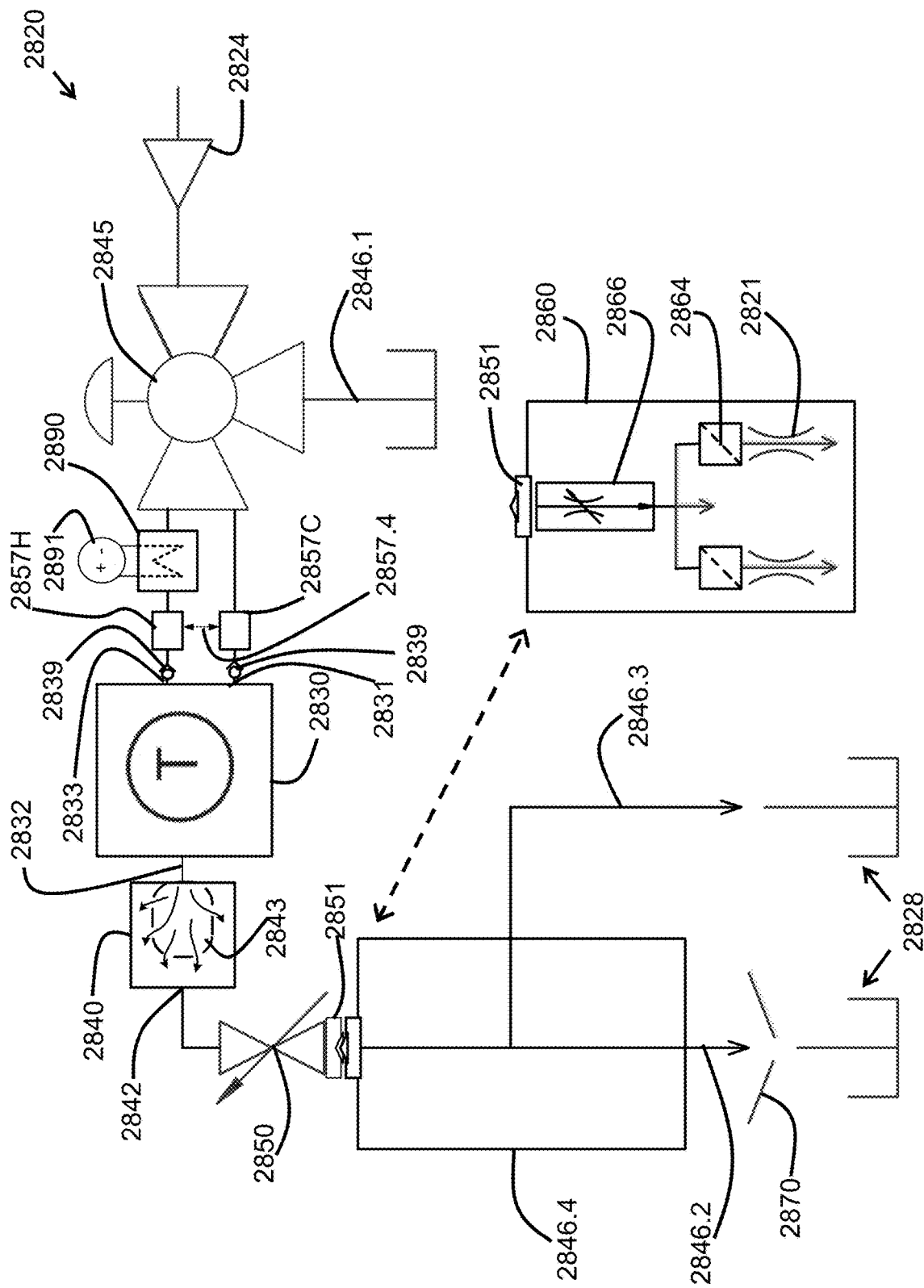
FIG. 46 is a schematic representation of a flushable emergency eyewash system according to one embodiment of the present invention.

FIG. 46 depicts various aspects of an emergency washing system 2820 according to another embodiment of the present invention. FIG. 46 presents a hydraulic schematic representation of a system 2820 that includes the flushing capability discussed in connection with FIG. 40A. Water flowing from a source 2824 is provided to a three-way valve 2845 that includes provisions for a flush of the water source by way of flushing line 2846.1. Water from the outlet of valve 2845 is provided in two outlets to system 2820. A first outlet provides source water to an electric heater 2890 that is heated by electricity from a source 2891.

In one embodiment, heater 2890 is a point-of-use water heater such as a model GL6 manufactured by Ariston. In other embodiments, heater 2890 is an electric heater that is rated to about 1500 watts, producing water in the range of 65 F to 145 F. In some embodiments, heater 2890 includes a reservoir (not shown) of five to ten gallons. It is understood that the emergency eye washing system is preferably adapted and configured to provide tepid water for flushing of the user's eyes, and various components of the eye washing system are adapted and configured to provide this tepid flow of water. For example, the power consumption of heater 2890 may be limited to something less than its maximum power capacity so as to provide a flow of hot water at a flow rate to a thermostatically controlled valve that is within the range of operation of the valve. In yet other embodiments, there may be an electronic controller that varies the input power to the heater, such as a controller that provides a first, higher power level for a short period of time (such as a few seconds) to overcome the thermal inertia of the downstream components, followed by a second period of steady state operation at a lower power.

The heated water is supplied in some embodiments to a pressure modifying valve 2857H, and from this pressure modifying valve through a check valve 2839 and into the inlet 2833 of a thermostatically controlled mixing valve 2830. A second path for water from valve 2845 is provided in some embodiments to a pressure modifying valve 2857C, the outlet of which provides water at a lower pressure to the inlet of a second check valve 2839, and thereafter into the cold water inlet 2831 of valve 2830. In still further embodiments, tempered fluid from outlet 2832 is provided into the serpentine passages 2843 of a diffuser 2840, and from the outlet 2842 of that diffuser into a shutoff valve 2850.

Schematic FIG. 46 further illustrates the interchangeability of an eye washing housing assembly 2860 with a flush housing assembly 2846.4. As depicted in FIG. 46, the eye wash housing has been disconnected by the quick connect fitting 2851, and the flush housing 2846.4 is shown in a position to provide flushed water through parallel system and source flush lines 2846.2 and 2846.3, respectively.

It has been found in some applications that the use of a large water heater can be a limiting factor in the placement of an emergency eyewash. Further, if there is no local water heater, then any hot water supplied to the emergency eye wash will necessarily run through an excessive length of piping, which will delay the delivery of hot water and result in the user's eyes being flushed with cold water. Such a cold water flush can be discouraging to users, and either limit their use of the eyewash under emergency conditions, or result in squinting or partial closure of the eyes, which results in a less effective flush. In some applications the placement of a water heater near the emergency eyewash is not practical, and can still further result in a delayed delivery of hot water as the internal tubing from the cold initial conditions of the water heater outlet tubing.

Eye washing system 2820 addresses some of these problems by incorporating a local electric water heater. However, such water heaters can require substantial operating current if the eyewash flow is in the range of four or five gallons per minute. If an emergency eyewash system requires more electrical power than is readily available at a particular worksite, then it is either less likely that the eye washing system will be installed, or the cost of installation will be greatly increased by the need to bring in sufficiently high power electrical lines.

In one embodiment, eye washing system 2820 is adapted and configured to provide a flow of washing water through a spray nozzle that substantially meets federal requirements, but has a flowrate that is less about two gallons per minute. With such a low flow system, the electrical heating requirements are reduced, and the power requirements of source 2891 are reduced. Thus, a low flow eye washing system permits the introduction of emergency eyewash stations into locations where the station was previously not feasible.

Referring to the schematic of FIG. 46, it can be seen that if water from source 2824 is provided through a water heater 2891 to one inlet of valve 2830, but provided directly to the other, then the heated water will necessarily be at a lower pressure than the non-heated source water. It has been found that this difference in water pressure can result in improper operation of thermostatically controlled mixing valve 2830, and subsequently deficient operation of the emergency eye washing system 2820. Therefore, some embodiments of the present invention envision the use one or more pressure modifying valves 2857 in either the cold line (2857C) and/or the hot line (2857H).

Emergency eyewash system 2820 in some embodiments includes one or more pressure modifying valves 2857. Each of these valves provides water to the thermostatically controlled valve at pressures that permit acceptable operation. If there is too much variation between the hot inlet and cold inlet water pressures, then it is possible that the pressure balance within the mixing valve can be imbalanced to the point of improper operation, which in extreme cases can include a shutoff of one or both of the water inlets. The emergency washing system 2820 reduces the risk of such imbalances by: (1) lowering the overall flow level going through the dispensing caps; and (2) modifying the thermostatic valve inlet pressure for the cold inlet, hot inlet, or both inlets.

With regards to lowering the flowrate through the dispensing caps, system 2820 can include a flow controlling valve 2860 adapted and configured to provide water flows less than about 5 gpm and more preferably less than about 2 gpm. Still further, other similar flow controlling devices can be incorporated elsewhere in system 2820. As yet another example, in some embodiments a flow controlling valve is provided in the flowpath from three-way valve 2845 to hot inlet 2833. Still further, an additional flow controlling valve can be provided in the flowpath from valve 2845 to cold inlet 2831. Preferably, these flow controlling valves would limit the upper range of flows to an upper limit that is lower than the upper limit of a main or central flow controlling valve 2866, due to the fact that these individual flow controlling valves (X66) are intended to limit cold or hot flows only, and the central valve 2866 limits total flow. In still further embodiments of the present invention, it is contemplated that the function of the three-way valve 2845 and flushing line 2846.1 can be accomplished downstream of the diffuser 2840 and upstream of the shut off valve 2850. With such a modification, it is further possible to flush water from the hot water heater, thermostatically controlled mixing valve, and diffuser when the dead ended leg of the building plumbing is flushed.

With regards to the pressure modifying valves, at least three different types of valves can be used in various embodiments of the present invention. One example is a pressure regulating valve that preferably includes an adjusting device (which can be set once and not intended for adjustment by unqualified persons). Such a valve can include one or more internal features that automatically compensate for changes in water pressure. Yet another type of pressure modifying valve is a pressure reducing valve. Such valves can include either static or moving internal members that provide with relative simplicity a pressure drop based on flow characteristics. A third type of pressure modifying valve include a pressure balancing valve. These balancing valves include one or more moving internal features that are repositioned to affect the flow to one of the inlets based on the pressure provided to the other inlet. As one example, and referring to pressure communication path 2857.4 of FIG. 46, a pressure balancing valve 2857.3c is provided with a signal pressure from the hot inlet, and this pressure signal is used to move an internal member and adjust the pressure drop to the cold inlet of valve 2830.

Further operation of pressure modifying valves useful in various embodiments of the present invention can be found in the following: U.S. Pat. No. 4,625,750, titled FORCE-CONTROLLED PRESSURE REGULATING VALVE; U.S. Pat. No. 7,258,133, titled PRESSURE REDUCING VALVE; and U.S. Patent Publication No. 2003/0131882, titled PRESSURE BALANCING VALVE; incorporated herein by reference with regards to the basic principles of operation of these valves.

In order to achieve an emergency wash system with a low flowrate, it is helpful to account for the wide variation in water pressure typically found within the plumbing of a building. Based on the age of the plumbing, the codes it was constructed to, the design selected by the plumber, and the presence or absence of other water-carrying devices proximate to the eyewash system, there can be a very wide variation in pressure. In a low flow system according to one embodiment of the present invention, the emergency wash system is made tolerant of the wide range of source pressure of the pressurized water by the use of a flow control valve providing a substantially constant flow of water to a large, low velocity, uniform pressure chamber that provides the water in parallel (with a little or no lateral flow) to a plurality of spray apertures. The various types of flow control valves contemplated herein provide one or both of a variable flow area or a variable flow coefficient, based on the upstream pressure, the downstream pressure, and the desired flowrate.

It has been found by installing a large number of emergency wash systems, that it is not possible to design a low flow system that operates using higher pressure. This is because the range of high pressure in a building plumbing system varies considerably. However, it has been found that the minimum low pressures of a building plumbing system are more consistent. Therefore, a low flow emergency wash system according to one embodiment of the present invention is adapted and configured to include a flow control valve (or emergency wash housing) that operates with both a relatively low pressure drop from inlet to outlet, and further a relatively low overall gauge internal pressure.

Figure 47A:
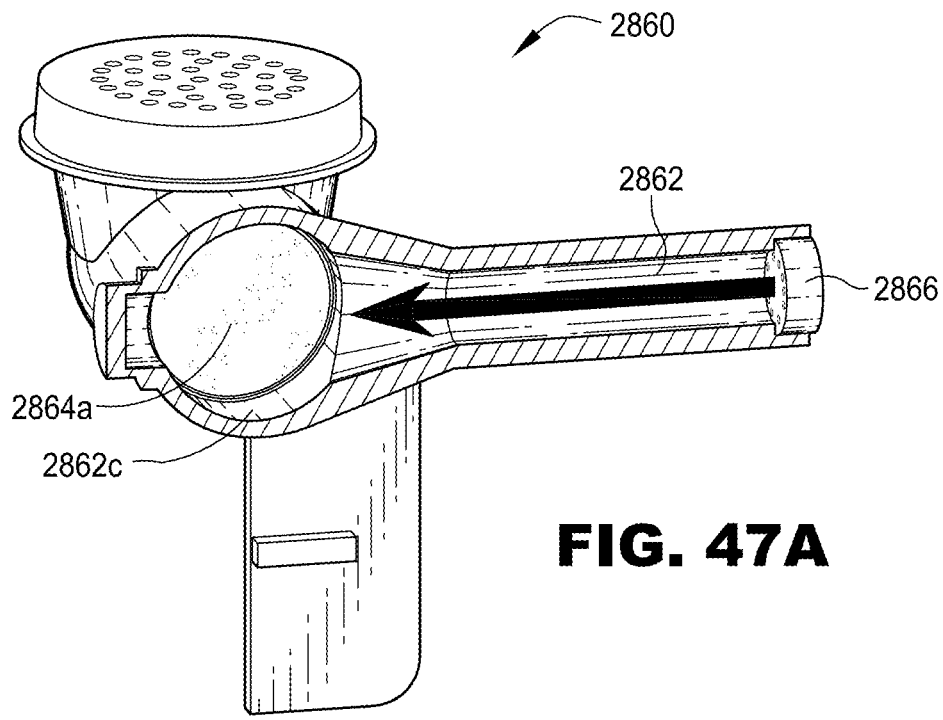
FIG. 47A is a graphical depiction of the distribution of water flow within an outlet valve according to one embodiment of the present invention. This is a scaled drawing of a flow outlet housing according to one embodiment of the present invention.
Figure 47B:
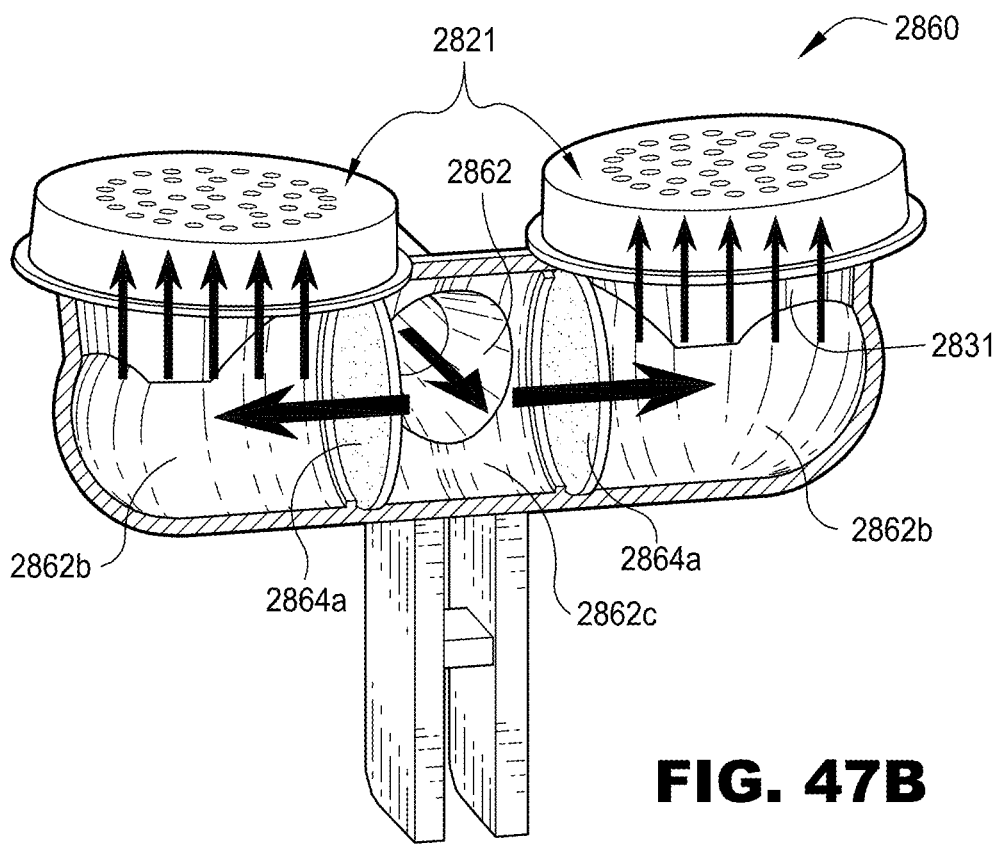
FIG. 47B is another graphical depiction of the internal water distribution within an outlet valve according to one embodiment of the present invention. This is a scaled drawing of a flow outlet housing according to one embodiment of the present invention.

FIGS. 47A and 47B schematically depict the flow distribution within the flow outlet valve 2860 (sometimes referred to herein as an emergency wash housing). A flow control valve 2866 is placed at the inlet to the main flow conduit 2862. Flow control valve 2866 is adapted and configured to provide, in one embodiment, a flow of about one gallon per minute for the range of pressure encountered in typical building plumbing systems. If the building system has a high source pressure, the flow control valve 2866 will correspondingly reduce its internal flow area and/or decrease its internal flow coefficient. In this manner, the emergency flow outlet valve 2860 has an internal pressure that is isolated from the high source pressures that may exist in the building plumbing. The low water flowrate of about one gallon per minute is represented by a large arrow located centrally within the main flow chamber 2862.

FIG. 47B graphically depicts how the total flow within the main flow chamber 2862 is evenly divided to the right and left large internal chambers 2862b after flowing through a central large flow chamber 2862c. Referring briefly to FIG. 47A, it can be seen that the flowpath of the internal chamber 2862 is substantially cylindrical, and then gradually increases in a conical section in the vicinity of the central chamber 2862c, which is bounded on either side by filters 2864a. In this manner, the relatively high velocity and turbulent flow within the cylindrical portion of the flow chamber has reduced velocity and reduced turbulence as it enters the central chamber 2862c. It is believed that the filters (which in one embodiment are about two hundred mesh) further decrease the turbulence of the water moving from the central chamber to a lateral chamber.

FIG. 47B shows that the total flow coming out of the flow control valve is "dead ended" into central chamber 2862c, meaning that the chamber acts to stagnate the flow coming down the flow passage 2862. Further, the central chamber has a cross sectional area (esp. through the center line of the filters) that is substantially greater than the cross sectional flow area of the relatively narrow passage 2862. As a result of these design considerations, the flow into the outlet valve 2860 slows abruptly, and further changes direction to pass through the parallel filters 2864a. The total flow through these filters is represented by the two opposing arrows of FIG. 47B, each carrying half of the total flow. The flow exiting these filters passes into a chamber that has an inlet cross sectional flow area (at the exit of the filer) that is substantially the same as the flow area of the filters themselves. Therefore, the flow profile through the filter is generally intact as an inlet profile to the large internal chambers 2862b. These chambers have cross sectional flow areas along two planes (one plane at the filter outlet, and the other plane at the inlet to cap 2821) that are about the same, and further are both substantially larger than the cross sectional area of the inlet 2862. Therefore, flow from the central chamber 2862c into the side chambers 2862b is at a low velocity, with greatly decreased turbulence, and in some embodiments may achieve a laminar flowpath from filter exit to cap spray aperture. The plurality of parallel, upward arrows underneath each cap 2821 graphically depict a substantially uniform pressure profile underneath the cap.

It has also been determined that this low pressure chamber is helpful in some embodiments to achieve the desired dispersal pattern through the cups 2821, even at a low overall flow, of about one-half gallon to less than one gallon per minute through each cup. It has been found that it is useful to arrange the internal flowpath of the large chamber 2862b relative to the respective cap 2821 such that flow from the chamber through an aperture of the cap is substantially parallel for each of the apertures. For example, the flow exiting an aperture that is outermost from the outlet valve center line does not have to first pass by an innermost aperture, which is the case with some current designs.

In such other designs, all of the flow exiting a distalmost (outermost) spray aperture first passes past a proximal (innermost) spray aperture, which requires that the overall design account for an internal pressure at the innermost aperture that is greater than the pressure at the outermost aperture. In various embodiments of the present invention, this is not the case. Instead, there is a generally uniform pressure distribution within the large internal chamber 2862b. This further means that, proximate to the discharge caps 2821, the velocity profile into the caps is substantially upward and axial through the apertures. There is relatively little lateral flow proximate to the apertures. Again, this differs from current designs in which there may be considerable lateral flow under an innermost aperture, this lateral flow being the portion of flow delivered in those other designs to the outermost aperture.

Figure 48:
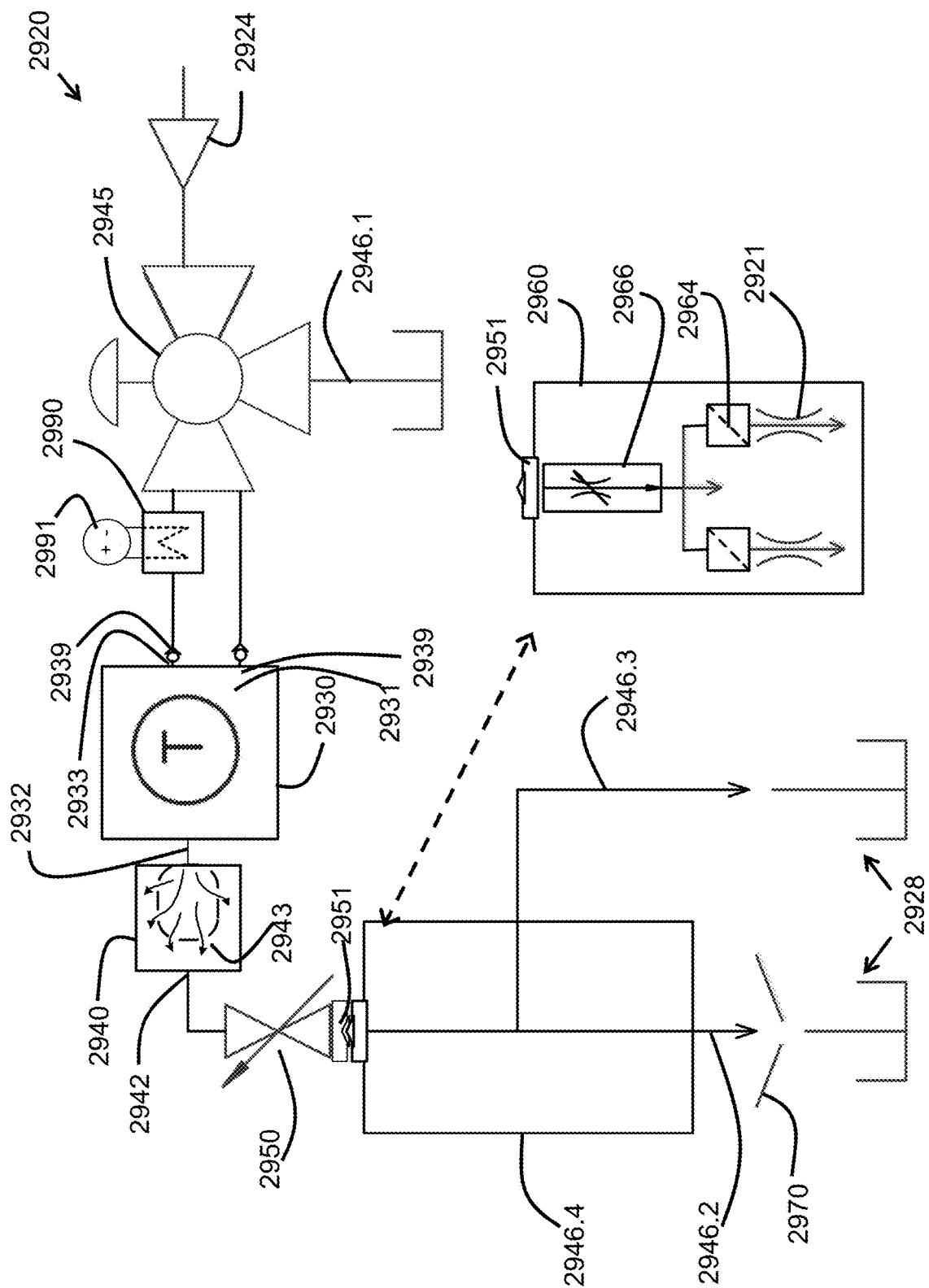
FIG. 48 is a schematic representation of a low flow emergency wash system according to another embodiment of the present invention.

FIG. 48 depicts yet another embodiment of the present invention for an emergency washing system 2920 that is similar to the washing system 2820 previously described, but with the changes that will be discussed.

Considering the description of the characteristics of a low-flow emergency wash system presented with regards to FIGS. 47A and 47B, a low flow system 2920 preferably does not include the various pressure modifying valves 2857. Further, system 2920 includes an electric water heater 2991 that further includes a reservoir. As previously stated, the presence of a reservoir (a hot water tank) often prevents a tepid emergency wash system from being located at various locations within a building because of the floor space required by the hot water tank. However, it has been determined if the emergency wash system has a sufficiently low flow (under two gpm, and preferably around one gpm), the sides of the hot water tank can be greatly reduced, thus permitting small hot water tanks that can be attached to a wall, and thus not require floor space.

It is generally recognized that the emergency washing system should provide tepid water for about fifteen minutes. Considering the example of a system flowing about one gpm total, then approximately one-half of this flow will come from the hot water reservoir for a period of fifteen minutes, which results in a capacity requirement of about seven and one-half gallons for the hot water reservoir. A reservoir of this size can weigh less than one hundred pounds, which makes the tank suitable for wall mounting. A more conventional emergency wash system flowing three to five gpm would require a take three to five times larger, and can result in a hot water reservoir weighing in excess of two hundred pounds. Still further, it has been the use of a hot water tank combined with a hot water heater provides for less pressure drop of the hot water source. This decreased pressure drop of the hot water, especially in consideration that this is a pressure drop that may not be experienced by the cold water source, results in a system 2920 that does not need pressure balancing valves in order to provide acceptable inlet pressures to the hot and cold inlets of the thermostatically controlled mixing valve 2930. For these reasons, in some embodiments of the present invention the operation of the low flow system is enhanced by the use of a low pressure drop, hot water reservoir instead of the higher pressure drop associated with instantaneous water heaters.

FIGS. 49 and 50 represent various views of the housing of an outlet valve for a low flow emergency eyewash system according to one embodiment of the present invention.

Figure 49A:
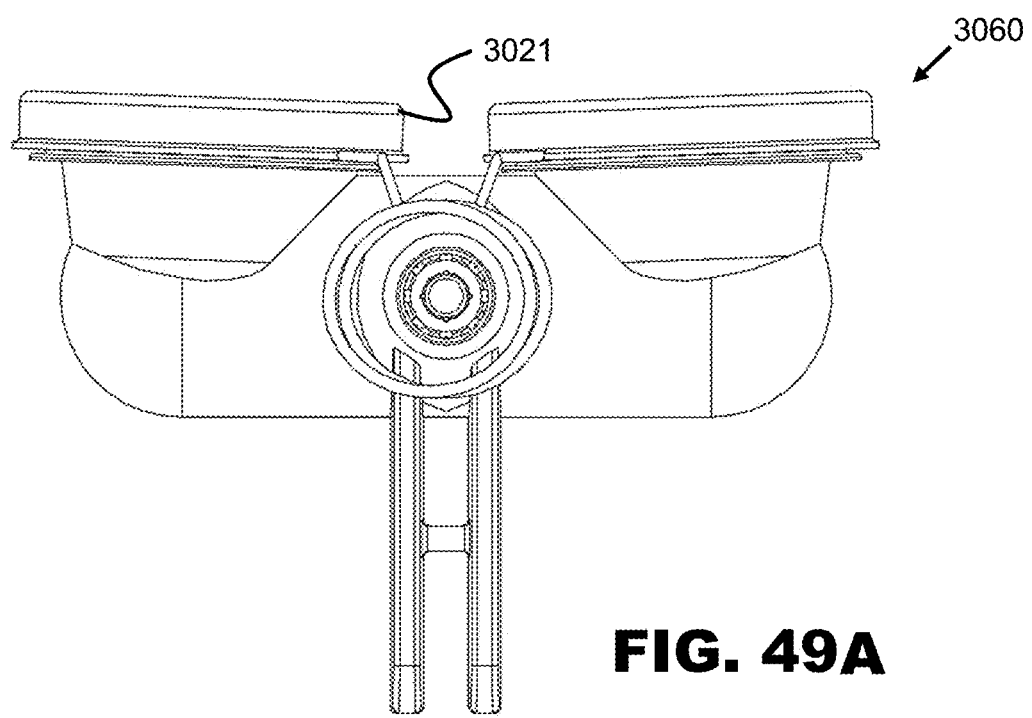
FIG. 49A is a scaled rear end view of an outlet flow housing according to one embodiment of the present invention.
Figure 49B:
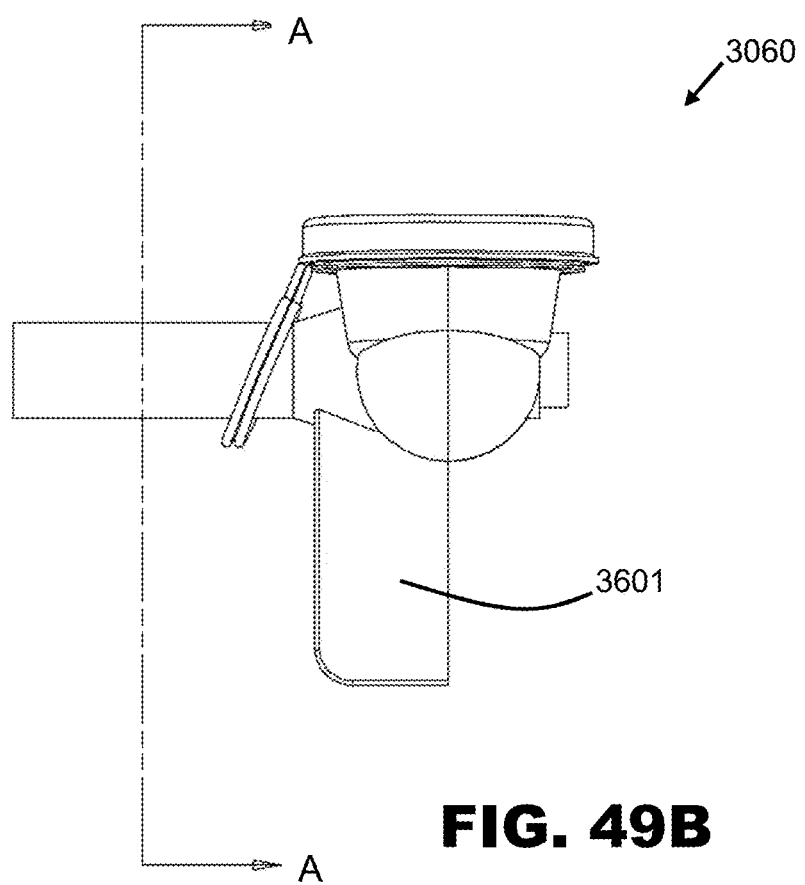
FIG. 49B is a scaled side elevational view of the outlet flow housing of FIG. 49A.
Figure 49C:
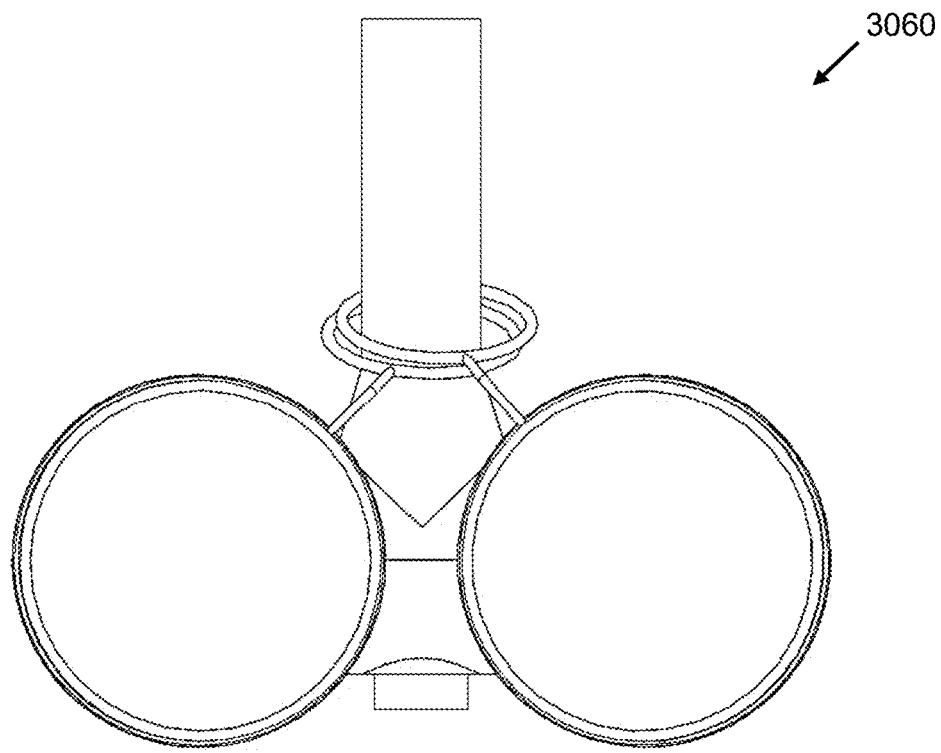
FIG. 49C is a scaled top plan view of the outlet flow housing of FIG. 49A.
Figure 49D:
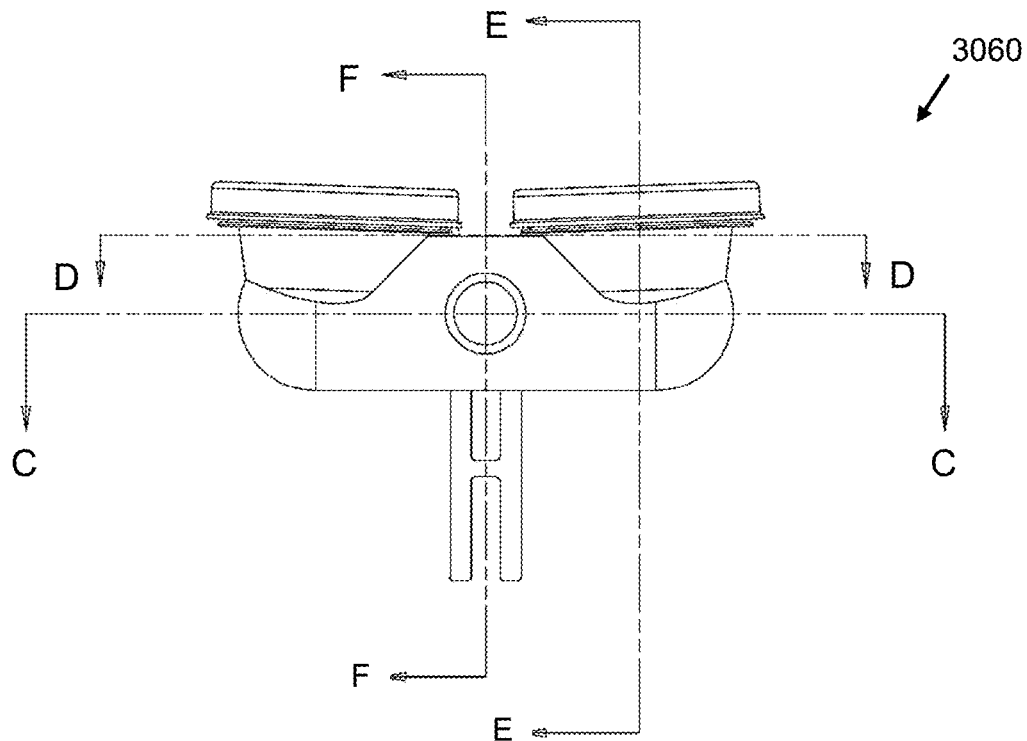
FIG. 49D is a scaled front end view of the outlet flow housing of FIG. 49A.
Figure 49E:
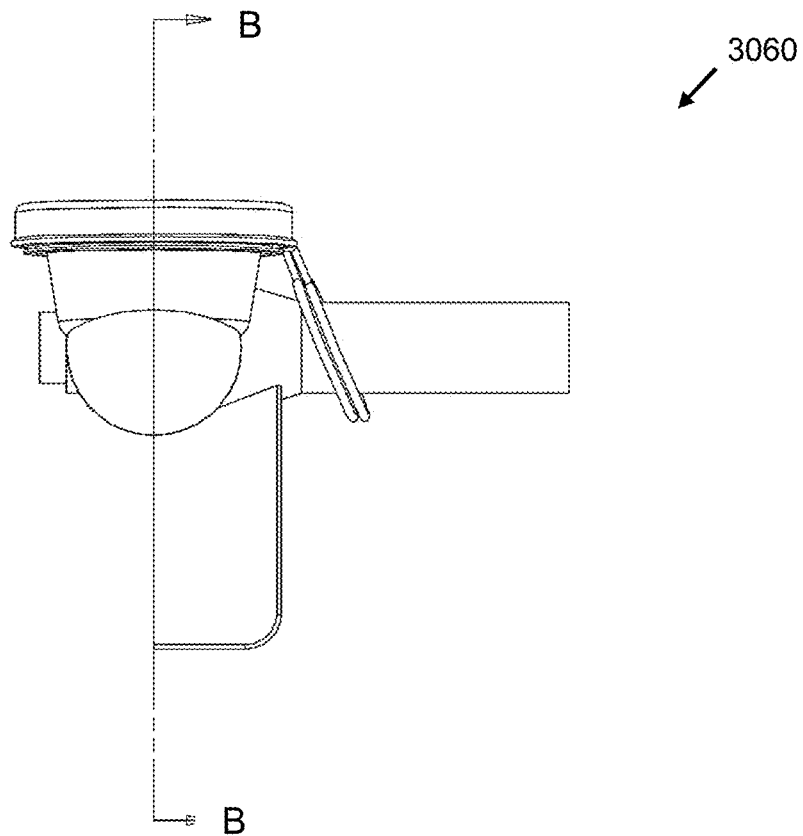
FIG. 49E is a scaled side elevational view of the outlet flow housing of FIG. 49A.
Figure 49F:
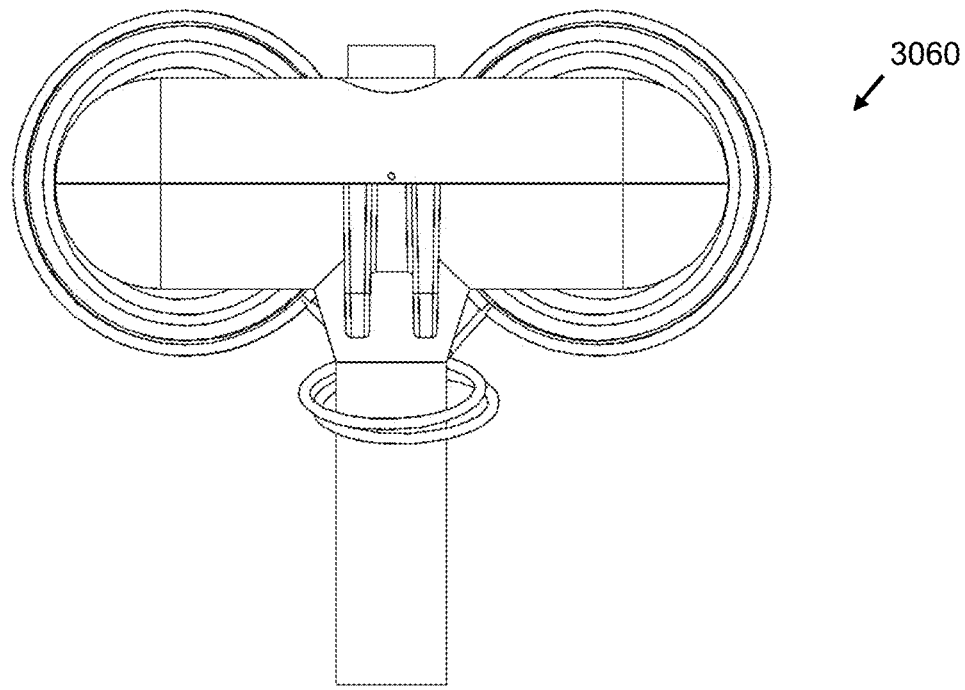
FIG. 49F is a scaled bottom plan view the outlet flow housing of FIG. 49A.
Figure 50A:
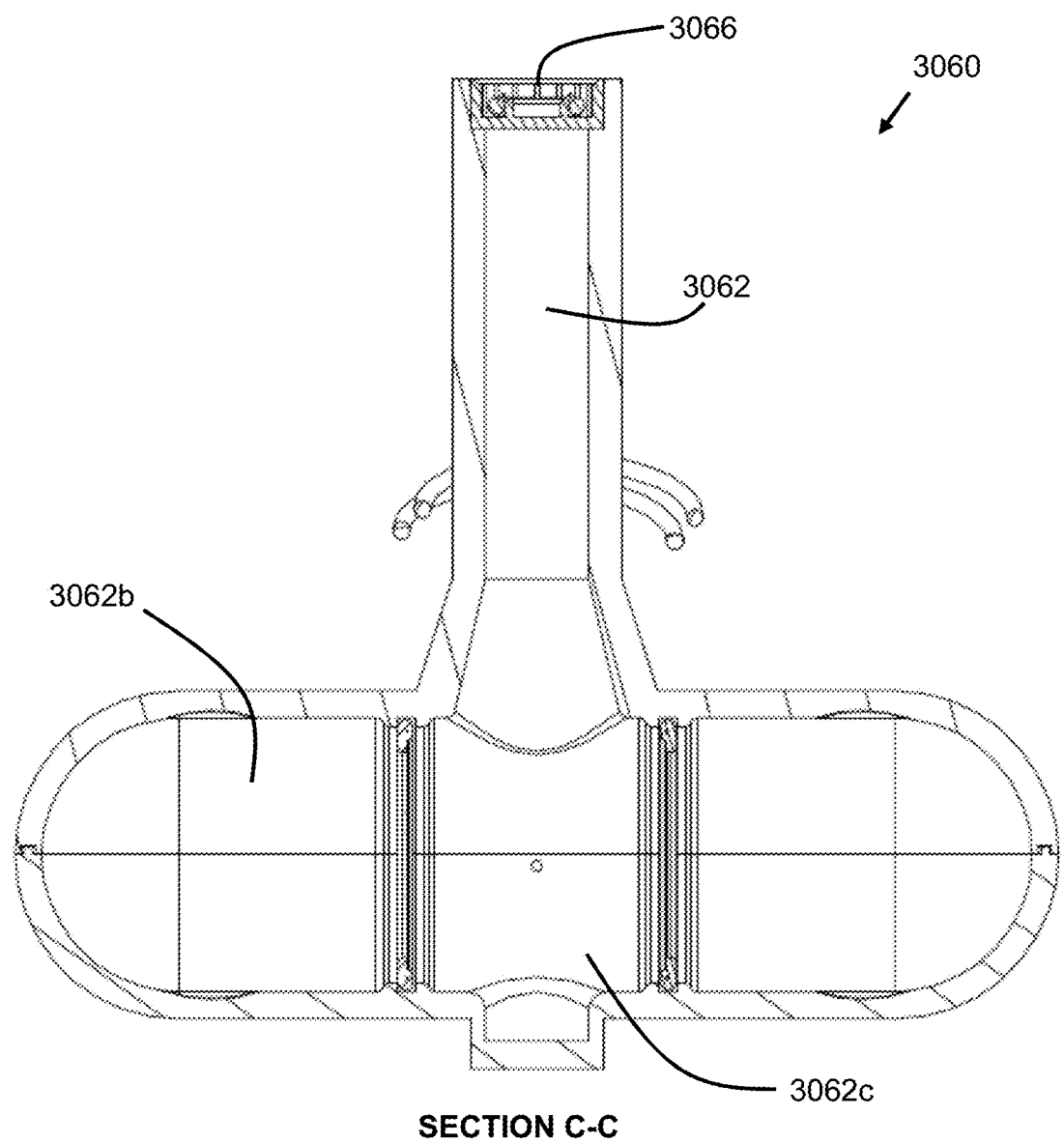
FIG. 50A is a scaled cross sectional view of the apparatus of FIG. 49A as taken along line C-C of FIG. 49D.
Figure 50B:
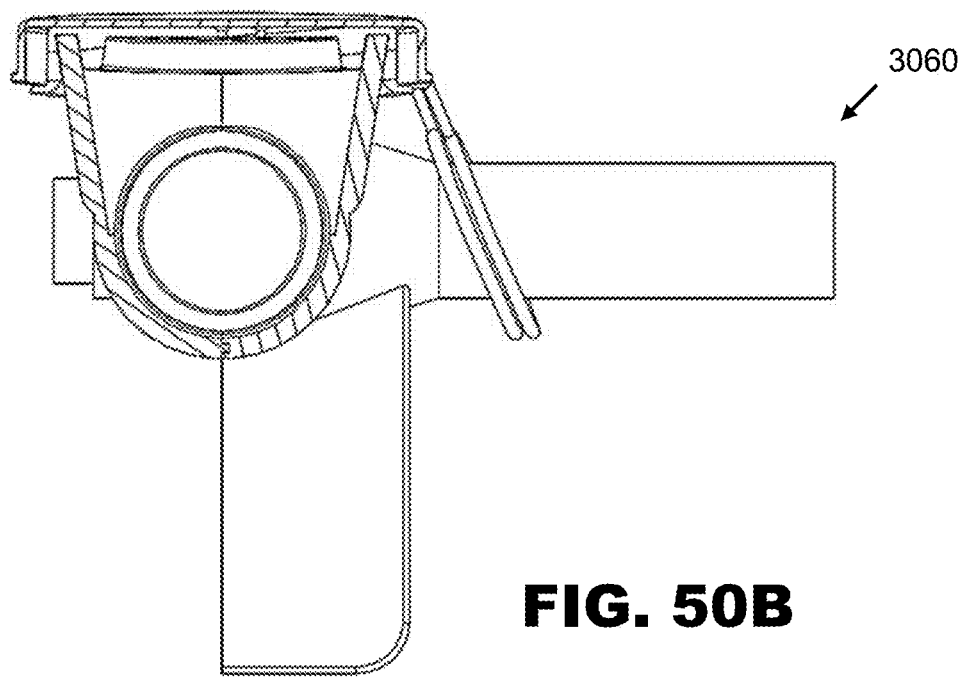
FIG. 50B is a scaled cross sectional view of the apparatus of FIG. 49D as taken along line E-E.
Figure 50C:
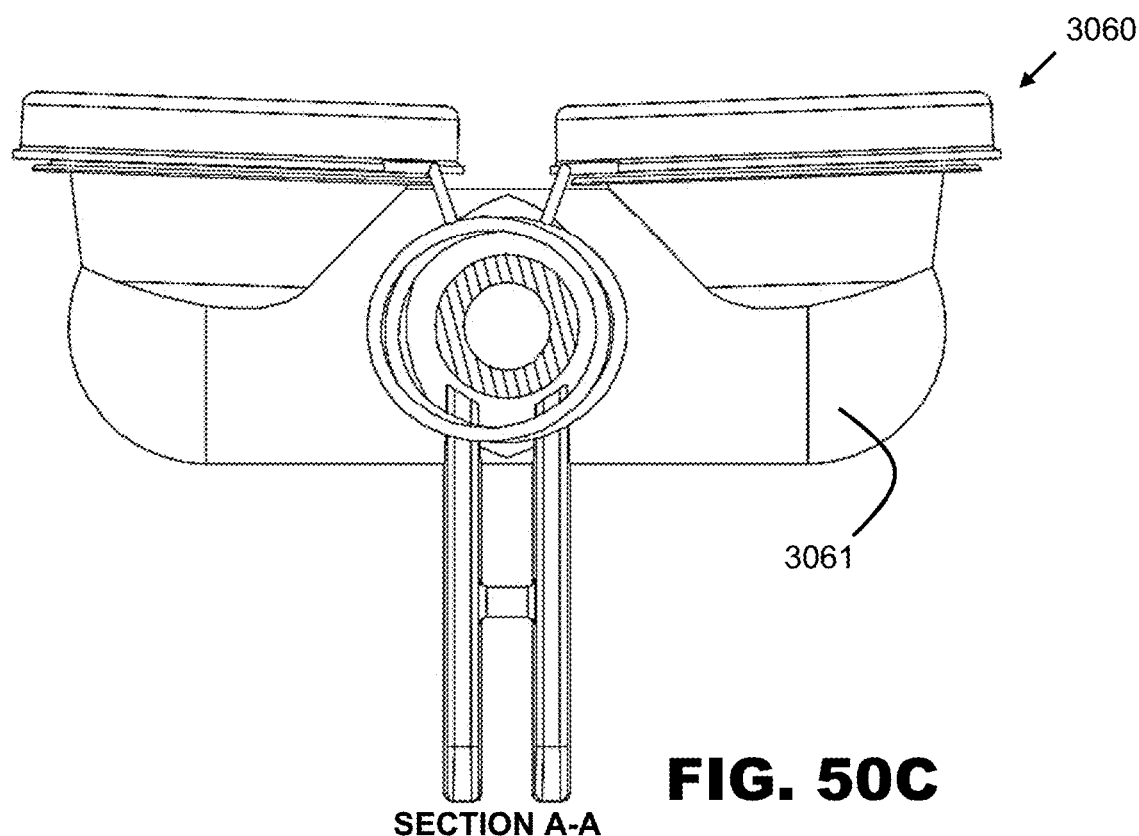
FIG. 50C is a scaled cross sectional view of the apparatus of FIG. 49B as taken along line A-A.
Figure 50D:
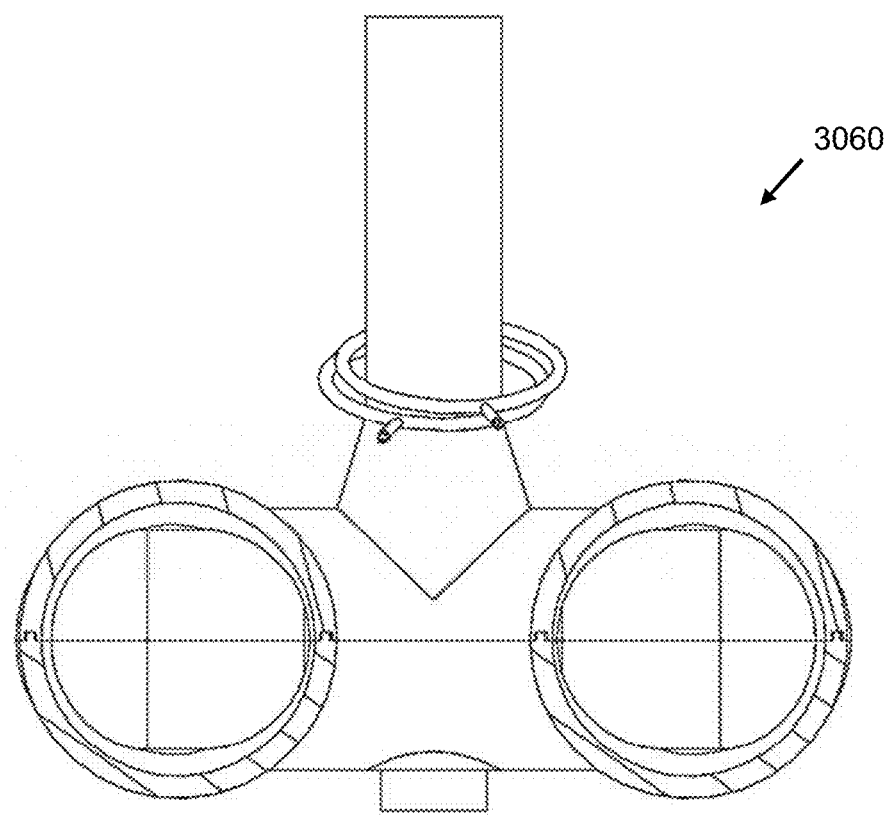
FIG. 50D is a scaled cross sectional view of the apparatus of FIG. 49D as taken along line D-D.
Figure 50E:
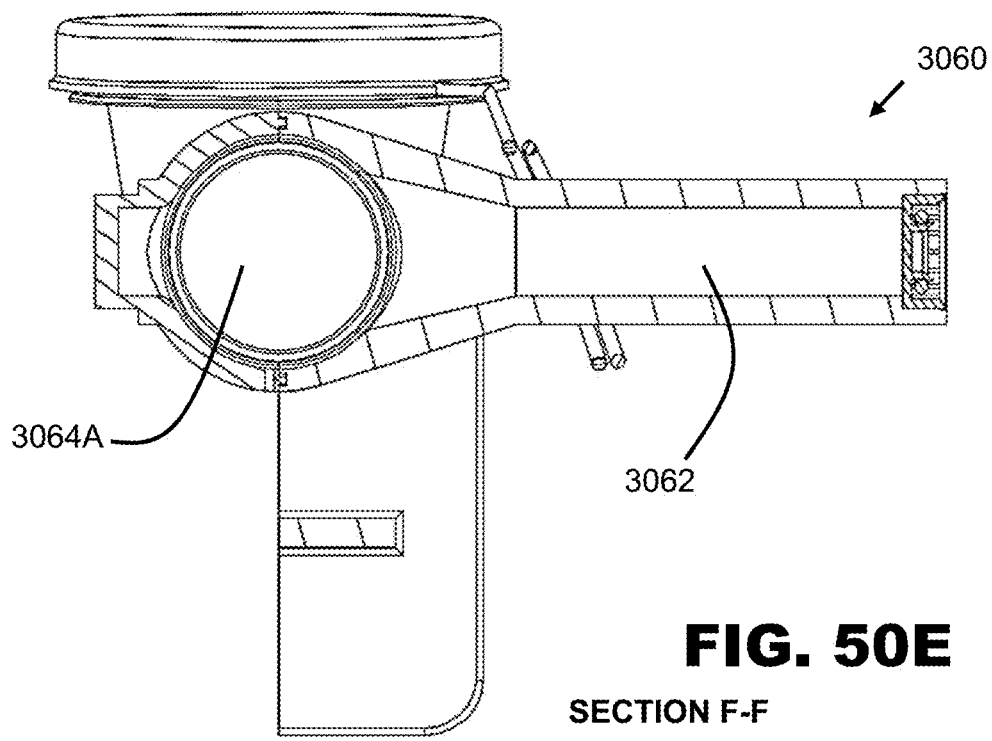
FIG. 50E is a scaled cross sectional view of the apparatus of FIG. 49D as taken along line F-F.
Figure 50F:
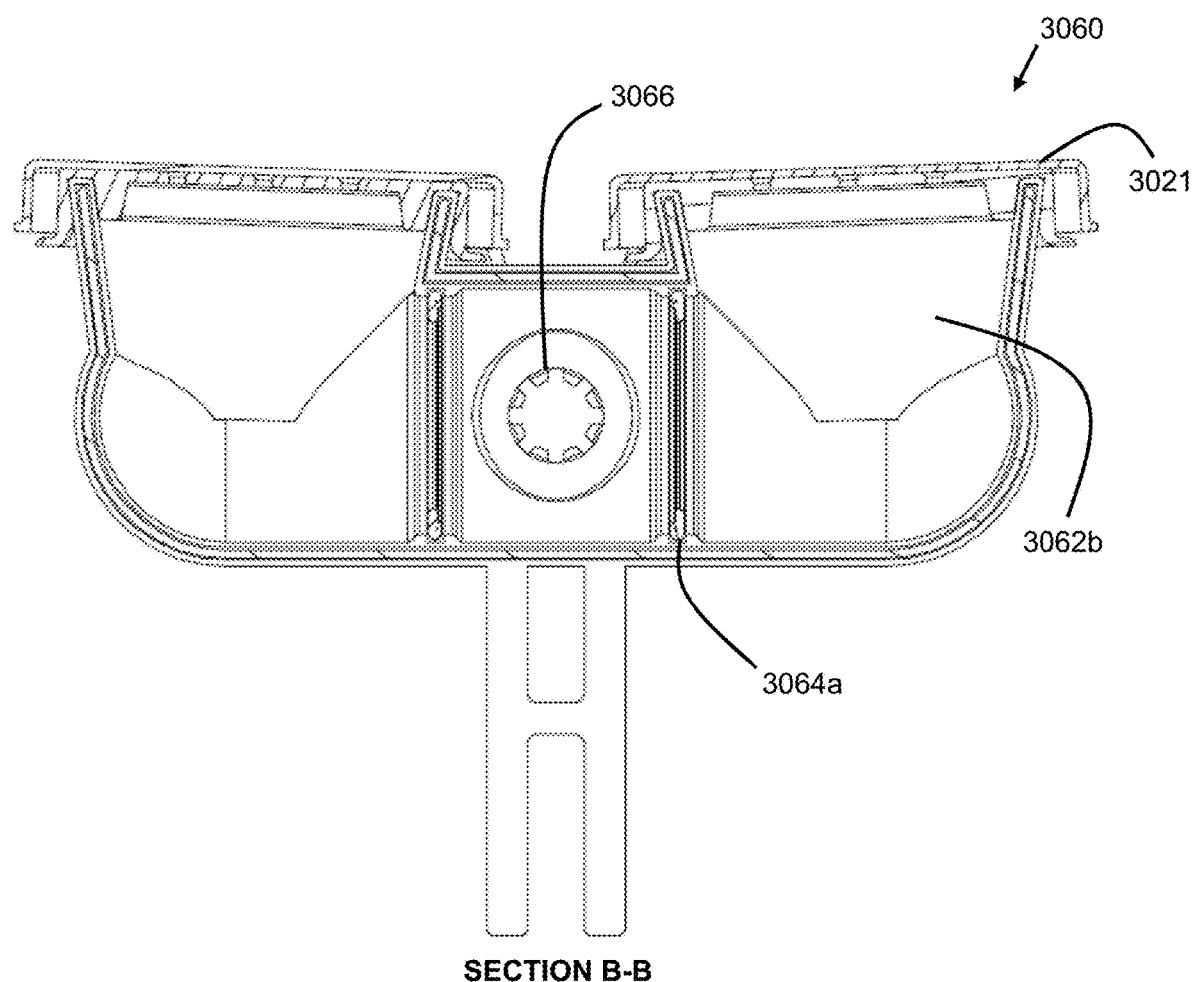
FIG. 50F is a scaled cross sectional view of the apparatus of FIG. 49E as taken along line B-B.

FIGS. 49A and 49B show various external views, arranged orthogonally, of an outlet valve according to one embodiment of the present invention. FIGS. 49A, 49D, and 49F are top, end, and bottom views, respectively. FIGS. 49B and 49E are corresponding orthogonal views of FIG. 49D. FIG. 49A is an end view, generally opposite of FIG. 49D. FIG. 50 show the cross sectional representations identified on FIG. 49. It is to be noted that the cross sectional nomenclature (A through F) is consistent on FIG. 49 and FIG. 50, but is different than the lettering nomenclature that identifies the six figures themselves. It can be seen in particular by looking at FIGS. 50A (section C-C), 50E (section F-F), and 50F (section B-B) that the flow area of the cross sectional flow area is considerably larger than the cross sectional flow area in the central chamber 3062c, both when viewed as the dead-headed cross sectional area (best seen in the center of FIG. 50F), or the lateral cross sectional flow areas of the central section 3062c, as best seen in FIGS. 50A, 50B, and 50E. Further, it can be seen that the cross sectional flow areas of the lateral chambers 3062 are considerably larger than the cross sectional flow area of inlet flow passage 3062. The cross sectional flow areas for lateral flow coming out of the central chamber 3062c and into the lateral chambers can be measured on either of FIG. 50A or 50F. Still further, the cross sectional areas perpendicular to the upward flow through the nozzles can be calculated from the views of FIG. 50F or 50B. It is to be appreciated that all of the figures on FIGS. 49 and 50 are scaled relative to one another, thus permitting scaling from the drawing of the areas of one flow area relative to the area of another flow area. It is contemplated that in various embodiments of the present invention, that the following ratios, a can be determined from FIG. 50, can be at least twenty percent less than the area ratios calculated from these figures, or calculated from the table presented below, and still larger, to at least a doubling in some embodiments, and with no upper limit in yet other embodiments:

area of central chamber, dead ended direction, as measured from filter face to filter face, relative to the cross sectional area of passage 3062;

cross sectional area of the inlet to the dispensing cap 30-21 (on the exit of the flow valve 3060), relative to the cross sectional flow area of the inlet 3062.

The ratio of one-half of the entrance into a lateral chamber from a filter, relative to the cross sectional area of the flow passage 3062.

It is contemplated that in various embodiments of the present invention, that the following ratios, a can be determined from FIG. 50, can be at least twenty percent less than the area ratios calculated from these figures, and still larger, to at least a doubling in some embodiments, and with no upper limit in yet other embodiments:

| CROSS SECTIONAL AREA | |
|---|---|
| DESCRIPTION | SECTIONAL AREA (IN^2) |
| POST FLOW REGULATOR | 0.113 |
| JUST PRIOR TO FILTER (PER SIDE) | 0.792 |
| FILTER(NOT FACTORING IN MESH) (PER SIDE) | 0.442 |
| JUST PRIOR TO CAPS (PER SIDE) | 1.419 |

FIGS. 51 through 62 show various aspects of emergency wash systems that compactly and efficiently combine both eyewash and shower features. Preferably, a single thermostatically controlled mixing valve provides tempered water to both the showerhead and the eyewash, and still further provides structural support for one or both of the shower assembly or eyewash assembly. Preferably, the body of the valve is adapted and configured to provide this structural support without introducing distortion or misalignment into the thermostatically-operated precision valves.

Figures 51, 52:
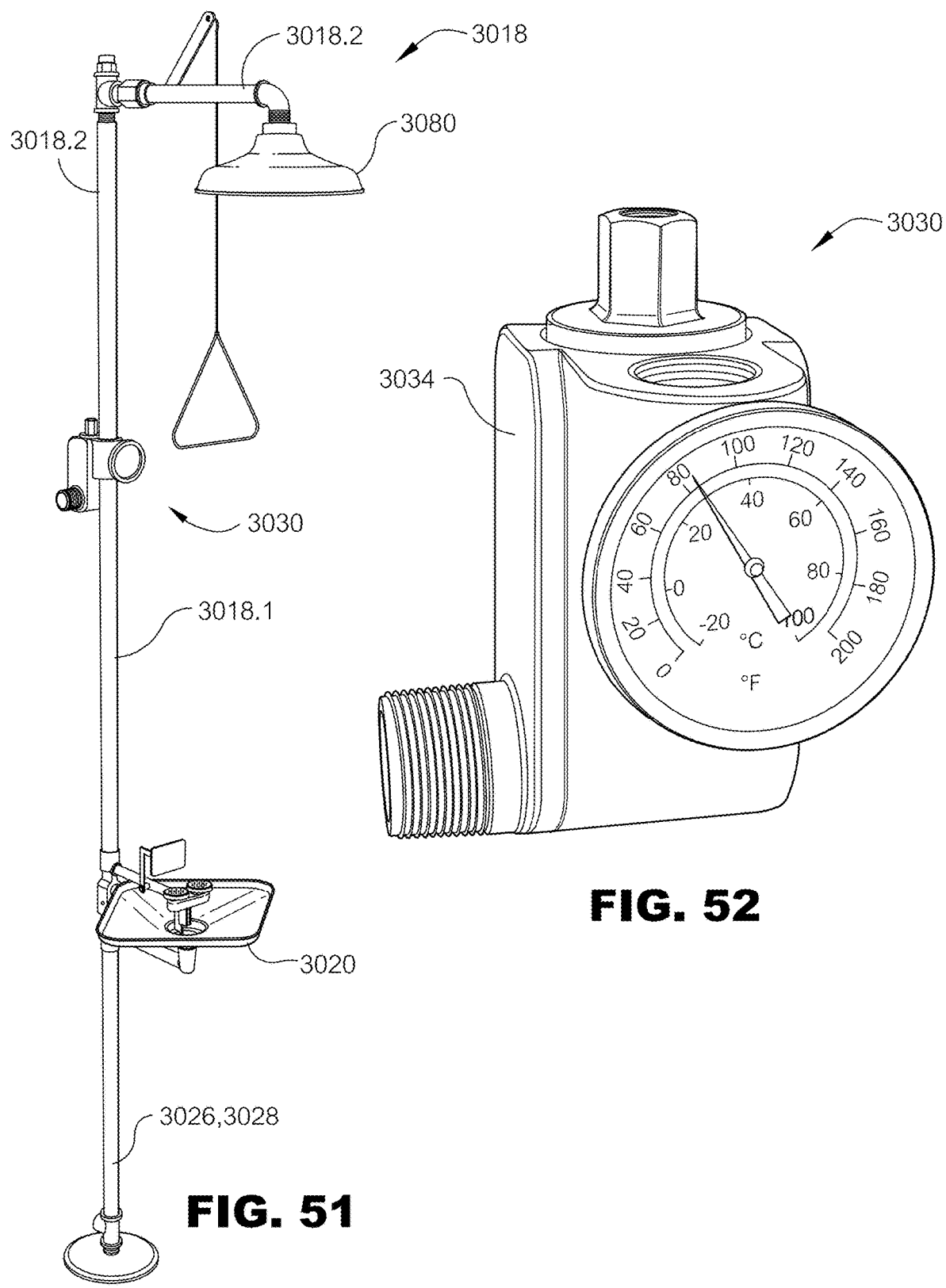
FIG. 51 is a perspective CAD representation of a combined emergency wash system according to one embodiment of the present invention.
FIG. 52 is perspective photographic representation of a portion of the apparatus of FIG. 51.

FIG. 51 shows a combined emergency wash system 3018 according to one embodiment of the present invention. System 3018 includes a shower system 3080, eyewash system 3020, and a thermostatic control valve 3030. Shower system 3080 is supported by a conduit 3018.2, which in turn is in fluid communication with an outlet of valve 3030. A different outlet of valve 3030 is in communication via conduit 3018.1 with an eyewash system 3020 located generally vertically underneath shower assembly 3080. The separate wash systems 3020 and 3080 are adapted and configured to spray water onto a user standing in front of eyewash 3020 and generally underneath shower 3080.

Figure 53:
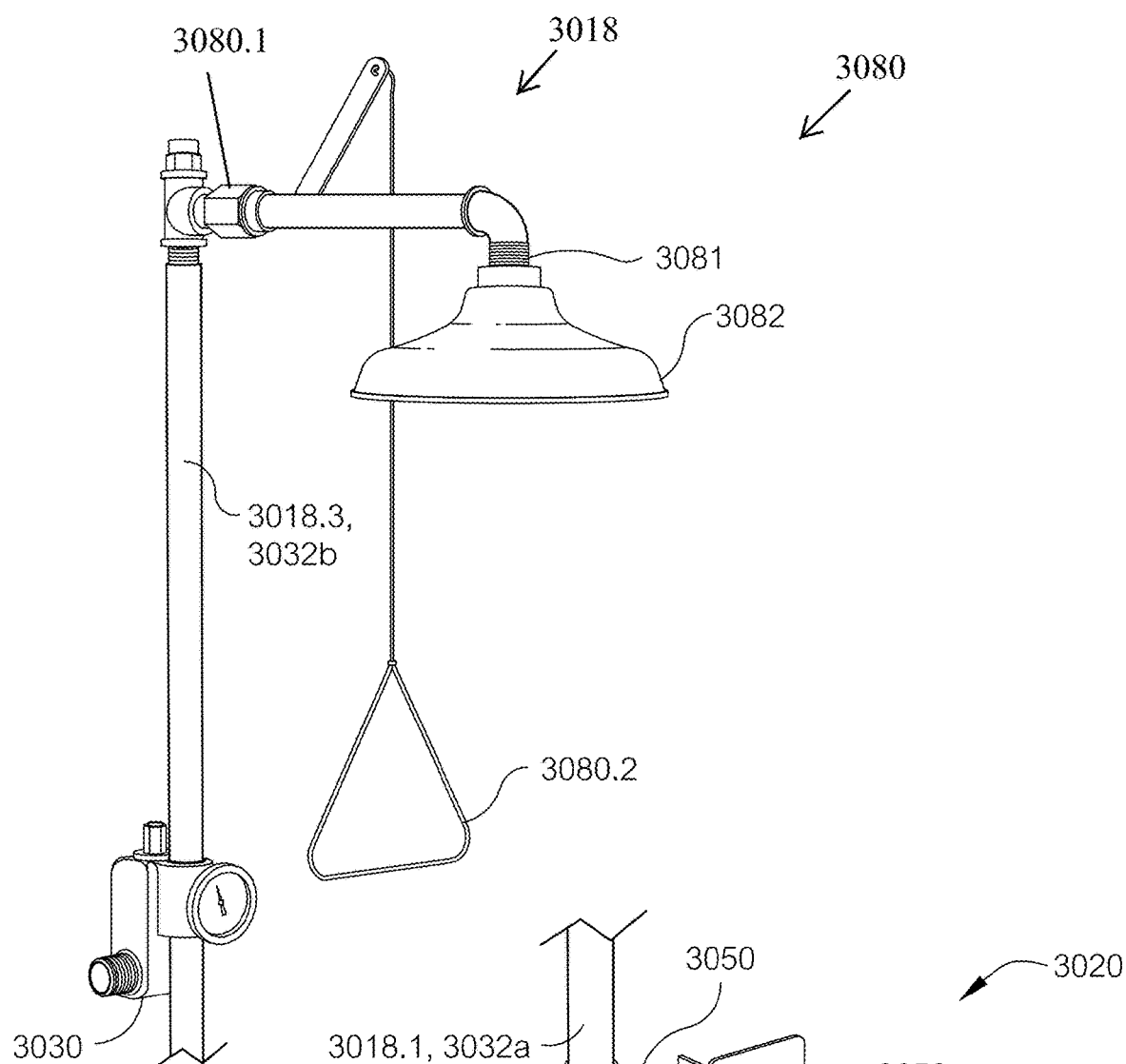
FIG. 53 is a blown up portion of FIG. 51.
Figure 54:
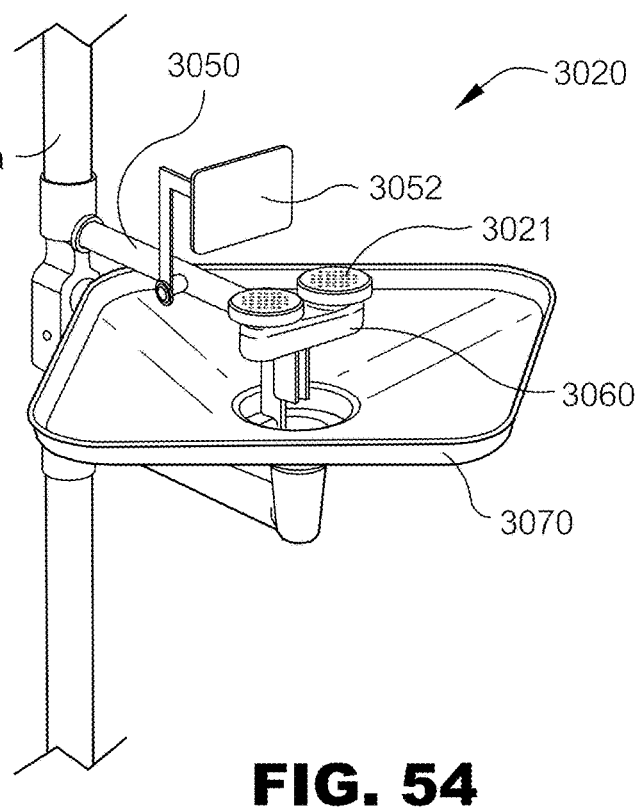
FIG. 54 is a blown up portion of FIG. 51.

FIGS. 53 and 54 show further features of the two emergency washing systems. FIG. 53 show the top portion of system 3018, which includes various components of the shower washing system 3080. It can be seen that the body of valve 3030 supports the entire weight of showerhead assembly 3080, as well as the connecting plumbing and other fixtures. Mixed, tepid temperature water is provided from an outlet 3032b of valve 3030 into conduit 3018.2, which provides water to a shutoff valve 3080.1. If the user pulls on handle 3080.2, the shutoff valve opens, and the tepid water is provided to the inlet 3081 of the bowl 3082. The water is prepared into a suitable water washing distribution by a dispersing member 3084 (not shown), which presents the pattern in a generally downward direction through bowl 3082.

FIG. 54 shows that water from a tempered outlet 3032a is provided in a conduit 3018.1 from valve 3030 to a shutoff valve 3050. If the user pushes on a paddle 3052, the shutoff valve opens, and water is free to flow into an outlet valve 3060. The water is sprayed generally upwardly in a pattern adapted and configured to wash the eyes and/or face of a user bending over the basin 3070. Referring back to FIG. 51, water draining from basin 3070 is provided to a system drain 3028, which may also be part of a support stand 3026 for supporting some of the weight of system 3018. It is understood that the various other features described herein can be incorporated in various other embodiments of the system thus shown and described.

FIGS. 55A, 55B, 55C and 56 show various orthogonal views of a mixing valve 3030 according to one embodiment of the present invention. Mixing valve 3030 comprises a body 3034 adapted and configured to support a pair of aligned mixed water outlets 3032a and 3032b, a hot water inlet 3033, a cold water inlet 3031, and a thermostatically-operating cartridge valve 3036a. Water entering hot inlet 3033 (such as from a hot water heater) is presented in a first sealed chamber to the hot inlet of the metering section of cartridge valve 3036a. Cold water from inlet 3031 is presented to a cold inlet portion of the metering section. The metering section includes a static member and a movable member, the relative position of these two members of the metering section being controlled by the thermostat. By utilizing a cartridge-type valve, the various close fittings and precision movements of the metering section are isolated from the structural distortions of the body of the valve by way of both the cartridge and the sealing O-rings. The precision tolerances are maintained within the cartridge structure, which is not hard-attached to the body. Cold water and hot water are mixed within the metering section, and provided to the mixing chamber 3036h defined between the cartridge valve and corresponding inner surfaces of body 3034.

Figure 56:
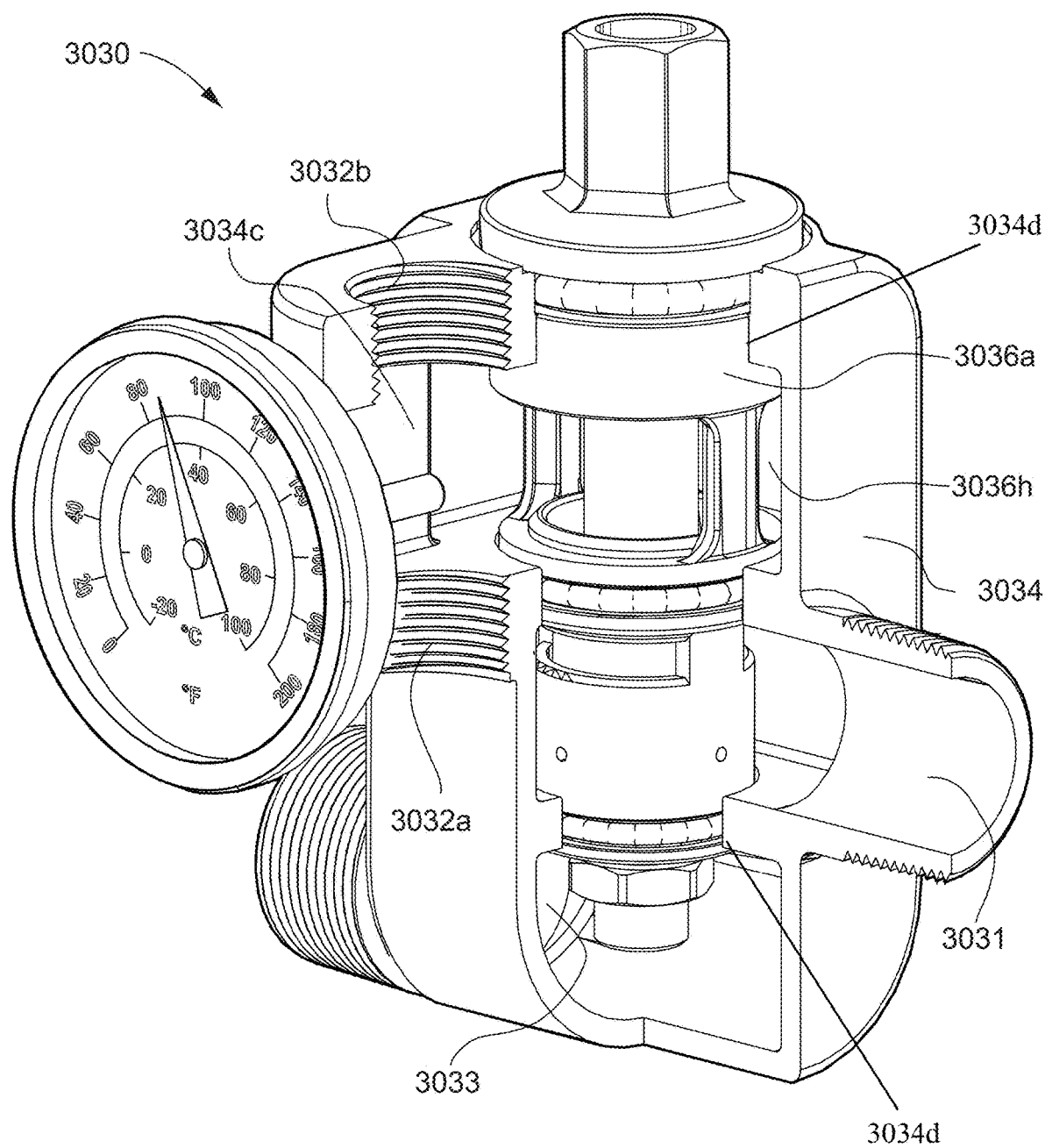
FIG. 56 is a line drawing of a partially cutaway CAD perspective representation of the apparatus of FIG. 52.
Figure 57:
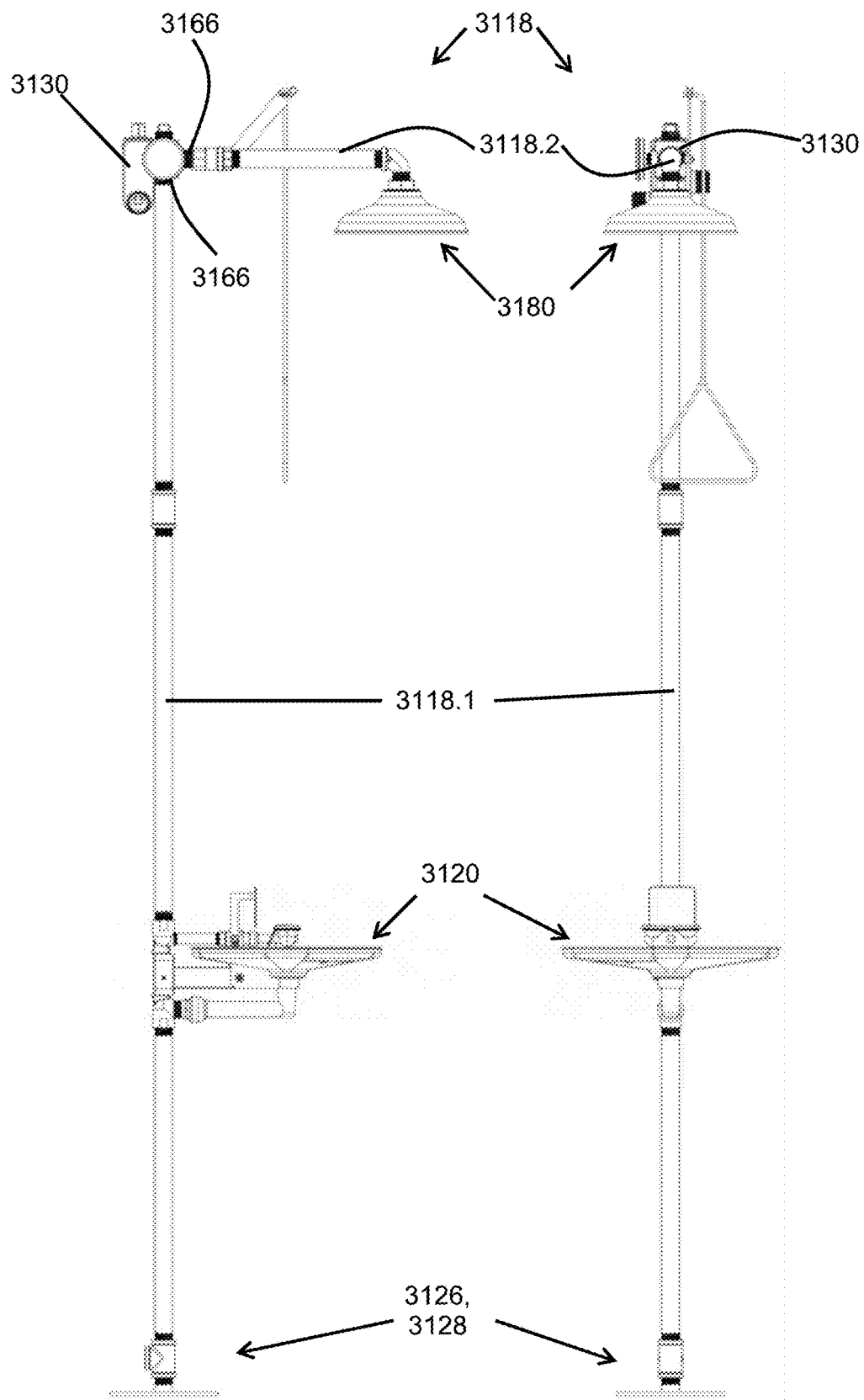
FIG. 57A is a side elevational view of a combined emergency wash apparatus according to another embodiment of the present invention.
FIG. 57B is a frontal orthogonal view of a combined emergency wash apparatus according to another embodiment of the present invention.

Mixed water from mixing chamber 3036h is presented to an outlet chamber 3034c that is laterally displaced from the cartridge valve 3036. Outlet chamber or pocket 3034c is located on body 3034 such that oppositely-oriented fluid conduits can be threadably coupled to body 3034, without physical interference with the pocket 3034d that receives the cartridge valve, the hot water inlet, or the cold water inlet. As best seen in FIGS. 56 and 55C, each of the tempered water outlets 3032a and 3032b can be coaxial and generally vertical. In some embodiments, the outlets incorporate flow limiting devices such as those shown and described earlier.

Preferably, the body housing 3034 is adapted and configured to support the weight of the shower assembly 3080 by the threaded outlet 3032b. Preferably, the portion of body 3034 surrounding threaded outlet 3032a is likewise adapted and configured to support the weight of the shower assembly, as well as the weight of valve 3030 itself, by way of conduit 3018.1. In some embodiments, as shown in FIG. 51, this weight is further supported by a combination stand and drain 3026, 3028, respectively. Referring again to FIG. 53, it can be seen that the load path for supporting the weight of the shower assembly passes through the front portion of the body having the outlets, but the load path does not go through the portion of the body in which the cartridge valve is placed.

However, there are still further embodiments in which a thermostatically controlled mixing valve supports the weight of conduit 3018.1 and eyewash assembly 3020 in tension, such that the drain 3028 does not incorporate a stand 3026. FIG. 61A shows a modification of system 3018 in which the conduit extending downward from the eyewash assembly 3020 is simply a drain 3028. In this embodiment, the combination shower and eyewash system is not supported from the floor. In some embodiments, the mixing valve body 3034 can be attached to a structural support (such as a wall), and can further include attachments of the conduit 3018.1 to a support (such as the wall). Similarly, FIG. 61B shows a modification of system 3118 in which the eyewash system 3120 is not structurally supported from the floor, and only a drain 3128 extends downward.

FIGS. 57 through 60 and 62 show various embodiments of a combined emergency shower and face wash system according to another embodiment of the present invention. Combined system 3118 includes a thermostatically controlled mixing valve 3130 providing tempered water to both an emergency shower system 3180 and an emergency eyewash system 3120.

Figure 58:
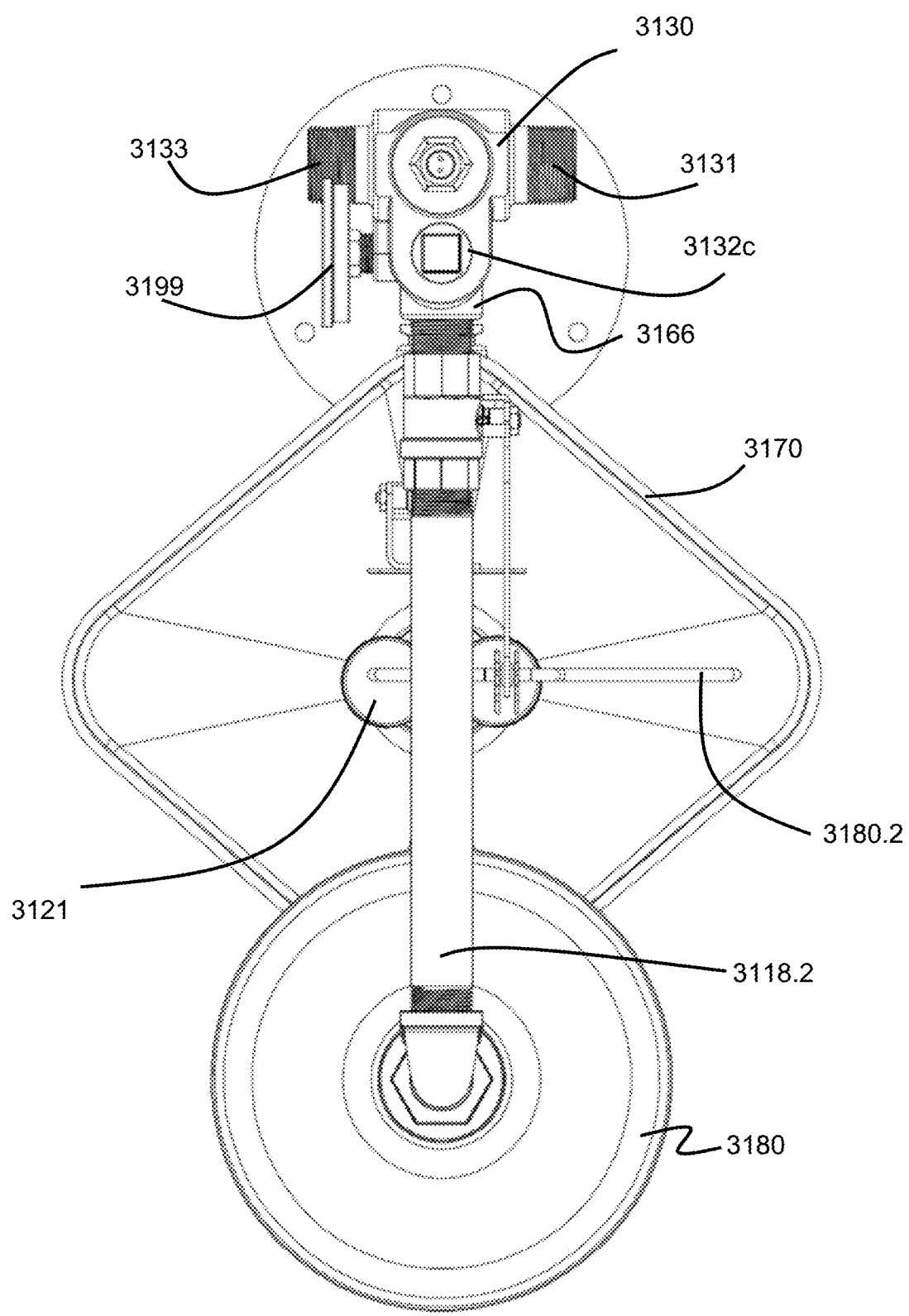
FIG. 58 is a top plan view of the apparatus of the FIG. 57A.
Figure 59:
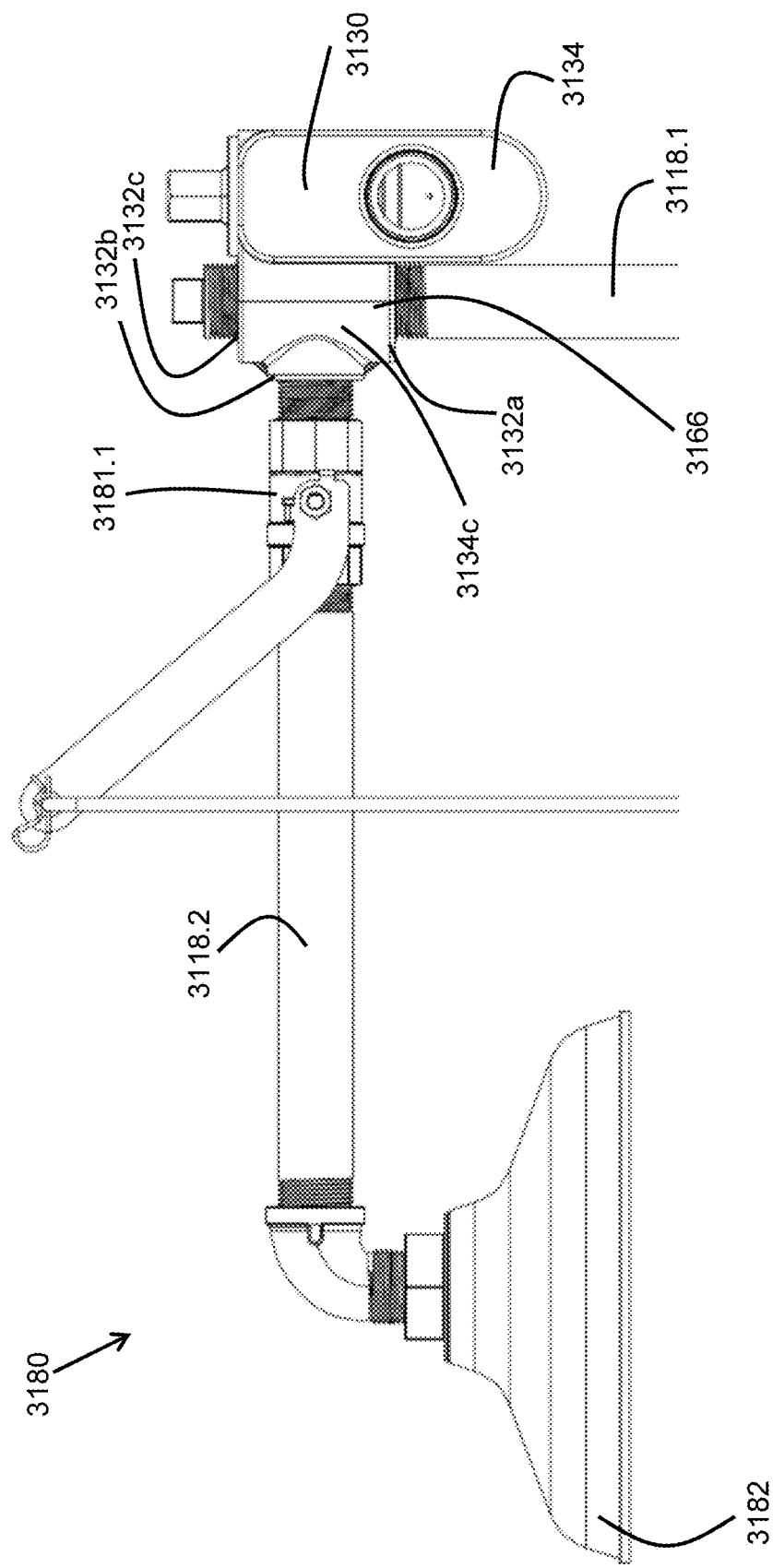
FIG. 59 is a right side elevational view of a portion of the apparatus of FIG. 57B.
Figure 60:
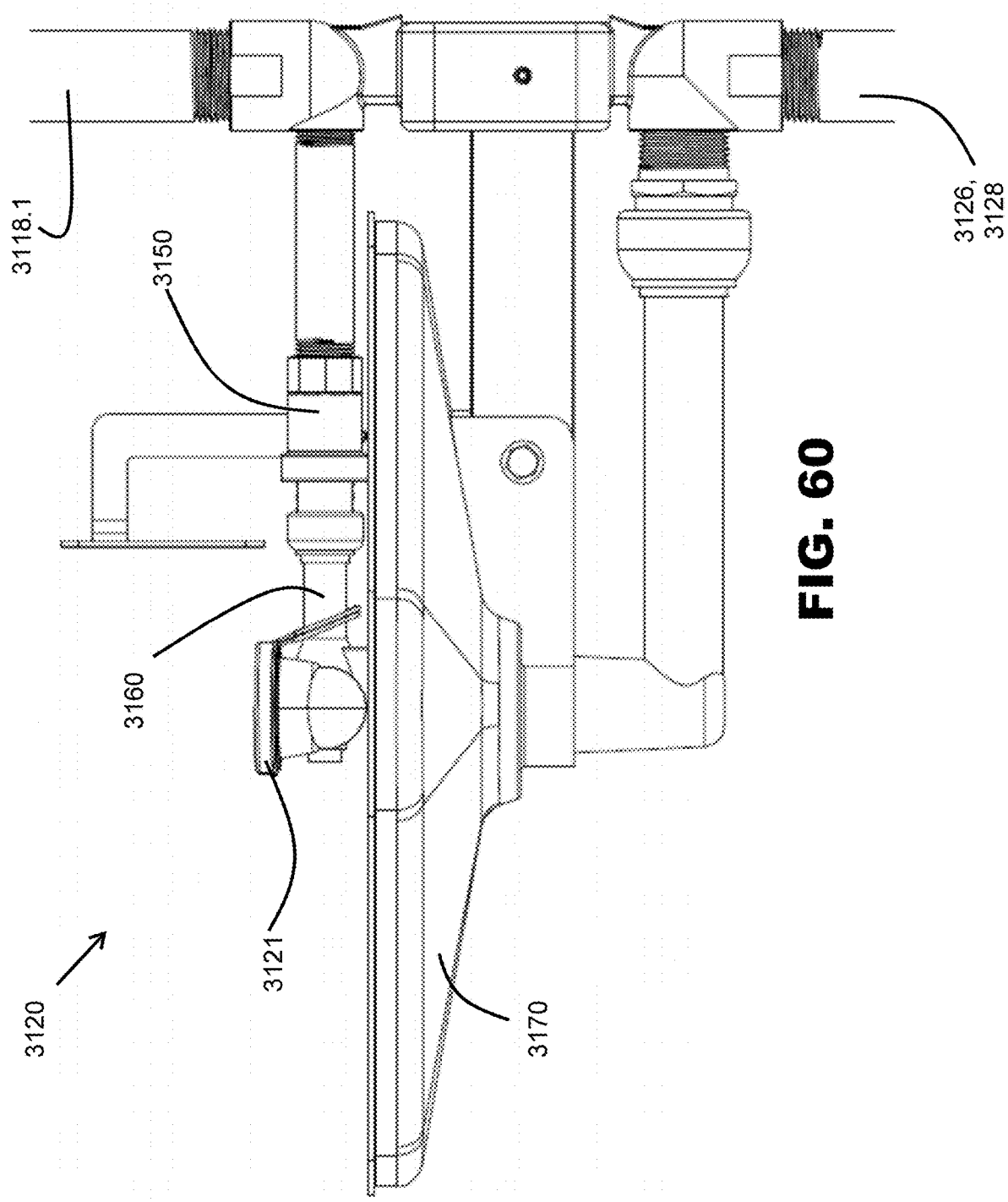
FIG. 60 is a left side elevational view of a portion of the apparatus of FIG. 57B.

Combined system 3118 is similar to system 3018, except as will be described relative to mixing valve 3130. Referring to FIGS. 58, 59, and 62D, it can be seen that mixing valve 3130 includes an outlet chamber 3134c that is adapted and configured to include three (3) threaded outlets, each being suitable for providing tempered water to a separate emergency wash system. Body 3134 is preferably integrally cast with an outlet chamber 3134c that includes bottom and top, coaxial threaded outlets 3132a and 3132c, respectively. The bottom-oriented outlet 3132a provides tempered water through a conduit 3118.1 to an eyewash system 3120. The opposing outlet 3132c is shown capped with a plug. Outlet chamber 3134c includes a third threaded outlet 3132b that provides tempered, mixed water to a conduit 3118.2 that provides the water to the inlet of the showerhead assembly. It can be seen that outlet 3132b and conduit 3118.2 are arranged generally perpendicular to the central axis of outlet 3132a.

Referring to FIGS. 57A and 59, it can be seen that the portion of the body containing the inlets and cartridge valve is not placed within the load path of the cantilevered conduit extending forward to the showerhead. Loads from supporting the showerhead are efficiently passed through the outlet chamber 3134C directly to conduit 3118.1. There is no stress or distortion provided to the thermostatically-controlled metering section, which could otherwise cause inaccurate flow or failure to operate. As best seen in FIG. 59 the portion of the mixing valve 3130 body containing the metering section is preferably not supporting the cantilevered weight of the showerhead.

It can be seen that valve 3130 having three (3) tempered water outlets can both structurally support and fluidly communicate with at least three different configurations of combination systems. First, and as shown in FIG. 57A, valve 3130 can be located at a first, relatively high location, in which only the bottom and forward facing outlets are provided with tempered water, and the top-facing outlet is capped. The forward-facing outlet supports the weight of the shower assembly 3180, including conduit 3118.2.

In yet a second configuration, valve 3130 can be located at a position similar to that shown in FIG. 51. In this configuration, the top and bottom outlets of chamber 3134c are in fluid communication with the shower and eyewash systems, respectively. However, the forward-facing outlet (3132b) is capped.

In yet a third configuration, mixing valve 3130 can be located proximate to the eyewash system, such that the bottom outlet (3132a) is capped. The forward facing outlet 3132b provides water to the eyewash system, and the top outlet 3132c provides water to the shower system.

As previously noted, some embodiments of the present invention include a grouping of the inlets and one portion of the body, and a grouping of the outlets in another portion of the body, these two groupings being spatially separated. Referring to FIG. 62, it can be seen that body 3134 includes an outlet chamber 3134c that defines a Plane C that is forward-displaced of the Plane A that includes the center line of the thermostatic cartridge valve. Preferably, this spacing (as best seen in FIG. 62D) is more than about one pipe diameter for ease of maintenance. In various embodiments, this outlet chamber 3134c can have outlets extending high and low, and preferably coaxial, in this Plane C. In comparing FIGS. 62C and 62D, it can be seen that a Plane B that can include a forward-flowing outlet 3132b, as well as laterally-flowing outlets (one of which is shown in FIG. 62C containing a measurement device, and the other of which is not shown). All of the outlets in outlet chamber 3134c are preferably displaced from Plane A. Still further, it is preferable (but not required) that the outlets extending forward, laterally, and vertically be coincident (where possible) in the same plane. This way the load path is limited to the body material surrounding the outlet chamber 3134c, and does not extend into the portion of the body surrounding the cartridge valve.

Referring to FIGS. 62C and 62D, it can be seen that the vertical outlets are preferably contained within a Plane C (shown edgewise in FIG. 62D) and Plane D (shown edgewise in FIG. 62C). Further, the lateral outlets are preferably contained within a Plane B (shown edgewise in both FIGS. 62C and 62D). An edgewise view of Plane A (which contains the inlet axes as well as the axis of cartridge valve) is shown edgewise in FIGS. 62A and 62D. It is understood that there can be deviations such that various axes are not in the planes as shown and described, and still fall within contemplation of various embodiments of the present invention. However, these other embodiments contemplate a load path for supporting fixtures that does not go through the main portion of the body containing the cartridge valve.

Various aspects of different embodiments of the present invention are expressed in paragraphs X1 and X2 as follows:

X1. On aspect of the present invention pertains to an emergency water washing system. The system preferably includes at least one spray assembly having an inlet, the spray assembly having an outlet upwardly directable. The system preferably includes a showerhead assembly located above the spray assembly and having an inlet, the showerhead assembly having an outlet directed generally downward. The system preferably includes a mixing valve assembly including a thermostatically controlled cartridge valve within a body, the body having a hot water inlet, a cold water inlet, and at least two tempered water outlets, the body including a first internal pocket adapted and configured to accept therein the thermostatic cartridge valve and water from the inlets and a second internal pocket adapted and configured to provide tempered water to the outlets, the cartridge valve being in fluid communication with the hot water inlet and cold water inlet and operating to mix the hot water and cold water and provide tempered water to the tempered water outlets, wherein one of the tempered water outlets provides tempered water to the inlet of the spray assembly, and the other of the tempered water outlets provides tempered water to the inlet of the showerhead assembly, and the portion of the body surrounding the second internal pocket provides structural support to at least one of the spray assembly or the showerhead assembly and provides a threaded pipe connection to the other of the spray assembly or the showerhead assembly.

X2. Another aspect of the present invention pertains to an emergency water washing system. The system preferably includes at least one spray assembly having an inlet, the spray assembly having an outlet upwardly directable. The system preferably includes a showerhead assembly located above the spray assembly and having an inlet, the showerhead assembly having an outlet directed generally downward. The system preferably includes a mixing valve assembly including a thermostatically controlled valve and a body having a hot water inlet and a cold water inlet, the axis of the hot water inlet being generally coplanar with the axis of the cold water inlet, and at least two tempered water outlets, the axes of the tempered water outlets being generally coplanar, the plane of the inlets being displaced from the plane of the outlets, the valve being in fluid communication with the hot water inlet and cold water inlet and operating to mix the hot water and cold water and provide tempered water to the tempered water outlets, wherein one of the tempered water outlets provides tempered water to the inlet of the spray assembly, and the other of the tempered water outlets provides tempered water to the inlet of the showerhead assembly.

X3. Various other embodiments of the present invention contemplate an eyewash system in which a single thermostatically controlled mixing valve provides mixed fluid to both an eye/face wash and also a shower. In some embodiments, the valve is located such that it supports the showerhead in cantilever fashion, and further connects vertically to the eye/face wash (for example, as shown in FIG. 59). The mixing valve is adapted and configured such that the metering section is laterally displaced from the connection of the showerhead assembly and the connection to the eye/face wash.

Yet other embodiments pertain to any of the previous statements X1 or X2, which are combined with one or more of the following other aspects. It is also understood that any of the aforementioned X paragraphs include listings of individual features that can be combined with individual features of other X paragraphs.

Wherein the cartridge valve includes at least spaced-apart three elastomeric sealing rings, the body includes at least three spaced-apart sealing lands, and each one of the sealing rings cooperates with one of the corresponding sealing lands to define a hot water subchamber, cold water subchamber, and mixing subchamber within the body.

Wherein the body is a one-piece, integrally cast body comprising brass.

Wherein the threaded pipe connection provides the cantilevered structural support of the showerhead assembly.

Wherein the threaded pipe connection provides the cantilevered structural support of the spray assembly.

Wherein each of the outlets is threaded with the same size and type of threaded pipe connection.

Wherein the first internal pocket is displaced laterally from the second internal pocket.

Wherein the structural support load for the at least one assembly does not pass through the material of the body comprising the first internal pocket.

Wherein each of the tempered water outlets are coaxial.

Wherein one of the water outlets provides structural support of the showerhead assembly.

Wherein each of the tempered water outlets are perpendicular.

Wherein one of the water outlets provides structural support of the showerhead assembly.

Which further comprises a flow regulator adapted and configured to provide a substantially constant flow of water therethrough, the flow regulator being located in one of the tempered water outlets of the body.

Which further comprises a threaded pipe providing fluid communication from one of the outlets to one of the spray assembly or the showerhead assembly and the pipe provides cantilevered structural support of the one the assembly and the only structural support of the one the assembly.

Wherein the pipe provides the cantilevered structural support of the showerhead assembly; wherein the pipe provides the cantilevered structural support of the spray assembly; wherein each of the outlets is threaded with the same size and type of threaded coupling; wherein the plane of the inlets is displaced from the plane of the outlets by about ninety degrees; wherein the plane of the inlets is displaced laterally and generally parallel from the plane of the outlets; wherein each of the tempered water outlets are coaxial, and one of the water outlets supports the weight of the showerhead assembly; and wherein each of the tempered water outlets are perpendicular, and one of the water outlets supports the weight of the showerhead assembly.

Wherein the body is one piece and includes an inlet chamber laterally displaced from an outlet chamber, the inlet chamber including the hot water inlet and the cold water inlet, and the outlet chamber including the tempered water outlets.

Which further comprises a showerhead flow regulator adapted and configured to provide a substantially constant flow of water therethrough, the showerhead flow regulator being located in one of the tempered water outlets of the body.

Which further comprises a spray flow regulator adapted and configured to provide a substantially constant flow of water therethrough, the spray flow regulator being located in one of the tempered water outlets of the body.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. An emergency water washing system, comprising:
   at least one spray assembly having an inlet, said spray assembly having an outlet upwardly directable;
   a showerhead assembly located above said spray assembly and having an inlet, said showerhead assembly having an outlet directed generally downward;
   a mixing valve assembly including a thermostatically controlled valve within a body having a hot water inlet and a cold water inlet, and a first tempered water outlet with a first central axis and a second tempered water outlet with a second central axis, said body including an internal pocket adapted and configured to provide tempered water to each said first and second tempered water outlets, the central axes of the first and second tempered water outlets being generally orthogonal to each other, said mixing valve being in fluid communication with the hot water inlet and cold water inlet and operating to mix the hot water and cold water and provide tempered water to each said first and second tempered water outlets;
   a first shut off valve having an inlet in fluid communication with the first tempered water outlet, an outlet in fluid communication with the inlet of said showerhead, and being actuatable between an open position and a closed position; and
   a second shut off valve having an inlet in fluid communication with the second tempered water outlet, an outlet in fluid communication with the inlet of said spray assembly, and being actuatable between an open position and a closed position.

2. The system of claim 1 wherein said body is a one-piece, integrally cast body comprising brass.

3. The system of claim 1 which further comprises a flow regulator adapted and configured to provide a substantially constant flow of water therethrough, said flow regulator receiving tempered water from one of said tempered water outlets of said body.

4. The system of claim 1 which further comprises a threaded pipe coupled to the inlet of said first shut off valve and providing fluid communication from said first tempered water outlet, said pipe being coupled to said body, and said pipe provides cantilevered structural support of said showerhead assembly.

5. The system of claim 4 wherein each of said first and second tempered water outlets are threaded with the same size and type of threaded coupling.

6. The system of claim 1 wherein said thermostatically controlled valve is a cartridge valve.

* * * * *